(12) United States Patent
Shen et al.

(10) Patent No.: US 10,073,191 B2
(45) Date of Patent: Sep. 11, 2018

(54) METHODS AND APPARATUS FOR BROADBAND ANGULAR SELECTIVITY OF ELECTROMAGNETIC WAVES

(71) Applicant: Massachusetts Institute of Technology, Cambridge, MA (US)

(72) Inventors: Yichen Shen, Cambridge, MA (US); Dexin Ye, Hangzhou (CN); Ivan Celanovic, Cambridge, MA (US); Steven G. Johnson, Arlington, MA (US); John D. Joannopoulos, Belmont, MA (US); Marin Soljacic, Belmont, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 591 days.

(21) Appl. No.: 14/630,080

(22) Filed: Feb. 24, 2015

(65) Prior Publication Data

US 2016/0252652 A1    Sep. 1, 2016

Related U.S. Application Data

(60) Provisional application No. 61/944,100, filed on Feb. 25, 2014.

(51) Int. Cl.
*G02B 1/00* (2006.01)
*G02B 5/30* (2006.01)
(Continued)

(52) U.S. Cl.
CPC .............. *G02B 1/005* (2013.01); *G02B 5/20* (2013.01); *G02B 5/26* (2013.01); *G02B 5/3066* (2013.01);
(Continued)

(58) Field of Classification Search
CPC . G02B 1/005; G02B 5/20; G02B 5/26; G02B 5/3066; G02B 5/3083; G02B 1/0131; G02B 1/0147
(Continued)

(56) References Cited

U.S. PATENT DOCUMENTS 4,512,638 A    4/1985 Sriram et al.
4,525,413 A    6/1985 Rogers et al.
(Continued)

FOREIGN PATENT DOCUMENTS

CN    101 431 109 A    5/2009
WO    WO 2012/012450 A1    1/2012
WO    WO 2013/054115 A1    4/2013

OTHER PUBLICATIONS

Banerjee, A. et al., "Design of a tunable ultraviolet filter using metallodielectric photonic crystal," Applied Electromagnetics Conference, 2007, IEEE, Piscataway, NJ, USA, pp. 1-4 (Dec. 19, 2007).
(Continued)

*Primary Examiner* — William R Alexander
*Assistant Examiner* — Grant Gagnon
(74) *Attorney, Agent, or Firm* — Smith Baluch LLP

(57) ABSTRACT

A filter to transmit incident radiation at a predetermined incidence angle includes a plurality of photonic crystal structures disposed substantially along a surface normal direction of the filter. The photonic crystal structure includes a multilayer cell that comprises a first layer having a first dielectric permittivity, and a second layer having a second dielectric permittivity different from the first dielectric permittivity. The first layer and the second layer define a Brewster angle substantially equal to the predetermined incidence angle based on the first dielectric permittivity and the second permittivity. Each photonic crystal structure in the plurality of photonic crystal structures defines a respec-
(Continued)

tive bandgap, and the respective bandgaps of the plurality of photonic crystal structures, taken together, cover a continuous spectral region of about 50 nm to about 100 mm.

22 Claims, 46 Drawing Sheets

(51) Int. Cl.
    *G02B 5/26*     (2006.01)
    *G02F 1/01*     (2006.01)
    *G02B 5/20*     (2006.01)

(52) U.S. Cl.
    CPC .......... *G02B 5/3083* (2013.01); *G02F 1/0131* (2013.01); *G02F 1/0147* (2013.01)

(58) Field of Classification Search
    USPC ........................................................ 359/485
    See application file for complete search history.

(56) References Cited

U.S. PATENT DOCUMENTS

| | | | |
|---|---|---|---|
| 4,553,818 A | 11/1985 | Cohen | |
| 5,204,160 A | 4/1993 | Rouser | |
| 5,486,949 A | 1/1996 | Schrenk et al. | |
| 6,239,853 B1 | 5/2001 | Winker et al. | |
| 7,052,746 B2 | 5/2006 | MacMaster | |
| 7,467,873 B2 | 12/2008 | Clarke et al. | |
| 8,035,774 B2 | 10/2011 | Ouderkirk et al. | |
| 9,057,830 B2 | 6/2015 | Haman et al. | |
| 9,223,064 B2* | 12/2015 | Guo ............... | G02B 1/005 |
| 2012/0229905 A1* | 9/2012 | Axel ............... | B82Y 20/00 |
| | | | 359/584 |
| 2012/0325299 A1 | 12/2012 | De Ceglia | |
| 2015/0362625 A1* | 12/2015 | Hyde ............... | G02B 1/005 |
| | | | 359/280 |

OTHER PUBLICATIONS

Jomtarak, R. et al., "Geometrically Distributed ID Photonic Crystals for Light-Reflection in All Angles," Procedia Engineering, vol. 32, pp. 455-460 (Mar. 24, 2012).
Xiaoyong, Hu et al., "A multichannel filter in a photonic crystal heterostructure contianing single-negative materials," Journal of Optics A., Pure and Applied Optics, vol. 9, No. 10, pp. 877-883 (Oct. 1, 2007).
International Search Report and Written Opinion from corresponding PCT Application No. PCT/US2015/017303, dated Jan. 25, 2016.
Cojocaru, E., "Omnidirectional reflection from finite periodic and Fibonacci quasi-periodic multilayers of alternating isotropic and birefringent thin films", Applied Optics, vol. 41, No. 4, (2002), pp. 747-755.
Abelmann, L. et al., "Oblique evaporation and surface diffusion", Thin Solid Films, vol. 305,(1997), pp. 1-21.
Agrawal, M., "Photonic design for efficient solid state energy conversion", Ph.D. thesis, Stanford University, (2009), 275 pages.
Aközbek, N. et al., "Experimental demonstration of plasmonic Brewster angle extraordinary transmission through extreme subwavelength slit arrays in the microwave", Phys. Rev. B, vol. 85, (2012), p. 205430(1)-p. 205430(4).
Alú, A. et al., "Plasmonic Brewster Angle: Broadband Extraordinary Transmission through Optical Gratings", Phys. Rev. Lett., vol. 106, (2011), pp. 123902-1-123902-4.
Araújo, G. L. et al., "Absolute limiting efficiencies for photovoltaic energy conversion", Solar Energy Materials and Solar Cells, vol. 33, (1994), pp. 213-240.
Argyropoulos, C., et al., "Broadband Absorbers and Selective Emitters based on Plasmonic Brewster Metasurfaces", Physical Review B, vol. 87, (2013), 20 pages.

Argyropoulos, C., et al., "Matching and funneling light at the plasmonic Brewster angle", Physical Review B, vol. 85, (2012), pp. 024304-1-024304-9.
Badescu, V., "Spectrally and angularly selective photothermal and photovoltaic converters under one-sun illumination", Journal of Physics D: Applied Physics, vol. 38, (2005), pp. 2166-2172.
Bergman, D. J., "The dielectric constant of a composite material—A problem in classical physics", Phys. Rep., vol. 43, No. 9, (1978), pp. 377-407.
Bermel, P. et al., "Design and global optimization of high-efficiency thermophotovoltaic systems", Opt. Express, vol. 18, No. S3, (2010), pp. A314-A334.
Bermel, P. et al., "Tailoring photonic metamaterial resonances for thermal radiation", Nanoscale Research Letters, vol. 6, (2011), pp. 1-5.
Bett, A. et al., "Flatcon™-modules: technology and characterisation," 3$^{rd}$ World Conference on Photovoltaic Energy Conversion, vol. 1, (IEEE, 2003), pp. 634-637.
Campbell, P. et al., "The Limiting Efficiency of Silicon Solar Cells under Concentrated Sunlight," Electron Devices, IEEE Transactions, vol. ED-33, No. 2, (1986), pp. 234-239.
Disalvo, F. J., "Thermoelectric Cooling and Power Generation," Science, vol. 285, (1999), pp. 703-706.
Dumke, W. P., "Spontaneous radiative recombination in semiconductors," Phys. Rev., vol. 105, No. 1, (1957), pp. 139-144.
Einstein, A., "Concerning an Heuristic Point of View Toward the Emission and Transformation of Light," American Journal of Physics, vol. 17, No. 132, (1965), 16 pages.
Fink, Y. et al., "A Dielectric Omnidirectional Reflector", Science, vol. 282, (1998), pp. 1679-1682.
Florescu, M. et al., "Improving solar cell efficiency using photonic band-gap materials," Solar Energy Materials and Solar Cells, vol. 91, (2007), pp. 1599-1610.
García De Abajo, F. G., "Colloquium: Light scattering by particle and hole arrays," Reviews of Modern Physics, vol. 79, (2007), pp. 1267-1289.
Haman, R. E. et al., "Angular photonic band gap", Phys. Rev. A, vol. 83, (2011), p. 035806-1-035806-4.
Höhn, O. et al., "Maximal power output by solar cells with angular confinement," Optics Express, vol. 22, No. S3, published Mar. 28, 2014, pp. A715-A722.
Höhn, O. et al., "Optimization of angularly selective photonic filters for concentrator photovoltaic", Proc. SPIE, vol. 8438, 84380A-1, (2012), 10 pages.
Johnson, S. G. et al., "Block-iterative frequency-domain methods for Maxwell's equations in a planewave basis", Opt. Express, vol. 8, No. 3, (2001), pp. 173-190.
Johnson, S. G. et al., "Three-dimensionally periodic dielectric layered structure with omnidirectional photonic band gap", Appl. Phys. Lett., vol. 77, No. 22, (2000), pp. 3490-3492.
Kosten, E. D. et al., "Limiting acceptance angle to maximize efficiency in solar cells", Proc. of SPIE, vol. 8124, (2011), pp. 81240F-1-81240F-6.
Kosten, E. D., "Optical designs for improved solar cell performance," Ph.D. thesis, California Institute of Technology, Pasadena, CA, (Defended May 15, 2014), 188 pages.
Kosten, E. D. et al., "Experimental demonstration of enhanced photon recycling in angle-restricted gas solar cells", Energy & Environmental Science, vol. 7, (Apr. 15, 2014), pp. 1907-1912.
Kosten, E. D. et al., "Highly efficient GaAs solar cells by limiting light emission angle", Light Sci. Appl., vol. 2, (2013), e45, 6 pages.
Le, K. Q. et al., "Broadband Brewster transmission through 2d metallic gratings," Journal of Applied Physics, vol. 112, (2012), p. 094317-1-094317-5.
Lenert, A. et al., "A Nanophotonic Solar Thermophotovoltaic Device," Nature Nanotechnology, (Jan. 19, 2014), 25 pages.
Liu, V. et al., "S$^4$: A free electromagnetic solver for layered periodic structures", Comput. Phys. Commun., vol. 183, (2012), pp. 2233-2244.
Marti, A. et al., "Photon recycling and Shockley's diode equation," Journal of Applied Physics, vol. 82, No. 8, (1997), pp. 4067-4075.

(56) References Cited

OTHER PUBLICATIONS

Markvart, T. "Solar cell as a heat engine: energy-entropy analysis of photovoltaic conversion," Physica Status Solidi, vol. 205, No. 12, (2008), pp. 2752-2756.
Müller, J. et al., "TCO and light trapping in silicon thin film solar cells," Solar Energy, vol. 77, (2004), pp. 917-930.
Pendry, J. B. et al., "Magnetism from Conductors and Enhanced Nonlinear Phenomena", IEEE Trans. Microw. Theory Tech., vol. 47, No. 11, (1999), pp. 2075-2084.
Pendry, J. B. et al., "Extremely Low Frequency Plasmons in Metallic Mesostructures", Phys. Rev. Lett., vol. 76, No. 25, (1996), pp. 4773-4776.
Rinnerbauer, V. et al., "Metallic Photonic Crystal Absorber-Emitter for Efficient Spectral Control in High-Temperature Solar Thermophotovoltaics", Advanced Energy Materials, (Apr. 22, 2014), 30 pages.
Peters, M. et al., "Angular confinement and concentration in photovoltaic converters," Solar Energy Materials and Solar Cells, vol. 94, (2010), pp. 1393-1398.
Schaefer, D. W. et al., "Structure of Random Porous Materials: Silica Aerogel", Phys. Rev. Lett., vol. 56, No. 20, (1986), pp. 2199-2202.
Schwartz, B. T. et al., "Total external reflection from metamaterials with ultralow refractive index", J. Opt. Soc. Am. B, vol. 20, No. 12, (2003), pp. 2448-2453.
Schubert, E. F. et al., "Low-refractive-index materials: a new class of optical thin-film materials," Physical Status Solidi B Basic Research, vol. 244, (2007), pp. 3002-3008.
Shen, Y. et al., "Metamaterial broadband angular selectivity", Phys. Rev. B., vol. 90, (Sep. 15, 2014), pp. 125422(1)-125422(5).
Shen, Y. et al., "Optical Broadband Angular Selectivity", Science, vol. 343, (Mar. 28, 2014), pp. 1499-1501.
Shin, J. et al., "Three-Dimensional Metamaterials with an Ultrahigh Effective Refractive Index over a Broad Bandwidth", Phys. Rev. Lett., vol. 102, (2009), pp. 093903-1-093903-4.
Shockley, W. et al., "Detailed Balance Limit of Efficiency of p-n Junction Solar Cells," Journal of Applied Physics, vol. 32, No. 3, (1961), pp. 510-519.
Teeka, C. et al., "Geometrically distributed one-dimensional photonic crystals for all angle optical filters", Microwave and Optical Technology Letters, vol. 54, No. 11, (2012), pp. 2533-2536.
Tiedje, T. et al., "Limiting Efficiency of Silicon Solar Cells," Electron Devices, IEEE Transactions on Electron Devices, vol. ED-31, No. 5, (1984), pp. 711-716.
Üpping, J. et al., "Direction-selective optical transmission of 3D fcc photonic crystals in the microwave regime", Photonics and Nanostructures—Fundamentals and Applications—Special Issue, vol. 8, (2010), pp. 102-106.
Venkatasubramanian, R. et al., "Thin-film thermoelectric devices with high room-temperature figures of merit," Nature, vol. 413, (2001), pp. 597-602.
Wadley, H.N.G. et al., "Biased Target Ion Beam Deposition of GMR Multilayers", J. Vac. Sci. Technol. A, vol. 18, (2000), 7 pages.
Wang, R. L. et al., "Simulation of Band Gap Structures of 1D Photonic Crystal", J. Korean. Phys. Soc., vol. 52, (2008), pp. s71-s74.
Wang, X. et al., "Enlargement of omnidirectional total reflection frequency range in one-dimensional photonic crystals by using photonic heterostructures", Appl. Phys. Lett., vol. 80, No. 23, (2002), pp. 4291-4293.
Wang, X. et al., "Enlargement of the nontransmission frequency range of multiple-channeled filters by use of heterostructures", Appl. Phys. Lett., vol. 95, No. 2, (2004), pp. 424-426.
Weber, M. F. et al., "Giant Birefringent Optics in Multilayer Polymer Mirrors", Science, vol. 287, (2000), pp. 2451-2456.
Weinstein, L. et al., "Optical cavity for improved performance of solar receivers in solar-thermal systems," Solar Energy, vol. 108, (Jun. 16, 2014), pp. 69-79.
Winn, J. N. et al., "Omnidirectional reflection from a one-dimensional photonic crystal", Opt. Lett., vol. 23, No. 20, (1998), pp. 1573-1575.
Xu, J. et al., "A Delay-Based Multicast Overlay Scheme for WDM Passive Optical Networks With 10-Gb/s Symmetric Two-Way Traffics", J. Lightwave Technol., vol. 28, No. 18, (2010), pp. 2660-2666.
Xu, J., "Optimization of Construction of Multiple One-Dimensional Photonic Crystals to Extend Bandgap by Genetic Algorithm", J. Lightwave Technol., vol. 28, No. 7, (2010), pp. 1114-1120.
Yablonovitch, E., "Inhibited Spontaneous Emission in Solid-State Physics and Electronics", Phys. Rev. Lett., vol. 58, No. 20, (1987), pp. 2059-2062.
Yablonovitch, E., "Photonic bandgap structures", J. Opt. Soc. Am. B, vol. 10, No. 2, (1993), p. 283-295.
Yablonovitch, E., "Statistical ray optics," J. Opt. Soc. Am., vol. 72, No. 7, (1982), pp. 899-907.
Yeng, Y. X. et al., "Global optimization of omnidirectional wavelength selective emitters/absorbers based on dielectric-filled antireflection coated two-dimensional metallic photonic crystals," Optics Express, vol. 22, No. 18, (Aug. 29, 2014), pp. 21711-21718.
Yeng, Y. X. et al., "Enabling high-temperature nanophotonics for energy applications," Proceedings of the National Academy of Sciences, vol. 109, No. 7, (2012), pp. 2280-2285.
Ade, P. et al., "BICEP2 II: Experiment and Three-Year Data Set," The Astrophysical Journal, 29 pages, Sep. 1, 2014.
Alè, A. et al., "Optical nanotransmission lines: synthesis of planar left-handed metamaterials in the infrared and visible regimes," Journal of the Optical Society of America B, vol. 23 (Mar. 2006):571-583.
Arbabi, et al., "Dielectric metasurfaces for complete control of phase and polarization with subwavelength spatial resolution and high transmission," Nature Nanotechnology, vol. 10 (Aug. 31, 2015): 937-943.
Archard, J. et al., "Improved Glan-Foucalt Prism," Journal of Scientific Instruments, vol. 25 (Dec. 1948): 407-409.
Arons, A. et al., "Einstein's Proposal of the Photon Concept—a Translation of the Annalen der Physik Paper of 1905," American Journal of Physics, vol. 33 (May 1965): 367-374.
Atwater, J. et al., "Microphotonic Parabolic Light Directors Fabricated by Two-Photon Lithography," Applied Physics Letters, vol. 99 (Oct. 13, 2011): 1-3.
Barwicz, T. et al., "Polarization-transparent microphotonic devices in the strong confinement limit," Nature Photonics, vol. 1 (Dec. 21, 2006): 57-60.
Blanco, M. et al., "Theoretical efficiencies of angular-selective non-concentrating solar thermal systems," Solar Energy, vol. 76 (Jan. 22, 2004) 683-691.
Chen, Q. et al., "High transmission and low color cross-talk plasmonic color filters using triangular-lattice hole arrays in aluminum films," Optics Express, vol. 18 (Jun. 21, 2010): 14056-14062.
D'Aguanno, G. et al., "Broadband metamaterial for nonresonant matching of acoustic waves," Scientific Reports, vol. 2 (Mar. 28, 2012): 1-5.
Ebbesen, T. et al., "Extraordinary Optical transmission through sub-wavelength hole arrays," Nature, vol. 391 (Feb. 12, 1998): 667-669.
Fahr, S. et al., "Rugate filter for light-trapping in solar Cells," Optics Express, vol. 16 (Jun. 10, 2008): 9333-9343.
Farjadpour, A. et al., "Improving accuracy by subpixel smoothing in the finite-difference time domain," Optics Letters, vol. 31 (Sep. 22, 2006): 2972-2974.
Fraas, L. et al., "Solar Cells and Their Applications Second Edition," Wiley Series in Microwave and Optical Engineering (2010), 14 pages.
Garcia-Vidal, F. et al. "Light passing through subwavelength apertures," Reviews of Modern Physics, vol. 82 (Mar. 12, 2010): 729-787.
Green, M., "Limiting photovoltaic monochromatic light conversion efficiency," Progress in Photovoltaics, vol. 9 (Feb. 2001): 257-261.
Hsu, C. et al., "Transparent displays enabled by resonant nanoparticle scattering," Nature communications, vol. 5 (Jan. 21, 2014), 6 pages.

(56) References Cited

OTHER PUBLICATIONS

Kosten, E. et al., "Limiting Light Escape Angle in Silicon Photovoltaics: Ideal and Realistic Cells," IEEE Journal of Photovoltaics, vol. 5 (Jan. 1, 2015): 61-69.
Medina, F. et al, "Extraordinary Transmission Through Arrays of Electrically Small Holes From a Circuit Theory Perspective," IEEE Transactions on Microwave Theory and Techniques, vol. 56 (Dec. 12, 2008) 3108-3120.
Miller, O. et al., "Strong Internal and External Luminescence as Solar Cells Approach the Shockley-Queisser Limit," IEEE Journal of Photovoltaics, vol. 2 (Jun. 6, 2012): 303-310.
Norton, B. "Harnessing Solar Heat," Lecture Notes in Energy, vol. 18 (2014), 271 pages.
Raman, A. et al., "Passive radiative cooling below ambient air temperature under direct sunlight," Nature, vol. 515 (Nov. 27, 2014): 540-54.
Raphaeli, E. et al., "Tungsten black absorber for solar light with wide angular operation range," Applied Physics Letters, vol. 92 (May 29, 2008): 1-3.
Rechtsman, M. et al., "Band Gaps in Amorphous Photonic Lattices," OSA Technical Digest, Optical Society of America (Jul. 1, 2010): 1-2.
Rinnerbauer, V. et al., "Superlattice photonic crystal as broadband solar absorber for high temperature operation," Optics Express, vol. 22, No. S7 (Dec. 1, 2014), 12 pages.
Shen, B. et al., "Ultra-high-efficiency metamaterial polarizer," Optica, vol. 1 (Nov. 20, 2014): 356-360.
Shen, Y. et al., "Structural Colors from Fano Resonances," ACS Photonics (Dec. 30, 2014): 1-5.
Shen, Y. et al., "Air-compatible Broadband Angular Selective Material Systems," ArXiv:1502.00243 (Feb. 1, 2015):1-5.
Si, G. et al., "Reflective plasmonic color filters based on lithographically patterned silver nanorod arrays," Nanoscale, vol. 5 (Jul. 21, 2013): 6243-6248.
Swarup, G. et al., "The Giant Metre-wave Radio Telescope," Current Science, vol. 60 (Jan. 25, 1991): 95-105.
Temelkuran, B. et al., "Photonic crystal-based resonant antenna with a very high directivity," Journal of applied physics, vol. 87 (Jan. 1, 2000): 603-605.
Ulbrich, C. et al., "Directional selectivity and light-trapping in solar cells," SPIE Proceedings, vol. 7002 (May 5, 2008): 1-11.
Xu, T. et al., "Plasmonic nanoresonators for high-resolution colour filtering and spectral imaging," Nature Communications 1:59 (Aug. 24, 2010): 1-5.
Yang, J. et al., "Photonic-band-gap effects in two-dimensional polycrystalline and amorphous structures," Physical Review A, vol. 82 (Aug. 31, 2010): 1-19.
Zhang, C. et al., "Enlargement of nontransmission frequency range in photonic crystals by using multiple heterostructures," Journal of Applied Physics, vol. 87 (Mar. 15, 2000): 3174-3176.

\* cited by examiner

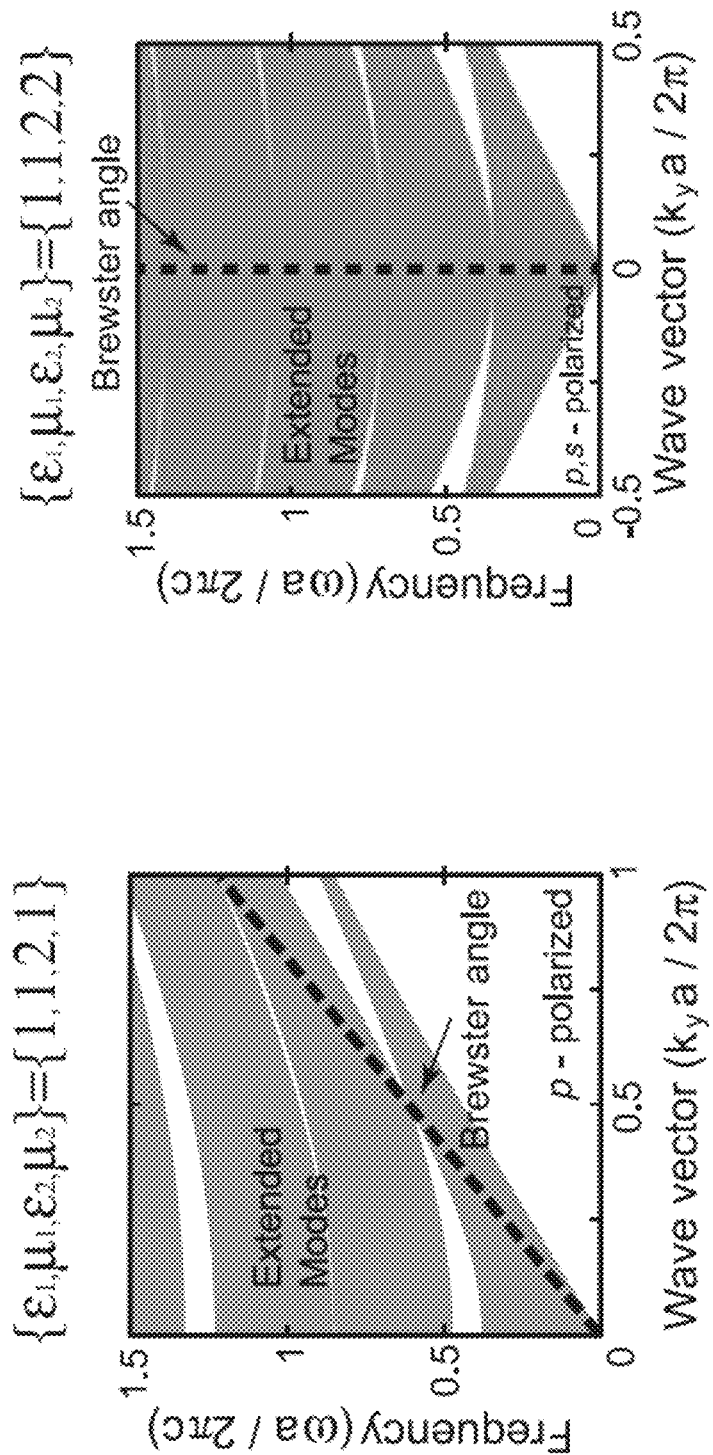

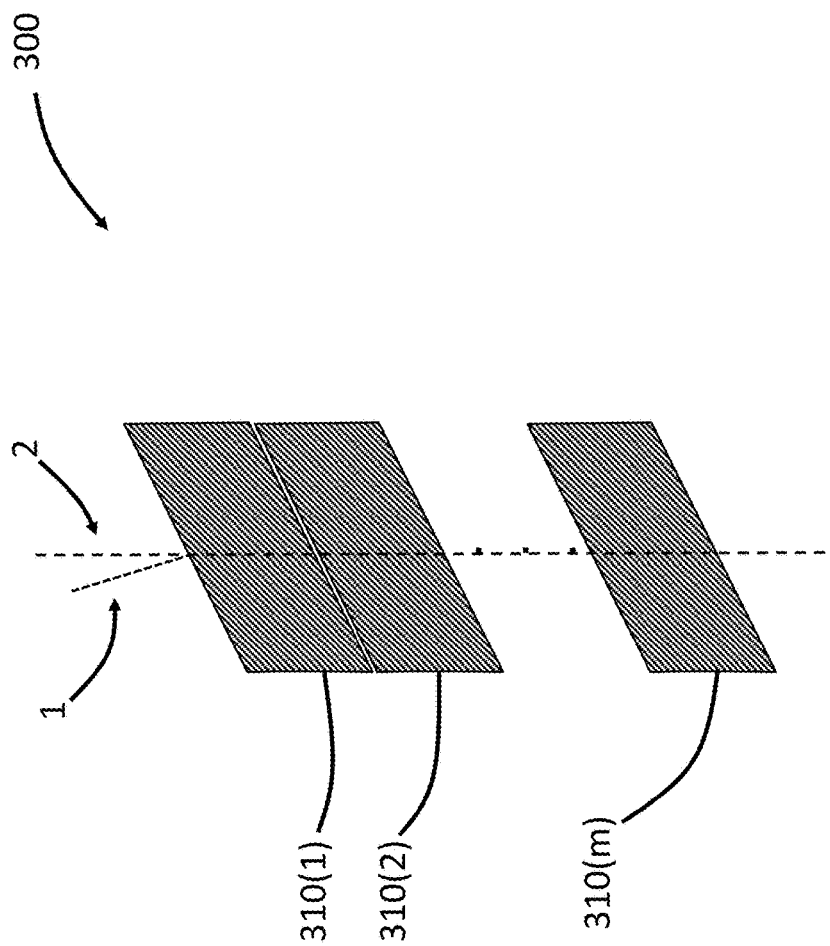

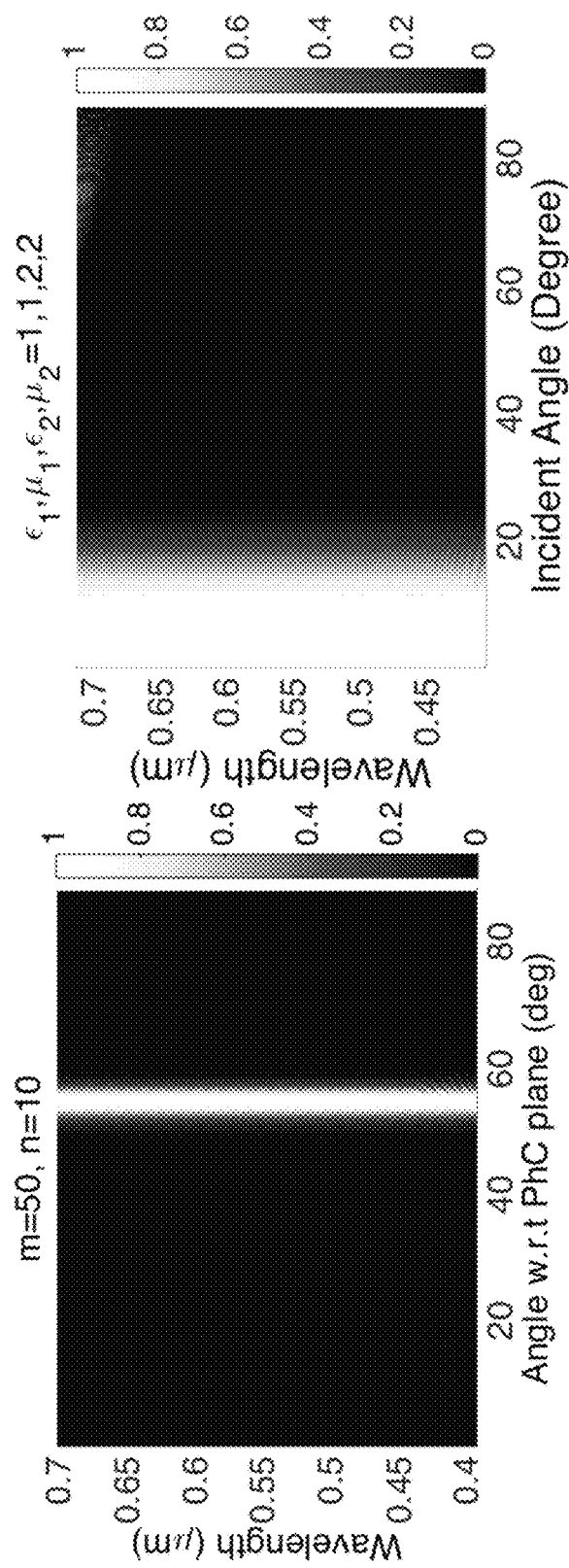

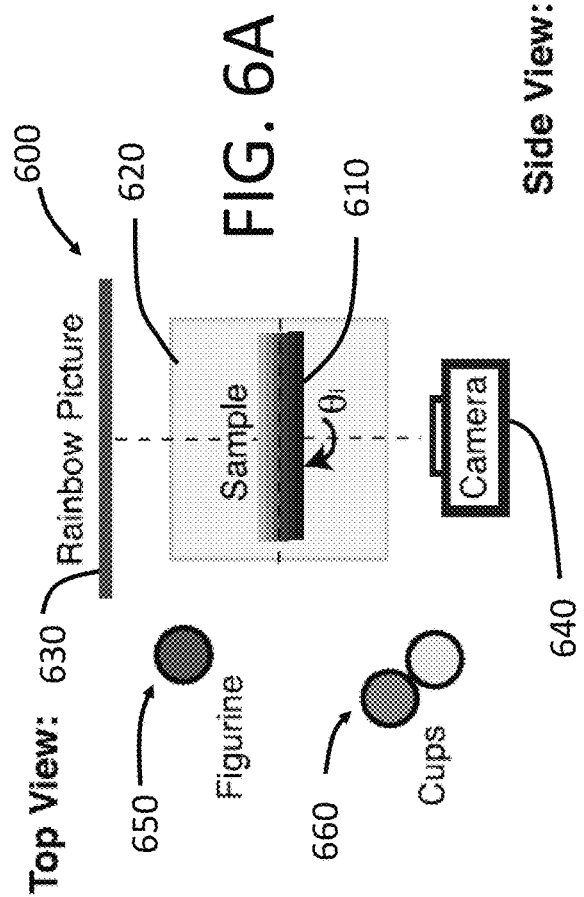
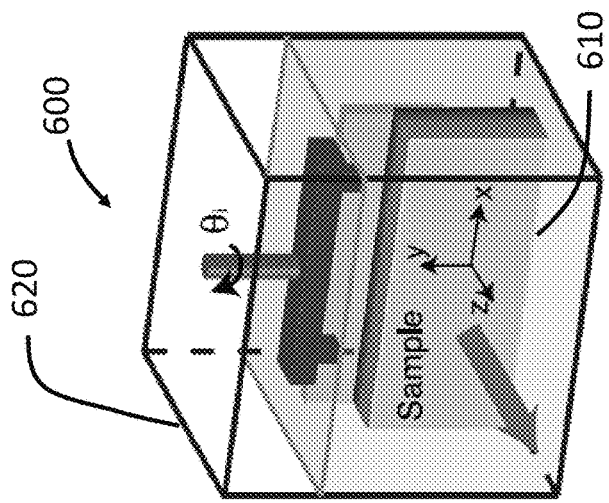
FIG. 6A
FIG. 6B

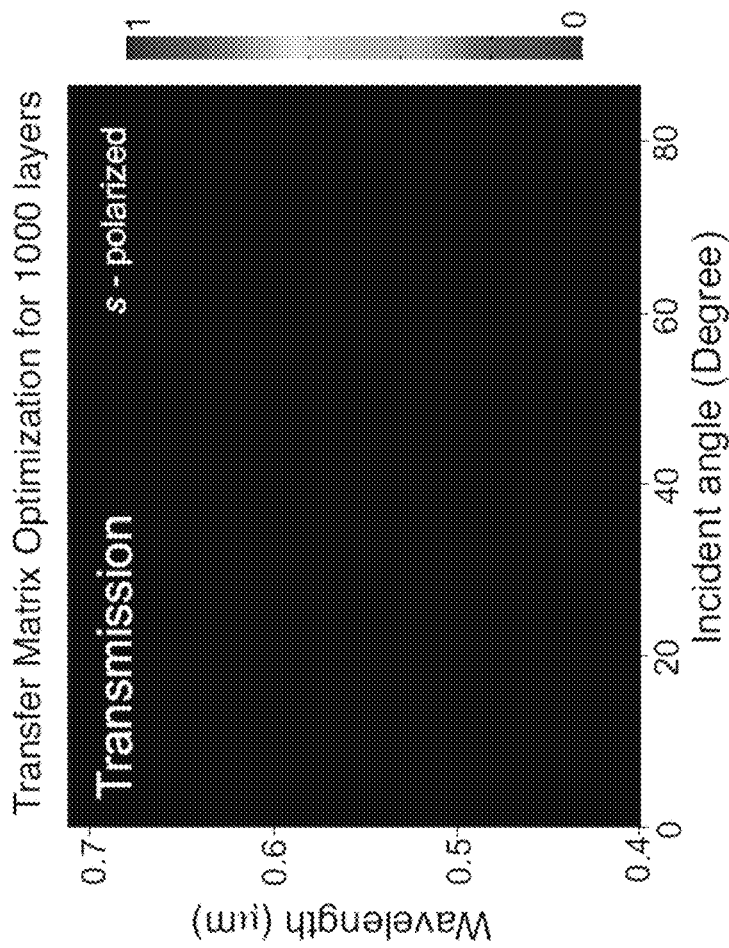
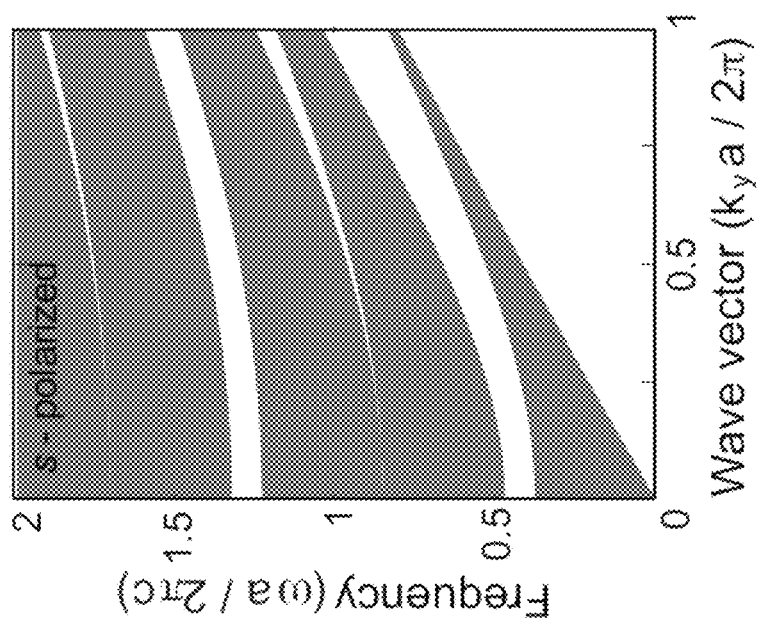
FIG. 7B
FIG. 7A

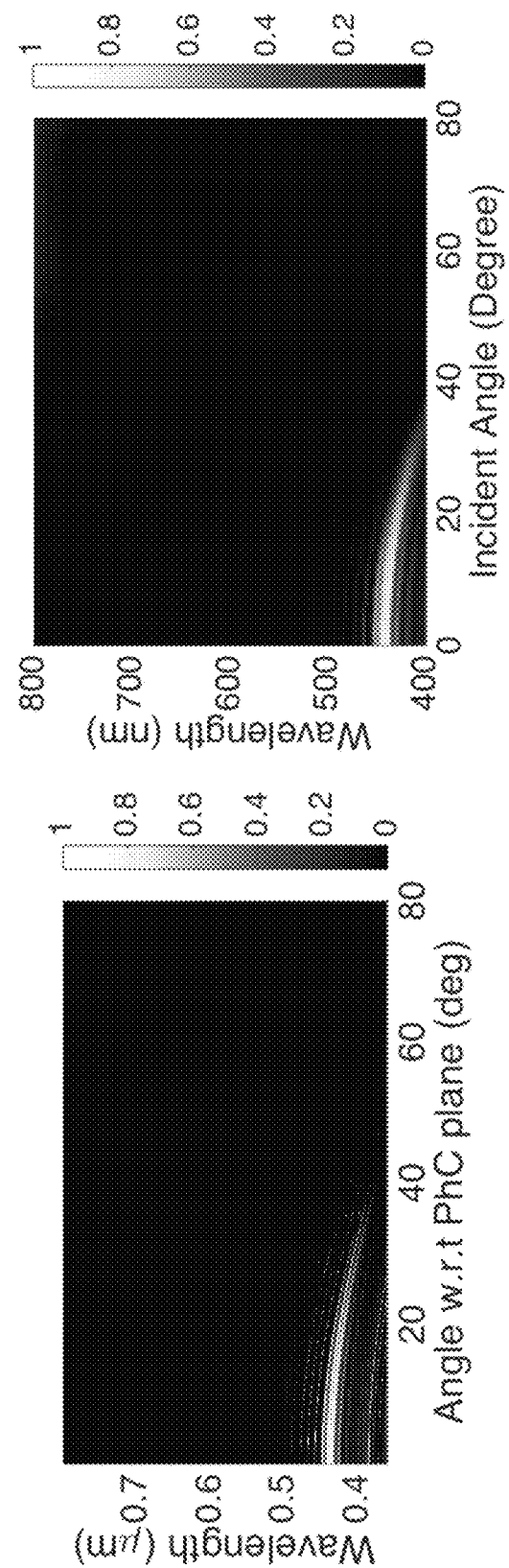

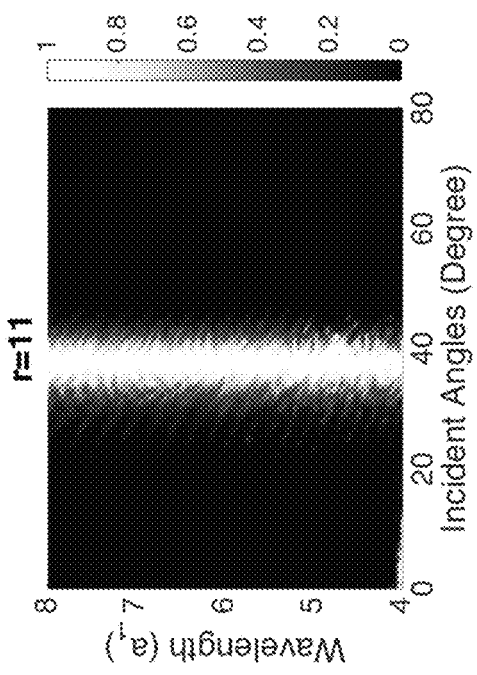
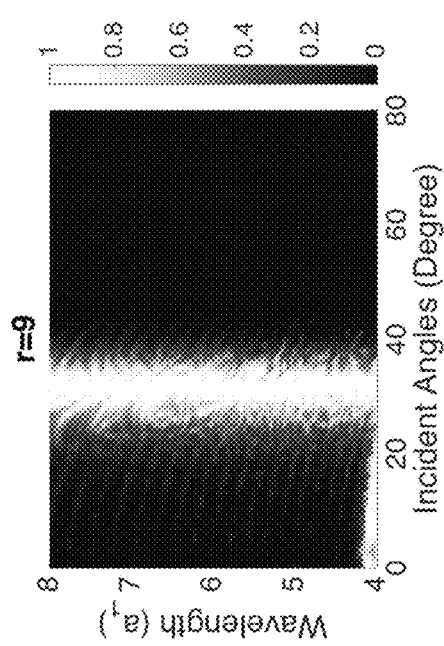
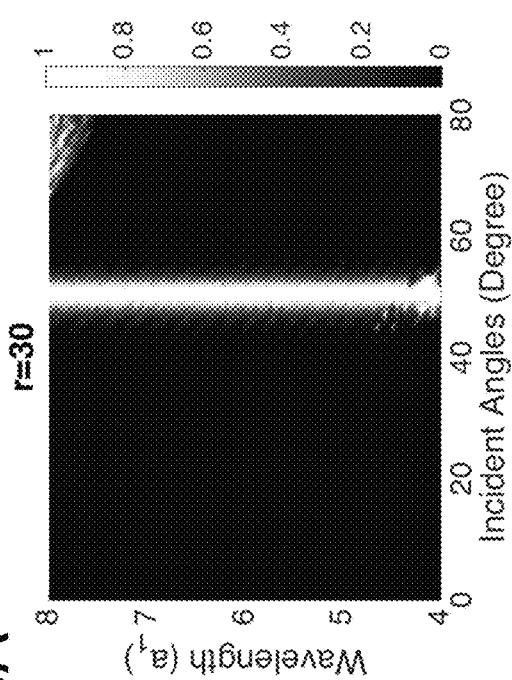
FIG. 16A
FIG. 16B
FIG. 16C

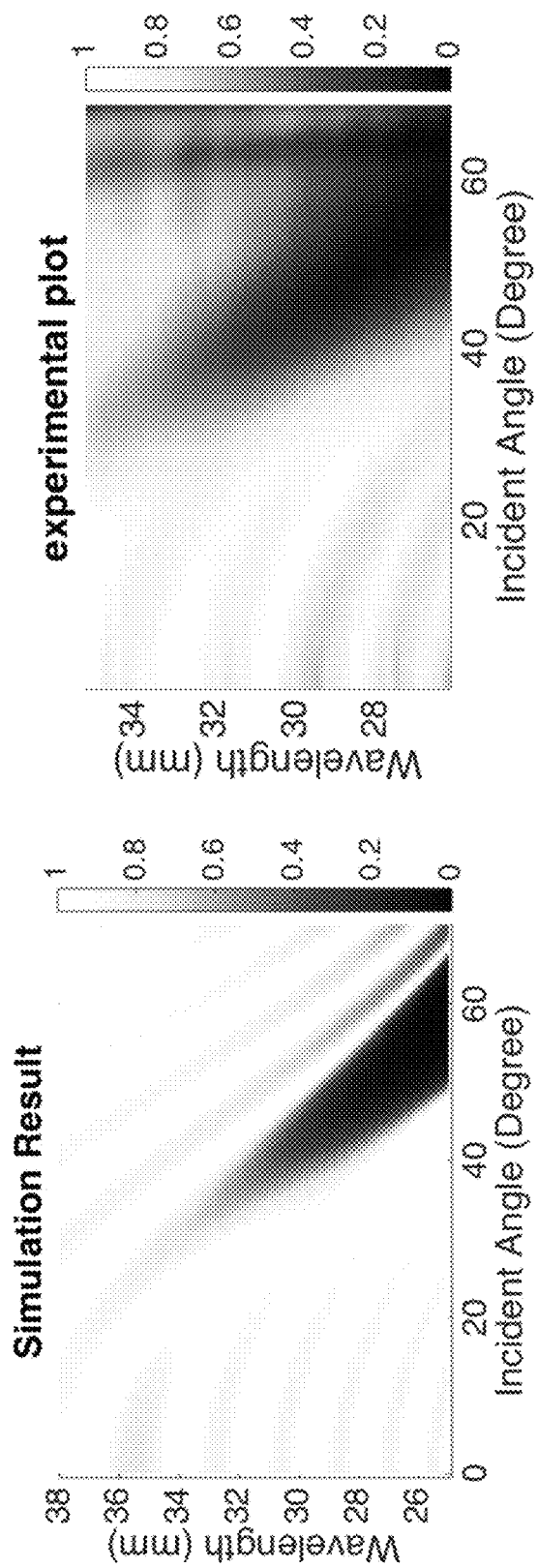

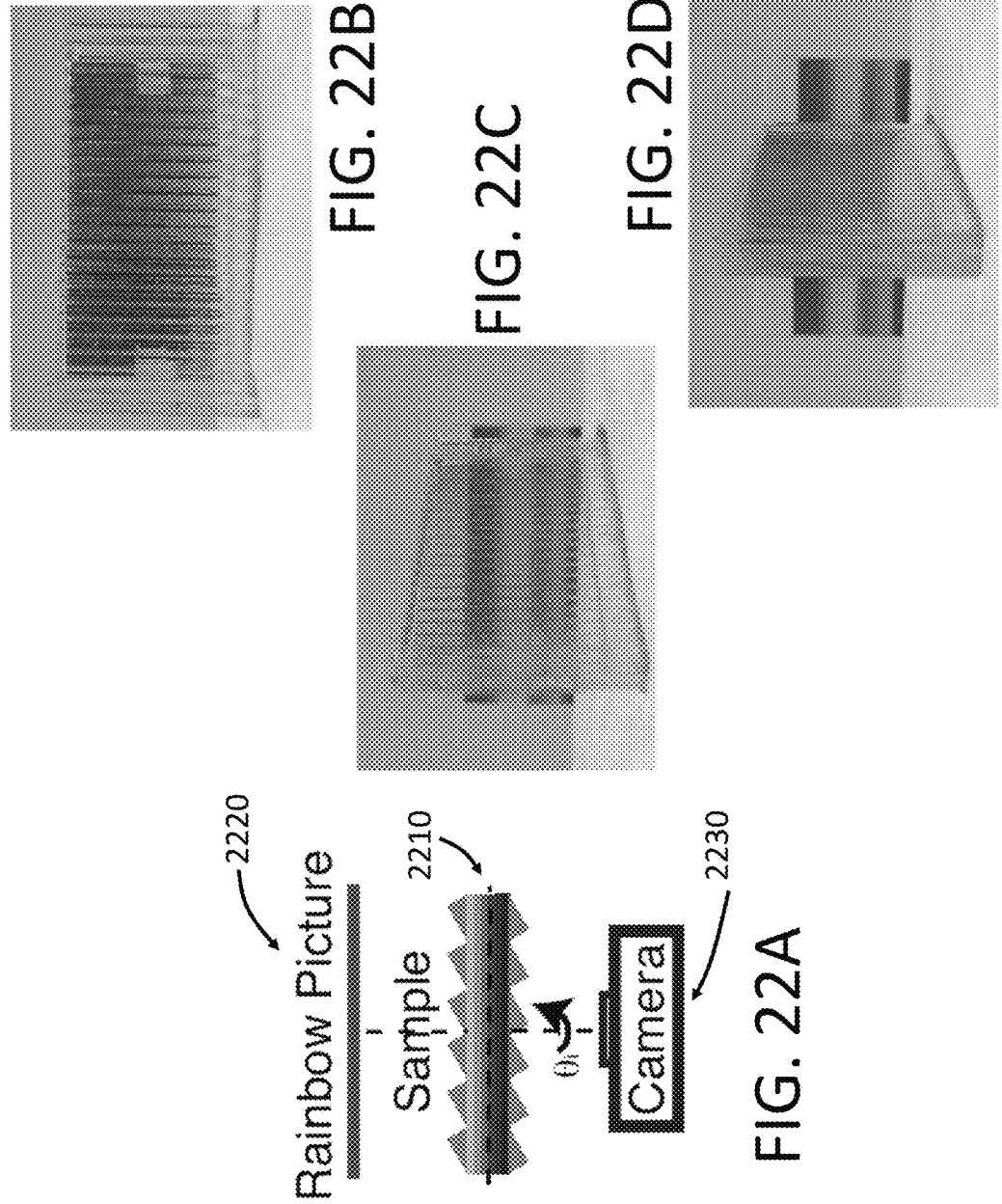

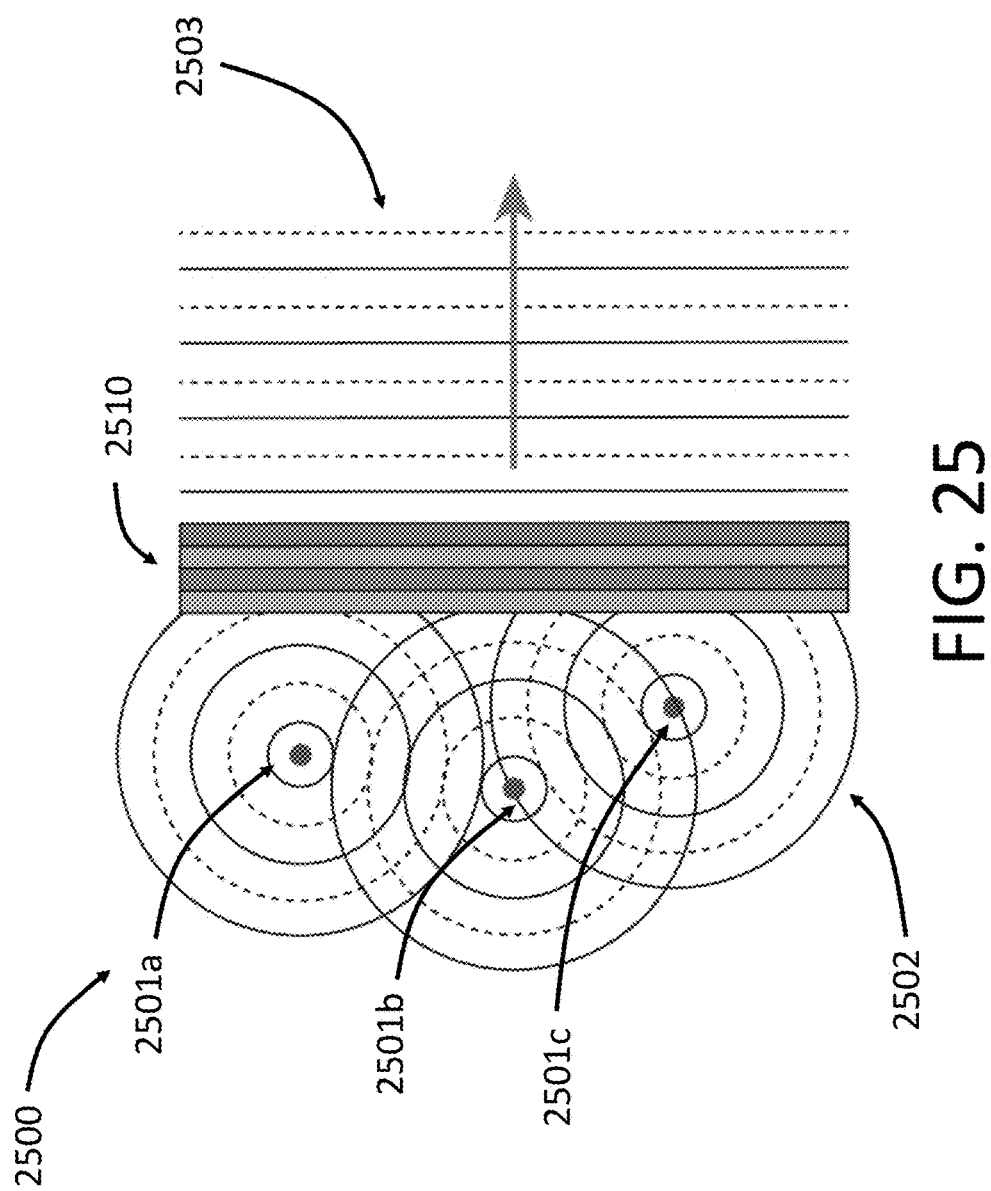

METHODS AND APPARATUS FOR BROADBAND ANGULAR SELECTIVITY OF ELECTROMAGNETIC WAVES

CROSS-REFERENCE TO RELATED PATENT APPLICATION

This application claims priority, under 35 U.S.C. § 119(e), from U.S. Application No. 61/944,100, filed Feb. 25, 2014, and entitled "Electromagnetic Wave Broadband Angular Selectivity," which application is hereby incorporated herein by reference in its entirety.

GOVERNMENT SUPPORT

This invention was made with government support under Grant Nos. DE-FG02-09ER46577 and DE-SC0001299 awarded by the Department of Energy, and Contract No. W911NF-13-D-0001 awarded by the Army Research Office. The government has certain rights in the invention."

BACKGROUND

A monochromatic electromagnetic plane wave usually can be characterized by three properties: frequency, polarization, and propagation direction. The ability to select light based on one or more of these properties can find applications in a wide range of areas. For example, frequency selection can be used in optical metrology and interferometry, optical data storage, high resolution spectroscopy, and optical fiber communication, among others. Selecting light with a particular polarization can benefit, for example, photo elastic stress analysis, 3D viewing, reflectometry, or microscopy. Angular selection, which transmits or reflects incident radiation with a particular incident angle, can potentially facilitate the development of high-efficiency solar energy conversion, privacy protection, and detectors with high signal-to-noise ratios.

SUMMARY

Embodiments of the present invention include methods and apparatus for broadband angular selectivity of electromagnetic waves. In one example, a filter transmits incident radiation at a predetermined incidence angle and reflects incident radiation at other incidence angles. This filter includes a plurality of photonic crystal structures disposed substantially along a surface normal direction of the filter. At least one of the photonic crystal structures includes a multilayer cell aligned substantially along the surface normal direction of the filter, and the multilayer cell comprises a first layer having a first dielectric permittivity and a second layer having a second dielectric permittivity different from the first dielectric permittivity. The first layer and the second layer define a Brewster angle substantially equal to the predetermined incidence angle based on the first dielectric permittivity and the second permittivity. Each photonic crystal structure in the plurality of photonic crystal structures defines a respective bandgap, and the respective bandgaps of the plurality of photonic crystal structures, taken together, cover a continuous spectral region of about 50 nm to about 100 mm.

In another example, a filter to transmit incident radiation at a predetermined incidence angle and to reflect incident radiation at other incidence angles includes a plurality of multilayer cells disposed substantially along a surface normal direction of the filter. The multilayer cell includes an isotropic sheet and an anisotropic sheet arrayed with the isotropic sheet along the surface normal direction of the filer. The anisotropic sheet comprises a first layer having a first dielectric permittivity and a second layer, arrayed with the first layer along the surface normal direction of the filter, having a second dielectric permittivity less than the first dielectric permittivity. At least one of a first thickness of the first layer or a second thickness of the second layer is less than a wavelength of the incident radiation such that incident radiation propagating through the first layer and the second layer experiences an anisotropic dielectric permittivity.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIGS. 2B and 2C show energy band diagrams of the one-dimensional photonic crystal structure of FIG. 2A.

FIGS. 3A-3C are schematic views of one-dimensional photonic crystal structure having enlarged bandgaps.

FIGS. 4C-4F are simulated transmission spectra of filters like the one shown in FIG. 3A with respect to the wavelength and incidence angle of the incident radiation.

FIGS. 6A-6F demonstrate the experiments to measure angular selectivity of a filter like the one shown in FIG. 3A.

FIGS. 7A-7D are energy band diagrams and simulated transmission spectra of filters like the one shown in FIG. 3A for s-polarized electromagnetic waves.

FIGS. 16A-16C are simulated transmission spectra of angularly selective filters with respect to the thickness ratio of the high-index layer to the low-index layer.

FIGS. 18A-18B are simulated and experimental transmission spectra of the filter shown in FIGS. 17A-17B.

FIGS. 22A-22E illustrate experiments that measure angular selectivity of filters in air.

FIG. 25 is a schematic view of an angularly selective filter used for changing wave forms from spherical waves to plane waves.

DETAILED DESCRIPTION

The ability to control the propagation of electromagnetic waves or radiation (e.g., optical light, radio frequency, or microwave) has long been pursued in both scientific and technological communities. In electromagnetic theory, a monochromatic electromagnetic plane wave can be characterized (apart from its phase and amplitude) by three properties: frequency, polarization, and propagation direction. The ability to select electromagnetic waves based on a single wave property regardless of other properties would be beneficial to achieve complete control over the propagation of electromagnetic waves.

Figure 1A:
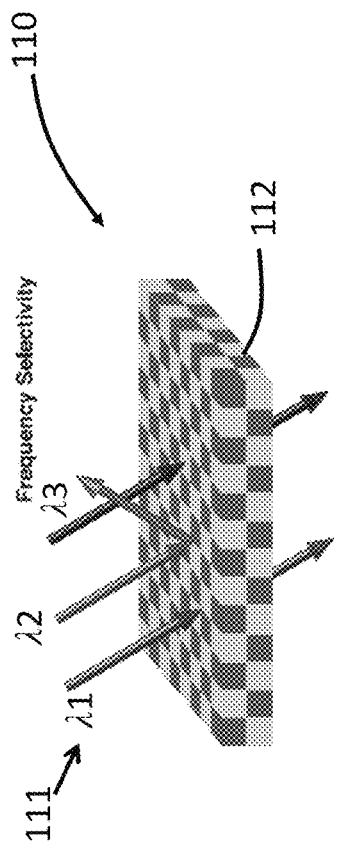
FIGS. 1A-1C illustrate selection of electromagnetic waves based on frequency, polarization, and incident angle of the waves via transmission.
Figure 1B:
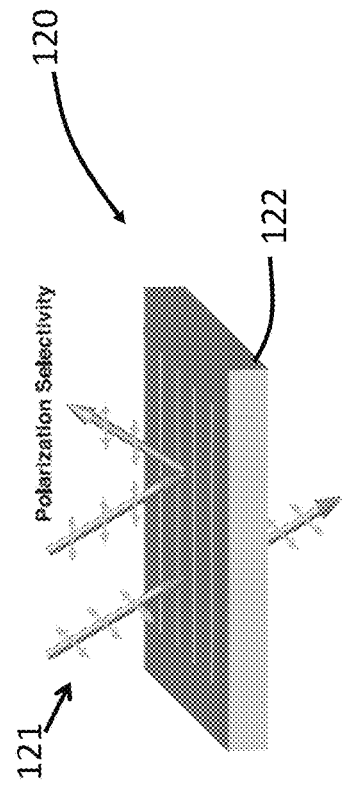
Figure 1C:
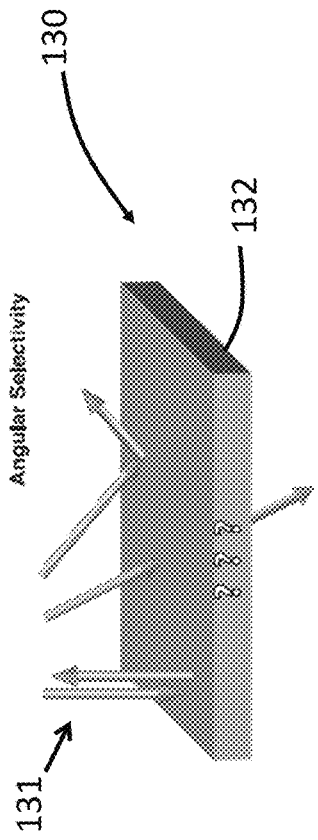

Selection of electromagnetic waves can be generally defined as separating a portion of electromagnetic waves with a desired property from other portions. The selection can be achieved by, for example, transmitting, reflecting, refracting, deflecting, or trapping the desired portion of waves. FIGS. 1A-1C illustrate the selection of electromagnetic waves based on each property of the waves via transmission, or filtering.

In FIG. 1A, electromagnetic waves are selected based on their frequencies. In this frequency selection system 110, an electromagnetic wave 111 containing several frequency or wavelength components $\lambda_1$, $\lambda_2$ and $\lambda_3$ is delivered to a filter 112, which only transmits waves at (or near) wavelength $\lambda_2$ while reflecting waves at other wavelengths. The filter 112 can be, for example, a photonic crystal with bandgaps that cover the propagation modes of the components at wavelengths $\lambda_1$ and $\lambda_3$.

FIG. 1B shows a polarization selection system 120, in which electromagnetic waves are selected based on the polarization. In this system, an electromagnetic wave 121 containing both s-polarization (perpendicular to the plane of incidence) components and p-polarization (parallel to the plane of incident) components is delivered to a filter 122, which transmits only waves at p-polarization while reflecting waves at s-polarization. The filter 122 can be, for example, a "wire grid" polarizer, or plates comprising birefringent materials.

FIG. 1C shows a system to select electromagnetic waves based on the propagation direction, also referred to as angular selection. In the system 130, electromagnetic waves 131 containing beams propagating at several different directions are irradiating a filter 132, which only transmits radiation at or near certain incidence angles. Moreover, it can be helpful to have this angular selection over both polarizations and a broad spectral range. In other words, the angular selection of radiation is purely based on the propagation direction.

Some progress has been made toward achieving broadband angular selectivity via, for example, metallic extraordinary transmission, anisotropic metamaterials, combined use of polarizers and birefringent films, and geometrical optics at micrometer scale. However, the first two methods can be difficult to realize in the optical regime, which can find applications in solar energy conversion, privacy protection and high sensitivity detectors. The other two methods normally can only work as angularly selective absorbers.

Without being bound by any particular theory, it appears that broadband angular selectivity of electromagnetic waves can benefit from three principles. First, polarized waves can transmit through materials at the Brewster angle with substantially no reflection. Second, electromagnetic waves at frequencies within a bandgap of a photonic crystal typically cannot transmit through the photonic crystal. Third, a bandgap of a photonic crystal can be broadened or widened through heterostructure, i.e. coupling photonic crystal structures of different properties (e.g., periodicity, material, feature size, dimension, configuration, etc.).

Illustration of Brewster Angle and Photonic Bandgap

Figure 2A:
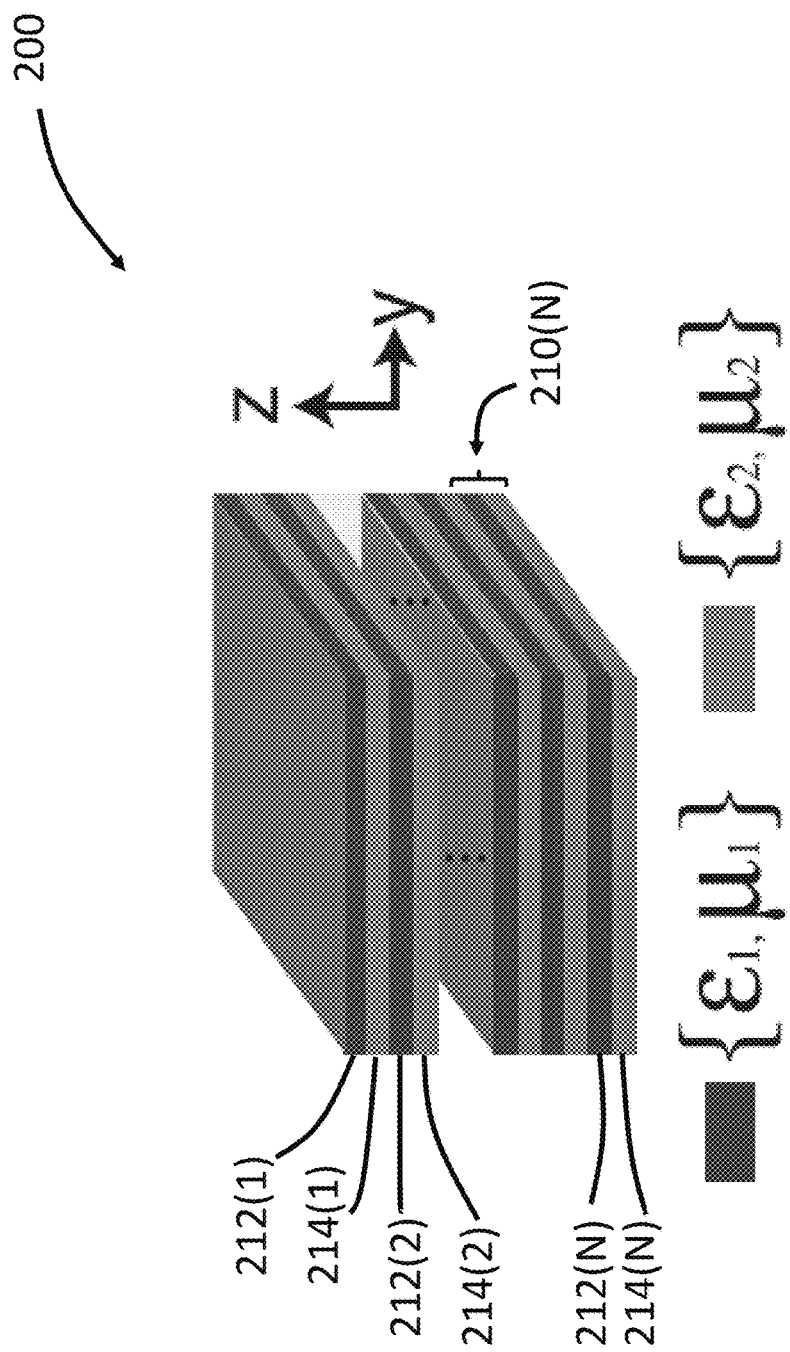
FIG. 2A is a schematic view of a one-dimensional photonic crystal structure including alternating layers of high and low index materials to achieve angular selectivity.

The principles regarding Brewster angles and bandgap in a photonic crystal can be illustrated by a one-dimensional photonic crystal structure 200 as shown in FIG. 2A. The photonic crystal structure 200 includes a plurality of first layers 212(1) to 212(N), collectively referred to as first layers 212, and a plurality of second layers 214(1) to 214(N), collectively referred to as second layers 214. The first layers 212 and the second layers 214 are stacked together in an alternate manner, i.e. one first layer 212 is sandwiched by two second layers 214, and vice versa, except the beginning and end layer. One first layer 212 and one second layer 214 form a basic cell 210 of the photonic crystal structure 200, with the cell thickness (sum thickness of one first layer and one second layer) defined as the period of the photonic crystal structure 200.

Electromagnetic properties of the first layers 212 and the second layers 214 can be characterized by two parameters:

the relative permittivity ε and the relative permeability μ, also referred to as permittivity and permeability, respectively, as readily understood in the art. The first layers have a first permittivity $\varepsilon_1$ and a first permeability $\mu_1$, and the second layers 214 have a second permittivity $\varepsilon_2$ and a second permeability $\mu_2$. The first layers 212 and the second layers 214 can be non-magnetic materials, in which case the first permeability $\mu_1$ and the second permeability $\mu_2$ are both unity, i.e., $\mu_1=\mu_2=1$. For illustrative purposes only, the first permittivity $\varepsilon_1$ can be approximately 1 (e.g., air) and the second permittivity $\varepsilon_2$ can be approximately 2 (e.g., Teflon, aluminum fluoride, Polyethylene, or Benzene). Moreover, the thickness of each layer in the first layers 212 and the second layers 214 can be a quarter of a predetermined wavelength in the materials constituting the first layers and the second layers (e.g., 300 nm to 800 nm) such that the photonic crystal structure 200 can be a quarterwave stack.

Electromagnetic waves propagating in the photonic crystal structure 200 can be subject to both reflection and transmission at each interface between a first layer 212 and a second layer 214. The reflected components and the transmitted components can be subject to another reflection and transmission upon arriving at another interface. Therefore, at any given point inside the photonic crystal structure 200, the electromagnetic field can include contributions from multiple components, which may interfere with each other. As readily understood in the art, destructive interference can lead to a suppressed or even canceled electromagnetic field, thereby preventing transmission of electromagnetic waves. The type of interference (constructive, destructive, or something in between) can depend on the frequency and incidence angle of the incident radiation. For a monochromatic plane wave at a frequency ω, only certain direction is allowed for propagation. Propagation in other directions is not allowed due to destructive interference.

Another way to illustrate the angular selection of incident electromagnetic waves in the photonic crystal structure 200 can be via the photonic band diagrams, also referred to as dispersion relationships or dispersion diagrams, as shown in FIGS. 2B-2C. A band diagram of a photonic crystal depicts the relationship between the frequency ω and the wave vector k of modes that can exist in the photonic crystal. The wave vector can include both real values and imaginary values. Accordingly, a band diagram can illustrate both propagating modes and evanescent modes. Calculation of band diagrams of photonic crystal can be carried out by numerical tools such as MIT Photonic-Bands (MPB). Some photonic crystals have band diagrams made of discrete curves, while some other photonic crystals can support more modes and the corresponding band diagrams include continuous regions such as in FIG. 2B and FIG. 2C. Modes that are allowed to propagate (also referred to as extended modes) exist in the shaded region, while the white regions (also referred to as band gaps) indicate modes that are forbidden in the photonic crystal.

In the photonic band diagrams FIG. 2B and FIG. 2C, modes with a propagation direction forming an angle $\theta_i$ with respect to the z axis as shown in FIG. 2A (in the layers with dielectric constant $\varepsilon_i$) lie on a straight line represented by:

$$\omega = k_y c/(\sqrt{\varepsilon_i}\sin\theta_i) \quad (1)$$

where $k_y$ is the y component (as defined in FIG. 2A) of the wave vector k and c is the speed of light. Normally, most straight lines starting from the origin of the band diagrams extend through both the extended mode region as well as the band gap regions. In other words, incident radiation at most incidence angles cannot propagate through the photonic crystal, at least for certain frequencies.

However, for p-polarized waves, there is a special propagation angle, known as the Brewster angle $\theta_B$, for which extended modes exist regardless of ω (dashed line in FIG. 2B and FIG. 2C). Without being bound by any theory, the Brewster angle $\theta_B$ in non-magnetic materials can be defined as:

$$\theta_B = \tan^{-1}\sqrt{\varepsilon_2/\varepsilon_1} \quad (2)$$

where $\theta_B$ is the Brewster angle in the layers with dielectric constant $\varepsilon_1$. At $\theta_B$, p-polarized light is fully transmitted for all frequencies at both interfaces (from $\varepsilon_1$ to $\varepsilon_2$ layers and from $\varepsilon_2$ to $\varepsilon_1$ layers).

FIG. 2B shows the band diagram of the photonic crystal structure 200 with $\varepsilon_1=1$ and $\varepsilon_2=2$, and $\mu_1=\mu_2=1$. The shaded region indicates modes with electric fields polarized in the yz incidence plane, i.e. p-polarized. The dashed black line corresponds to the Brewster angle $\theta_B$ in both first layers 212 and second layers 214. For s-polarized light, as there is no Brewster angle, the photonic crystal structure can behave as a dielectric mirror that reflects over a wide frequency range and over all incident angles.

The photonic crystal structure 200 with $\varepsilon_1=1$, $\varepsilon_2=2$, and $\mu_1=\mu_2=1$ can provide electromagnetic wave selection based on both propagation direction and polarization, and can be useful in many applications. For example, in optically pumped lasers, the pumping light is typically delivered with a specific polarization and at one specific incidence angle. A cavity built with both angularly selective and polarization-selective mirrors such as the photonic crystal structure 200 can allow the pumping light to propagate through, while at the same time trapping light (e.g., laser light) with other propagation directions and polarizations inside the cavity.

Impedance Matching in Photonic Crystal Structures

The dependence of transmission on the polarization state of the incident electromagnetic waves can be lifted by relaxing the conventional requirement that $\mu_1=\mu_2=1$, thereby achieving wave selection based purely on the incidence angle. For example, if the first layers have the first permittivity substantially equal to the first permeability (i.e., $\varepsilon_1=\mu_1$) and the second layers have the second permittivity substantially equal to the second permeability (i.e., $\varepsilon_2=\mu_2$), no reflection can occur at the interface between the first layers and the second layers at normal incidence because the two layer are impedance-matched.

Without being bound by any theory or mode of operation, an impedance of a material can be defined as $Z=(\mu_i\varepsilon)^{1/2}$. The off-axis reflectivity can be calculated from the generalized Fresnel equation:

$$\left(\frac{E_r}{E_i}\right)_\perp = \frac{\frac{1}{Z_i}\cos\theta_i - \frac{1}{Z_t}\cos\theta_t}{\frac{1}{Z_i}\cos\theta_i + \frac{1}{Z_t}\cos\theta_t} \quad (3)$$

$$\left(\frac{E_r}{E_i}\right)_\parallel = \frac{\frac{1}{Z_t}\cos\theta_i - \frac{1}{Z_i}\cos\theta_t}{\frac{1}{Z_t}\cos\theta_i + \frac{1}{Z_i}\cos\theta_t} \quad (4)$$

where the subscripts i and r denotes incident light and reflected light, respectively, and the subscripts ⊥ and ∥ indicate the direction of the electric field E with respect to the plane of incidence. When $Z_i=Z_t$, the reflectivity for s-polarized and p-polarized light become identical. Moreover, the Brewster angle is zero degree (normal incidence) for both polarization states.

FIG. 2C shows a band diagram of a photonic crystal structure 200 with $\varepsilon_1=1$, $\varepsilon_2=2$, $\mu_1=1$ and $\mu_2=2$ such that both the first layers 212 and the second layers 214 are impedance-matched. In this case, s-polarized light and p-polarized light have the same band diagram, thereby eliminating the dependence of transmission on the polarization state of the incident light. Moreover, the Brewster angle of the stack with impedance matching is 90°, i.e. normal incidence.

Impedance matching of materials (i.e. $\varepsilon=\mu\neq1$) can be realized through using composite materials or metamaterials. For example, ceramic ferrite/ferroelectric composite materials may be tuned to display substantially equal permittivity and permeability by doping $Ba_{1-x}Sr_xTiO_3$ or $Ba_{1-x}Sr_xTiO/MgO$ into magnesium ferrites, wherein x is greater than zero but smaller than 0.75.

Impedance matching can also be realized through metamaterials, which can be assemblies of multiple individual elements made from conventional materials such as metals or plastics. However, the conventional materials are usually constructed into repeating patterns, often with microscopic structures, thereby inducing unconventional optical, mechanical, or electromagnetic properties that are not readily available naturally occurring materials. Metamaterials derive their properties not from the compositional properties of the base materials, but from the repeating patterns, such as the shape, geometry, size, orientation and/or arrangement of the pattern. Metamaterials can achieve desired effects by incorporating structural elements of sub-wavelength sizes, i.e. features that are actually smaller than the wavelength of the waves they affect.

Without being bound by any particular theory, naturally occurring materials acquire the mechanical, optical and/or electromagnetic properties through the atoms or molecules that constitute the materials. In contrast, for metamaterial, the sum of the parts, not the parts themselves, determines how the material behaves. In other words, a metamaterial's behavior depends not only on the properties of the materials that make it up, but also on the way the materials are put together.

Broadening of Bandgaps in Photonic Crystal Structures

To improve the angular selectivity of the one-dimensional photonic crystal structure 200 shown in FIG. 2A and reduce the number of or even eliminate the extended modes shown in FIGS. 2B-2C, the bandgaps of the one-dimensional photonic crystal structure 200 can be broadened by stacking basic cells 210 of different thicknesses. Typically, for a one-dimensional photonic crystal structures with uniform periodicity as shown in FIG. 2A, the center location of the bandgap can scale proportionally to the periodicity of the stack, which can be defined as the thickness of the basic cell 210. Therefore, using various periodicities in the stack can effectively create various bandgaps, each of which has a center location and a finite width. These bandgaps, when taken together, can form a continuous spectral region that may cover a wider range, for example, from 50 nm to about 100 mm.

FIG. 3 shows an exemplary filter 300 that can transmit incident radiation at a predetermined incidence angle and reflect incident radiation at other incidence angles, according to principles described above. In general, the filter 300 comprises three levels of structures. On the first level, the filter 300 includes a plurality of photonic crystal structures 310(1) to 310(m), collectively referred to as photonic crystal structure 310, where m is the number of photonic crystal structures 310 in the filter 300. The plurality of photonic crystal structures 310 is disposed (e.g., stacked, aligned, arrayed, or sequenced, etc.) substantially along a surface normal direction of the filter 300. In other words, surfaces of the plurality of photonic crystal structures 310 are substantially parallel to each other.

On the second level, the photonic crystal structure 310 in the filter 300 includes one or more multilayer cells 311(1) to 311(n), collectively referred to as multilayer cells 311, where n is the number of multilayer cells in a photonic crystal structure 310. These multilayer cells 311 are aligned substantially the same way as the photonic crystal structures 310, i.e., they are disposed substantially along the surface normal direction of the filter 300. Note that different photonic crystal structure 310 in the filter 300 can include different numbers of multilayer cells 311.

On the third level, each multilayer cell 311 includes at least a first layer 312(n) and a second layer 314(n), where integer n designates the nth multilayer cell 311 in a certain photonic crystal structure 310 in the filter 300. Together, the multilayer cells 311(1) to 311(n) in a photonic crystal structure 310 includes a plurality of first layers 312(1) to 312(n), which are collectively referred to as the first layer 312. Similarly, the multilayer cells 311(1) to 311(n) in a photonic crystal structure 310 together include a plurality of second layers 314(1) to 314 (n), which are collectively referred to as the second layer 314.

To specify a particular layer in the filter 300, a two-dimensional vector (m, n) can be used, where m designates the mth photonic crystal and n designates the nth multilayer cell in the photonic crystal structure. For example, 312(m, n) can be referred to as the first layer in the nth multilayer cell 311 of the mth photonic crystal structure 310 in the filter 300. Moreover, from this designation convention, 312(m, n) can be readily found out to be the (m*n)th layer in the filter 300.

The first layer 312 has a first permittivity $\varepsilon_1$, and the second layer 314 has a second permittivity $\varepsilon_2$ different from the first permittivity. Due to the difference in the permittivity, the first layer 312 and the second layer 314 defines a Brewster angle $\theta_B$, which can be expressed as $\theta_B=(\varepsilon_1/\varepsilon_2)^{1/2}$ for non-magnetic materials. For magnetic materials, the expression can be modified as $\theta_B=(\mu_2\varepsilon_1/\mu_1\varepsilon_2)^{1/2}$, where $\mu_1$ and $\mu_2$ are the magnetic permeabilities of the first layer 312 and the second layer 314, respectively.

Each photonic crystal structure 310 in the filter 300 defines a respective bandgap, which can be dependent on, for example, the periodicity of the photonic crystal structure 310 and/or the permittivity of the first layers 312 and the second layers 314. Each respective band gap defines a spectral region, and radiation within this spectral region can be reflected by the photonic crystal structure 310 due to, for example, destructive interference. However, radiation at the Brewster angle defined by the permittivities of the first and second layers is not affected by the band gap, i.e., the filter transmits radiation at the Brewster angle regardless of the band gap. Each band gap also has a respective center frequency, which can be different from the other due to the different periodicities in the respective photonic crystal structure 310. These band gaps, taken together, can form a wide range, also referred to as the overall band gap of the filter 300. The overall band gap can be, for example, from a about 50 nm to about 100 mm.

The lower edge and the upper edge of the overall band gap of the filter 300 can depend on several factors. For example, the frequencies of the lower and upper edge can be determined by the absorption of the incident radiation in the materials that constitute the filter. A given material typically has different absorption at different frequencies. The lower and upper edges of the filter can be the frequencies at which the absorption becomes significant (e.g., the overall transmission through the filter drops to less than 50%).

Another factor that may affect the lower and upper edges of the overall band gap of the filter 300 can be the related to the fabrication of the filter 300. Without being bound by any particular theory, the thickness of each layer in the filter 300 is typically greater than 1/5 of a given wavelength in order for radiation at the given wavelength to experience the difference of permittivity between the first layers 312 and the second layers 314. Otherwise, if the layers are too thin (e.g., less than 1/10 of the wavelength), the radiation may not distinguish two sets of layers 312 and 314, and take the filter as an anisotropic medium according to effective medium theory. On the other hand, the thickness variation of each layer is typically less than the given wavelength for radiation at the given wavelength to experience interference in the filter, thereby allowing the establishment of bandgaps. Therefore, in a filter 300 for broadband angular selectivity, it can be desirable to have the thickness of each layer greater than 1/5 of the wavelength of the upper edge of the overall band gap, while confining the layer thickness variation (or surface roughness) within the wavelength of the lower edge of the overall bandgap. For example, for a filter to achieve angular selectivity between 50 nm and 100 mm, the thickness of each layer can be greater than 20 mm in order for radiation at 100 mm to experience different permittivity in the filter, and the surface roughness can be smaller than 50 nm in order for radiation at 50 nm to have interference. In practice, fabricating a millimeter-thick layer with nanometer scale surface roughness can be challenging and therefore can limit the lower and upper edge of the overall bandgap of the filter 300.

A third factor that may influence the lower and upper edge of the overall bandgap of the filter 300 relates to the temporal coherence of incident light. Temporal coherence of a monochromatic wave can be defined as the distance through which the monochromatic wave remains coherent. Therefore, it can be helpful to set the total thickness of the angular selective filter 300 not larger than the coherence length of the incident light.

Figure 3A:
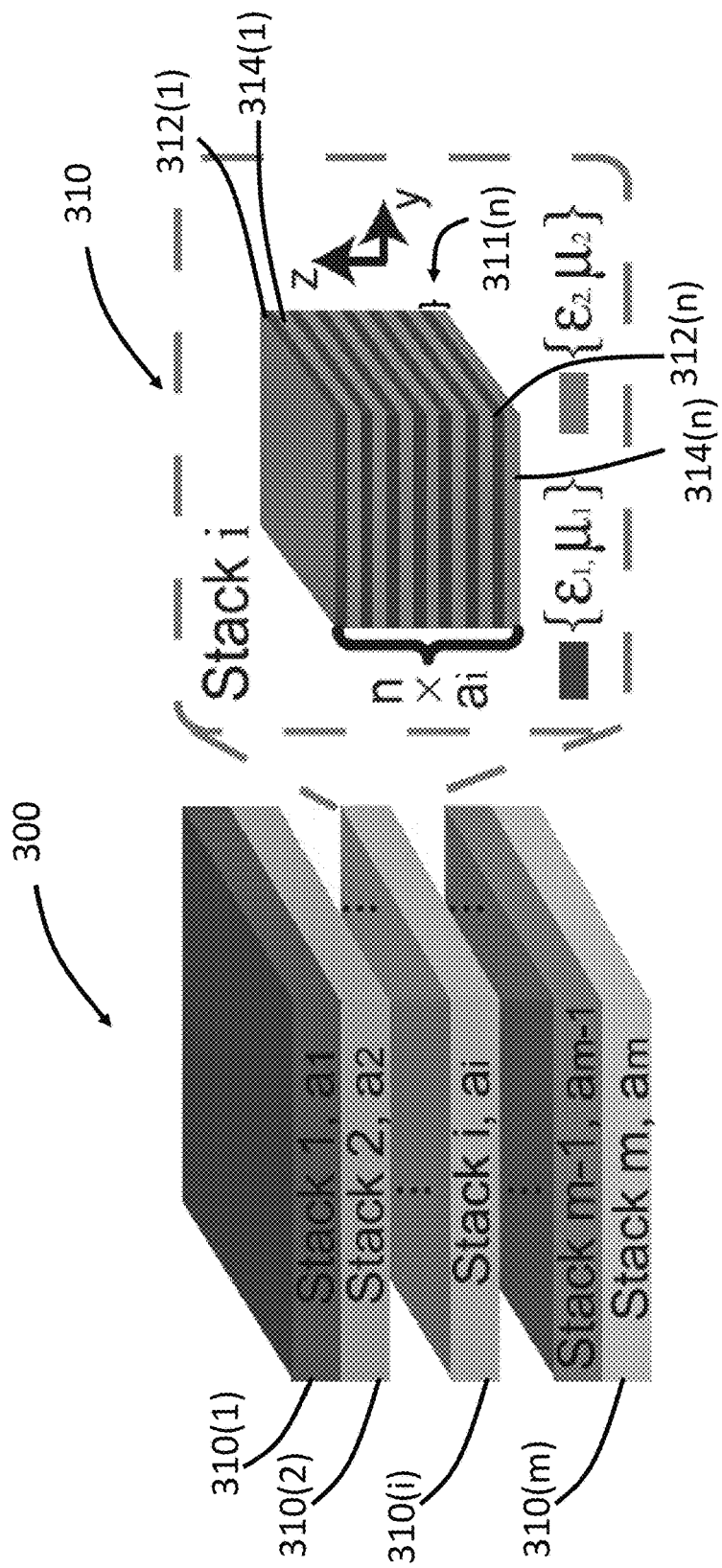

The band gap of each photonic crystal structure 310 in the filter 300 can be varied by the periodicity of the photonic crystal structure 310, or the thickness of each basic cell 311, so as to form the wide range overall bandgap and achieve broadband angular selectivity. As shown in FIG. 3A, each photonic crystal structure 310(1) to 310(m) has a respective periodicity $a_1$ to $a_m$, which can form a sequence, such as a geometric sequence or an arithmetic sequence.

In one example, the periodicities $a_1$ to $a_m$ form a geometric sequence, in which the ith periodicity satisfies $a_i = a_1 q^{i-1}$, where i is an integer and q is the geometric factor in the sequence. The resulting bandgap can be determined by the first periodicity $a_1$, the total number of periodicities m in the filter 300, and the geometric factor q. The first periodicity $a_1$ can be, for example, about 100 nm to about 150 nm. The total number of periodicities m in the sequence can be greater than 200, greater than 1000, or greater than 2000, depending on, for example, the fabrication methods. The geometric factor q can determine the speed at which the periodicities approach a large value that can be challenging to realize in fabrication. The geometric factor q can be greater than 1, greater than 1.05, or greater than 1.1 so as to increase the periodicity with respect to the index i. Alternatively, the geometric factor q can be smaller than 1, in which case the first periodicity $a_1$ can be, for example, about 40 mm so as to cover a broadband region for the resulting bandgap. The geometric factor q can also determine the spacing of periodicities between adjacent photonic crystal structures, thereby determining the degree of overlapping between the resulting bandgaps of the adjacent photonic crystal structures. In practice, it can be helpful to form a continuous overall bandgap so as to achieve broadband angular selectivity. Accordingly, it can be helpful in practice to choose the geometric factor q such that bandgaps of adjacent photonic crystal structures are at least partially overlapping.

It is worth noting that photonic crystal structures, including the filter 300 shown in FIG. 3A, are typically scalable. To be more specific, if a first photonic crystal structure having a pattern with a feature size a (e.g., the periodicity) displays certain properties (e.g., angular selectivity, total transmission, etc.) for radiation at a wavelength λ. Then a second photonic crystal structure having the same pattern but with an enlarged feature size 2a would display the same properties for radiation at a wavelength 2λ.

Based on this scalability, it can be convenient to form a continuous overall bandgap by using a geometric sequence of periodicities with appropriate geometric factor q. For example, if the bandgap of the first photonic crystal structure with a periodicity of $a_1$ has a first bandgap from $\lambda_1$ to $\lambda_2$, then the geometric factor q can be chosen as $q = \lambda_2/\lambda_1$, such that the second bandgap of the second photonic crystal structure having a periodicity $a_2 = qa_1$ can be from $q\lambda_1$ to $q\lambda_2$, i.e., $\lambda_2$ to $q\lambda_2$, thereby forming a continuous spectral region with the first bandgap. By repeating the above process, a filter 300 covering a wide range in the electromagnetic spectrum can be constructed. In practice, the geometric factor q can also be smaller than $\lambda_2/\lambda_1$ such that adjacent bandgaps can have certain overlapping. Alternatively, the geometric factor q can also be substantially equal to greater than $\lambda_1/\lambda_2$, in which case the periodicity can start from the largest value in the sequence.

In another example, the periodicities $a_1$ to $a_m$ can form an arithmetic sequence, in which the ith periodicity satisfies $a_i = a_1 + (i-1)a_0$, where i is an integer between 1 and 2000 and $a_0$ is the difference between adjacent photonic crystal structures. The difference $a_0$ can be either positive or negative, corresponding to an increasing sequence and a decreasing sequence, respectively.

The overall bandgap of the filter 300 can be either broadband or narrowband depending on the specific application. In one example, the filter 300 can be used in privacy protection, in which the overall bandgap of the filter 300 can be limited in the optical region (e.g., 300 nm-70 nm). In another example, the filter 300 can be used in solar cells to trap more sunlight in the cell so as to improve light-to-electricity conversion efficiency. In this case, the overall bandgap of the filter 300 can be limited to the visible and near infrared region of the electromagnetic spectrum (e.g., 300 nm-3 μm). In a third example, when the filter 300 is used in radars, the overall bandgap can be limited to radio frequencies (e.g., 20 mm-200 mm). Focusing the overall bandgap within a particular spectral region can, in practice, reduce the number of layers in the filter and therefore reduce manufacturing costs and complexities.

Each photonic crystal structure 310 in the filter 300 includes one or more multilayer cells 311. In one example, each photonic crystal structure 310 can include only one multilayer cell 311. In another example, each photonic crystal structure 310 can include multiple multilayer cells 311. The number of multilayer cells 311 in the photonic crystal structure can be, for example, greater than 5, greater than 15, or greater than 30. Typically, a larger number of multilayer cells 311 in the photonic crystal structure 310 may define a clearer bandgap, i.e. the edge of the resulting bandgap is sharper.

Each multilayer cell 311 includes at least a first layer 312 and a second layer 314, with a first permittivity $\varepsilon_1$ and a second permittivity $\varepsilon_2$, respectively. The first permittivity and the second permittivity define a Brewster angle at the interfaces of the two layers. In general, the permittivity of the first layers 312 and the second layers 314 can be in a broad range, for example, from about 1 to about 5. In practice, it may be desirable to have a large contrast between the permittivity of the two sets of layers 312 and 314 so as to achieve a nontrivial Brewster angle. Accordingly, the smaller permittivity can be from about 1 to about 3, while the larger permittivity can be from about 3 to about 5. The larger permittivity can be further increased provided that radiation in the materials with large permittivity is still substantially free of loss.

In one example, as shown in FIG. 3A, the first layers 312 comprise the same material in all of the photonic crystal structures 310. Similarly, the second layers 314 also comprise the same material in all of the photonic crystal structures 310. In another example, first or second layers 312 in different photonic crystal structures 310 may comprise different materials. For example, in a first photonic crystal structure 310(1) in the filter 300, the first layers 312 and second layers 314 can have permittivity $\varepsilon_1$ and $\varepsilon_2$, respectively. In a second photonic crystal structure 310(2) in the same filter 300, the first layers 312 and second layers 314 can have permittivity $\varepsilon_3$ and $\varepsilon_4$, respectively, provided that the ratio of the two permittivities maintains substantially the same so as to have a uniform Brewster angle throughout different photonic crystal structures. One or more couplers may be used to couple radiation from one photonic crystal structure to another.

Figure 3B:
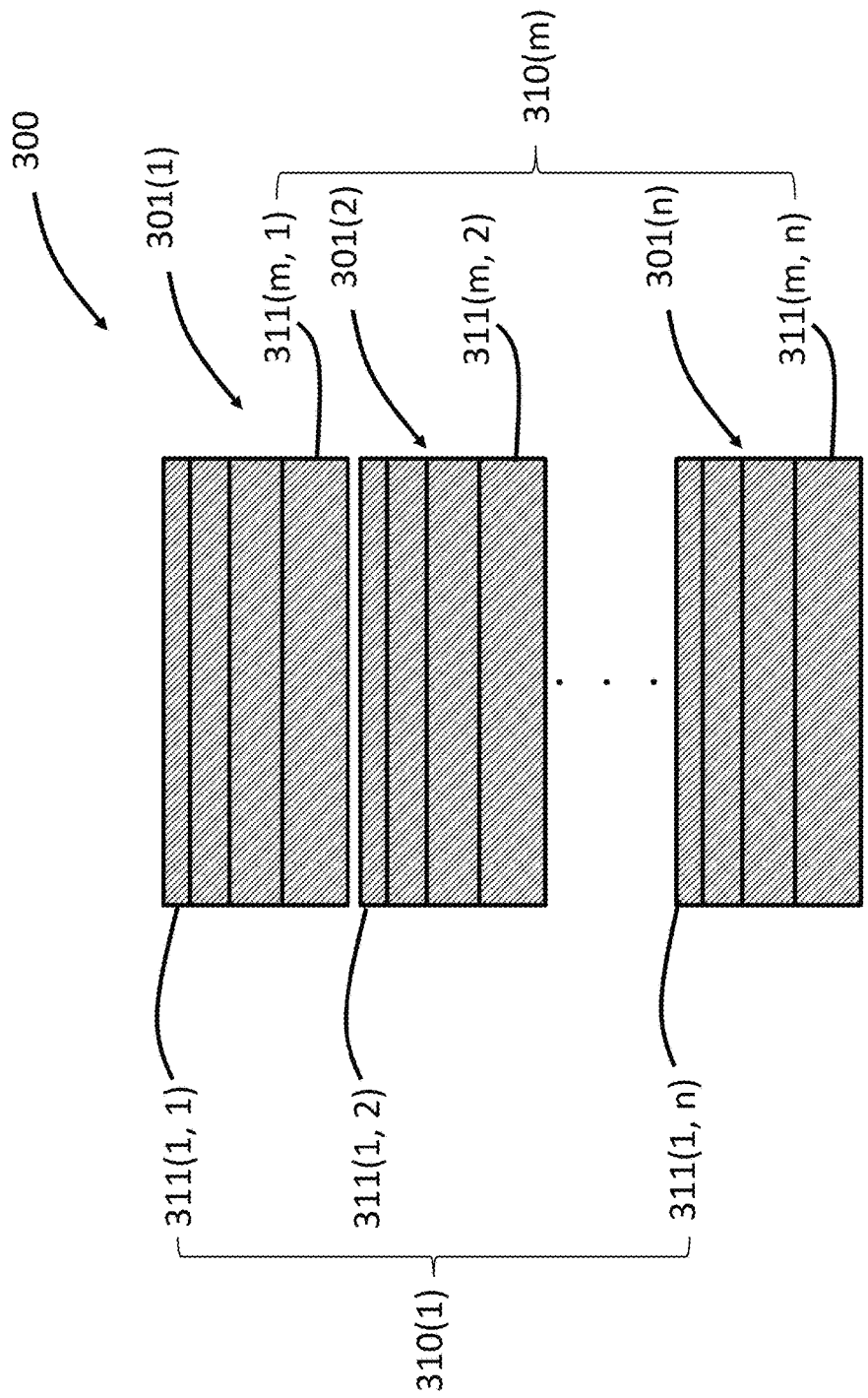

FIG. 3B shows a schematic view of another exemplary filter 300, in which a plurality of multilayer cells 311 of different thickness is stacked in an alternating manner. To designate each multilayer cell 311, the two-dimensional vector as described before can be used. For example, the multilayer cell 311(1, 2) can refer to the second multilayer cell in the first photonic crystal structure 310(1) of the filter 300. From this designation system, it can be seen that the plurality of multilayer cells 311(1, 1) to 311(1, n) can form a first photonic crystal structure 310(1), although those multilayer cells are not in physical contact with each other. Similarly, the plurality of multilayer cells 311(m, 1) to 311(m, n) can form the mth photonic crystal structure 310(m). The total number of multilayer cells 311 can be the same as the filter shown in FIG. 3A, but the stacking can be achieved in a different way. In the filter 300 shown in FIG. 3B, the plurality of multilayer cells 311(1, 1) to 311(m, 1) forms a stack 301(1), in which each multilayer cell has a different thickness. Similarly, the plurality of multilayer cells 311(1, n) to 311 (m, n) forms another stack 301(n). In practice, it may be helpful to pre-form each stack 301, which can determine the overall bandgap of the filter comprising these stacks. Then the angular width of the incidence angles at which radiation can be transmitted can be tuned to a desired value by adjusting the number of stacks n in the filter 300. Typically, larger number of stacks can result in narrower angular width (e.g. as shown in FIGS. 4A-4F).

FIG. 3C shows a schematic view of another exemplary filter 300, in which the surface of the photonic crystal structures 310 is tilted. In other words, the surface normal direction 1 of the filter 300 has a non-zero angle with respect to a longitudinal axis 2 of the filter 300. In practice, this configuration may be helpful in coupling incident radiation into the filter 300 without rotating the entire filter 300.

Angularly Selective Filters with Isotropic Layers

Figure 4B:
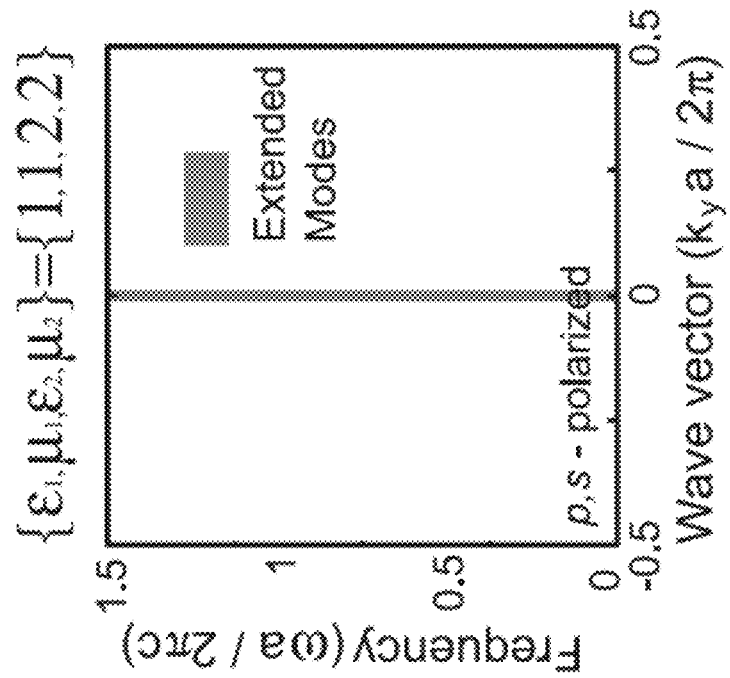
FIGS. 4A-4B show exemplary energy band diagrams of photonic crystal structures like those shown in FIGS. 3A-3C.
Figure 4A:
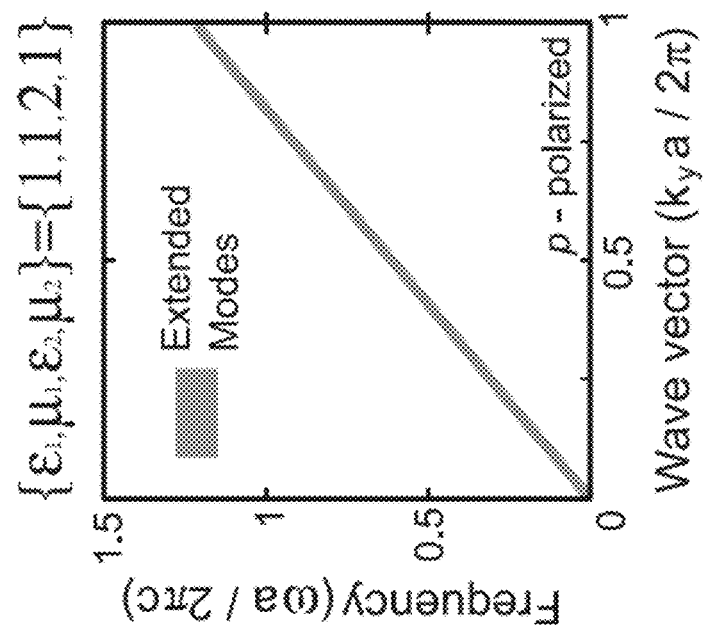

FIG. 4A shows a photonic band diagram of a filter like the one shown in FIG. 3A for p-polarized radiation, where the permittivity of the first layers 312 is 1 and the permittivity of the second layers 314 is 2. The magnetic permeability of the two sets of layers 312 and 314 are both 1, i.e., non-magnetic materials. The number of multilayer cells in the filter is approaching infinity for illustrative purposes. It can be seen that the all extended modes are eliminated. Only those modes along the solid line that indicates the Brewster angle can propagate through the filter. In other words, only radiation at the Brewster angle can propagate through the filter, while radiation at other incidence angles is blocked.

FIG. 4B shows a photonic band diagram of a filter like the one shown in FIG. 3A for both p-polarized and s-polarized radiation, where the first layers 312 and the second layers 314 are impedance-matched ($\varepsilon_1=\mu_1=1$, and $\varepsilon_2=\mu_2=2$). In this case, the filter displays the same band diagram for the p-polarized radiation and the s-polarized radiation, thereby eliminating polarization dependence of the transmission. It can be seen from FIG. 4B that only modes with an incidence angle at the Brewster angle (normal incidence in this example as indicated by the vertical line in the graph) can propagate through the filter.

Figure 4D:
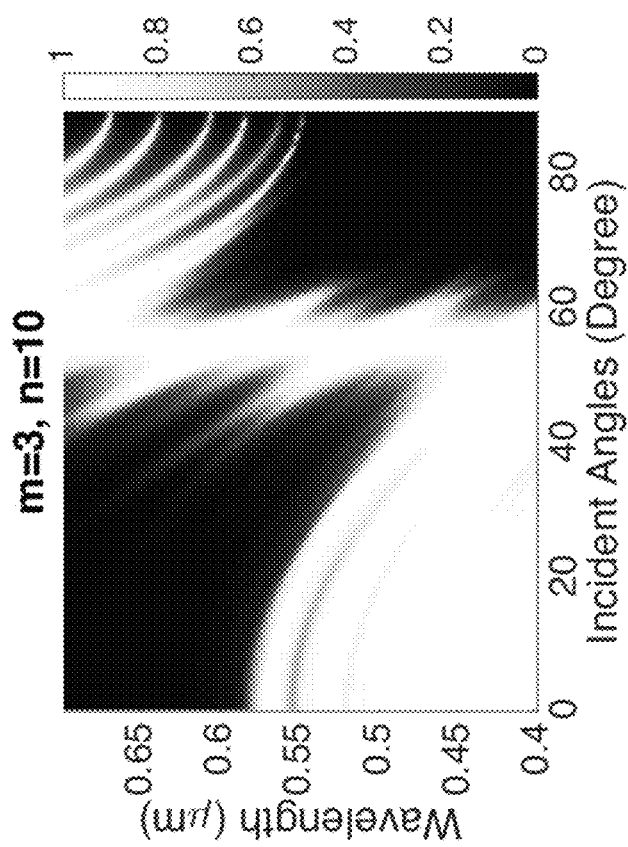
Figure 4C:
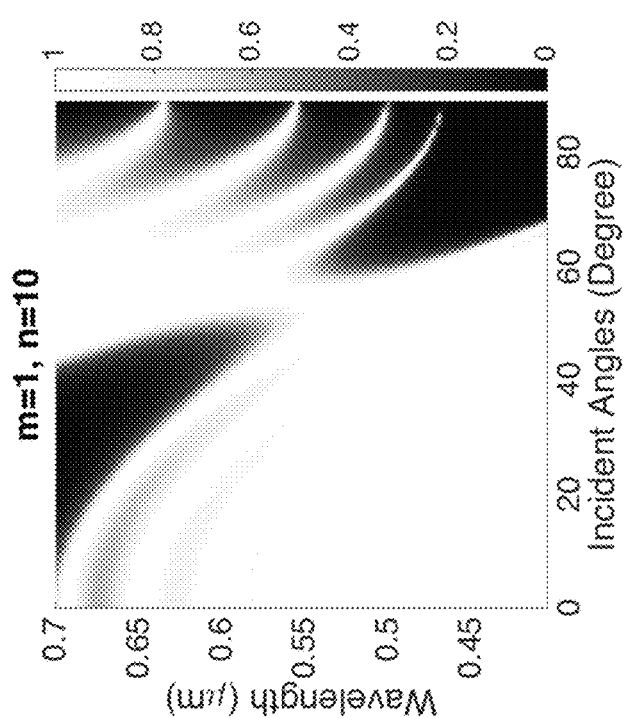

FIGS. 4C-4E show simulated transmission spectrum of a filter like the one shown in FIG. 3A with respect to the wavelength and incidence angle of the incident radiation. The first permittivity and the second permittivity are set to be 1 and 2, respectively. These three spectra also illustrate the effect induced by varying the number of layers in the filter. FIG. 4C shows a simulated transmission spectrum for a filter with only one photonic crystal structure, which further includes 10 multilayer cells and has a periodicity of $a_1=340$ nm. This simple stack shows certain degree of angular selectivity. For example, radiation at wavelengths around 650 nm (0.65 μm) may only propagate through the filter when the incidence angle is between 50 degrees and 80 degrees.

FIG. 4D shows simulated transmission spectrum when the number of photonic crystal structures is increased to 3. The periodicities of the photonic crystal structures are 280 nm, 335 nm, and 400 nm, respectively. Each of the three photonic crystal structure includes 10 multilayer cells. It can be seen that the angular selectively of this filter is noticeably improved. For example, radiation at wavelengths around 600 nm can only propagate through the filter when the incidence angle is between about 50 degrees and 60 degrees.

In FIG. 4E, the number of photonic crystal structures is increased to 50, with each photonic crystal structure containing 10 multilayer cells. The periodicities of these photonic crystal structures form a geometric series $a_1=a_0q^{i-1}$ with $a_0=200$ nm and $q=1.0212$, where $a_i$ is the periodicity of ith photonic crystal structure. Radiation in a broadband region, from 400 nm to 700 nm, can only propagate through the filter when the incidence angle is around 55 degrees. Moreover, the angular width of the transmission spectrum is less than 2 degrees. And the frequency bandwidth of the filter is greater than 54%, similar to the size of the visible region in the electromagnetic spectrum. FIGS. 4C-4 E, taken together, also show that increasing the number of photonic crystal structures, or more precisely increasing the number of periodicities, can improve the angular selectivity of the resulting filter.

FIG. 4F shows a simulated transmission spectrum of a filter like the one shown in FIG. 3A, when the first layers and second layers are impedance matched ($\varepsilon_1=\mu_1=1$, and $\varepsilon_2=\mu_2=2$). The periodicities of these photonic crystal structures form a geometric series $a_i=a_0 q^{i-1}$ with $a_0=140$ nm and $q=1.0164$, where $a_i$ is the periodicity of ith photonic crystal structure. As described above, impedance-matched filters display identical optical properties to p-polarized and s-polarized light, and the corresponding Brewster angle is 0 degree, i.e. normal incidence angle. This can be confirmed in FIG. 4F, which shows that only radiation with incidence angle less than 20 degrees can propagate through the filter.

Figures 5A, 5B:
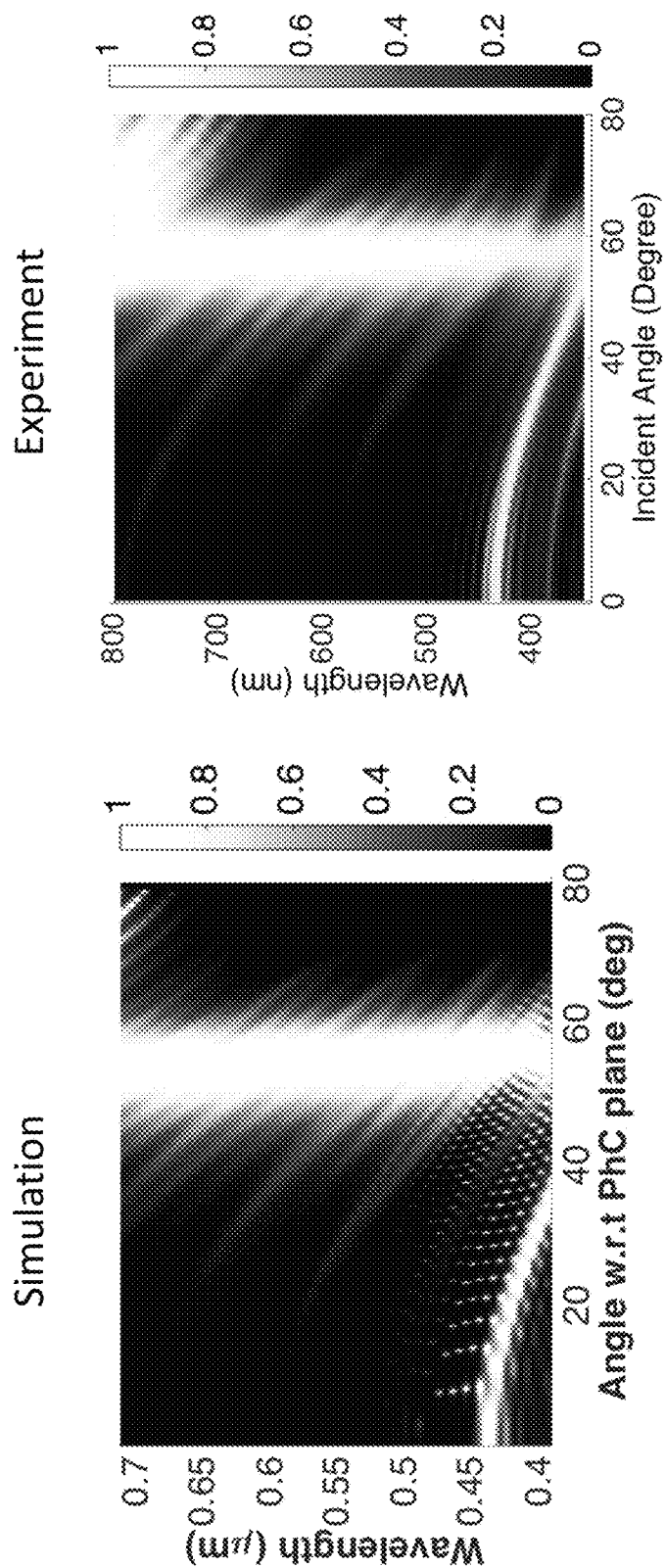
FIGS. 5A-5B are simulated and experimental spectra of filters like the ones shown in FIG. 3A.

FIGS. 5A-5B show a comparison of transmission spectra from numerical simulation and experiment. The experimental sample filter is fabricated via the Bias Target Deposition (BTD) technique to deposit, alternatingly, $SiO_2$ ($\varepsilon_1\approx2.18$, $\mu_1=1$) as the first layer and $Ta_2O_5$ ($\varepsilon_1\approx4.33$, $\mu_1=1$) as the second layer. A 2 cm×4 cm fused silica wafer (University-Wafer Inc.) is used as the substrate for the deposition process. The resulting filter includes 6 photonic crystal structures with the periodicities forming a geometric sequence $a_i=a_0 q^{i-1}$ with $a_0=140$ nm and $q=1.165$. Each photonic crystal structure contains 7 multilayer cells, and each multilayer cell includes a first layer and a second layer as described above. The p-polarization transmittance of the sample filter in the visible spectrum was measured using an ultraviolet visible spectrophotometer (Cary 500i). A p-polarizer is used to filter the source beam. A filter of the same parameters is simulated using the rigorous coupled wave analysis (RCWA) for comparison.

FIG. 5A shows the simulated results, in which radiation between 400 nm and 700 nm can only propagate through at incidence angle close to 55 degrees. The experimental results, as shown in FIG. 5B, agree well with the simulated results. In the experimental measurements, the peak transmittance of incident radiation at the Brewster angle decreases as the wavelength goes shorter. This may be attributed to the fact that the shorter wavelength is getting closer to the dimensional tolerance of fabrication.

Figure 6C:
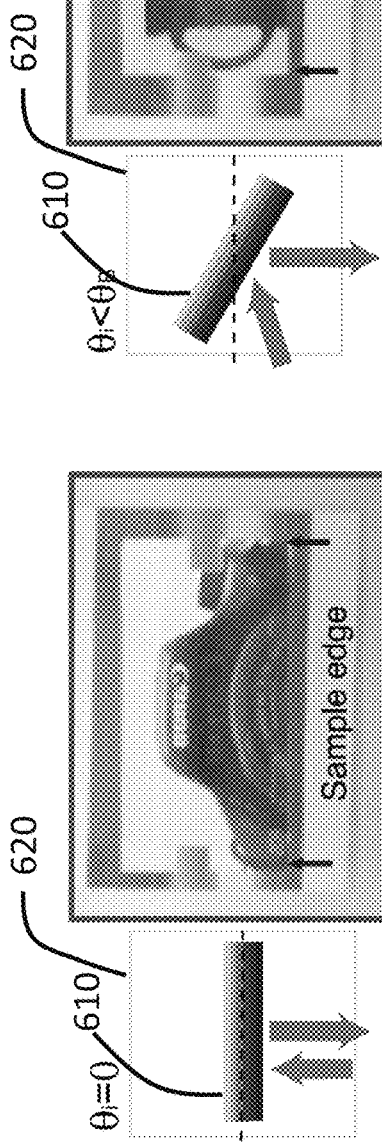

FIGS. 6A-6F illustrate an experiment that demonstrate the angular selectivity of the sample filter described above in the visible light region. The schematic setup of the experiment is shown in FIG. 6A. The sample filter 610 is placed between a rainbow picture 630 having color strips and a camera 640. Rotating the sample 610 can adjust the incidence angle of light reflected from the rainbow picture 630, thereby allowing investigation of the angular selectivity of the sample 610 by monitoring what is recorded in the camera 640. A figurine 650 and two cups 660 are placed at different angular positions with respect to the camera 640 to further demonstrate the angular selectivity of the sample 610. For index-matching purposes, the whole sample 610 is immersed into a colorless liquid 620 with dielectric permittivity around 2.18 (Cargille Labs), as shown in FIG. 6B.

Figure 6D:
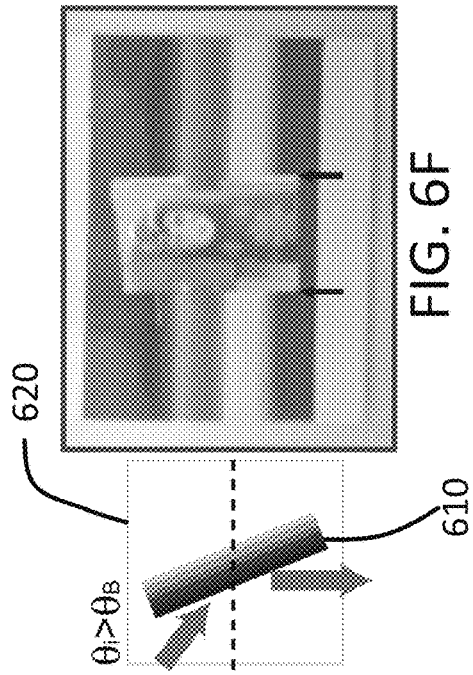
Figure 6E:
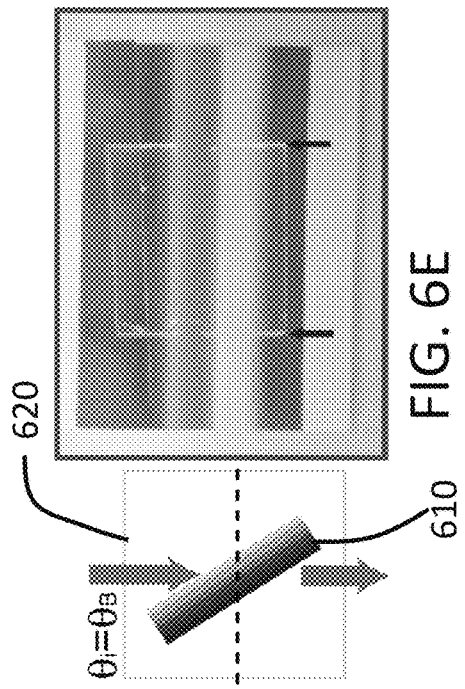
Figure 6F:
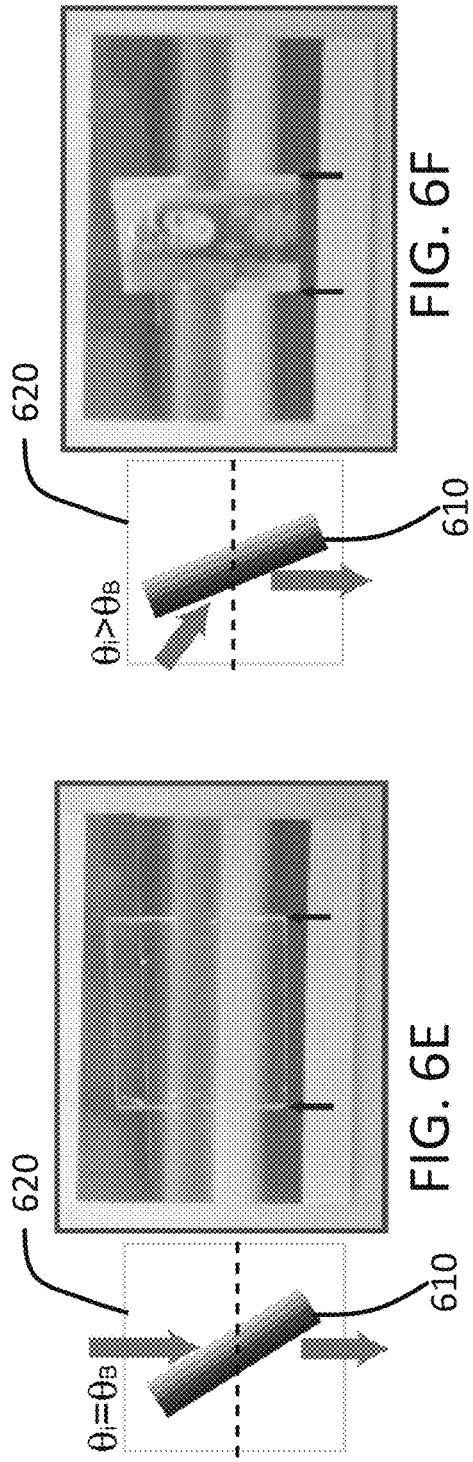

FIGS. 6C-6F show pictures recorded by the camera for different angles of the sample filter. At 0 degree, when the filter is perpendicular to the axis connecting the rainbow picture and the camera, the sample filter acts like a mirror and what is recorded in the camera is an image of the camera itself. At angles smaller than the Brewster angle, as shown in FIG. 6D, the sample filter still acts like a mirror, generating an image of the two cups. Similarly, at angles greater than the Brewster angle, as shown in FIG. 6F, images of the figurine are observed. Only at the Brewster angle, as shown in FIG. 6E, can image of the rainbow picture be recorded in the camera, demonstrating that visible light can only propagate through the sample filter at the Brewster angle, which is around 55 degrees. Moreover, at the Brewster angle, the sample has a transmission of up to 98% to p-polarized incident light. The angular window of transparency, or the angular width, is about 8 degrees.

The above demonstration shows angular selectivity of the sample filter mostly for p-polarized light, except for filters with impedance matching, in which case the filter can have angular selectivity for s-polarized light at normal incidence. For filters without impedance matching, as there is no Brewster angle for s-polarized light, the filter can behave as a dielectric mirror that reflects over a wide frequency range and over all incident angles, as shown in FIG. 7A-7D. FIG. 7A shows extended modes for on-axis propagation vectors $(0; k_x; k_z)$ in a quarter-wave stack with two materials having dielectric permittivity $\varepsilon_1=1$ and $\varepsilon_2=2$, respectively. In FIG. 7A, it can be difficult to draw a straight line starting from the origin without encountering any bandgap (white region), indicating that no Brewster angle exists for s-polarized light. FIG. 7B shows transmission spectrum of the filter used in FIG. 4E, but for s-polarized light. The filter basically reflects all the incident radiation, effectively functioning as a mirror. FIG. 7C and FIG. 7D show simulated and experimental transmission spectra, respectively, of the filter used in FIG. 5A and FIG. 5B for s-polarized light. Again, almost no angular selectivity is observed.

Parameters (e.g., periodicity, thickness of each layer, etc.) of the filter can be adjusted using the minimum of the total transmitted power over all the angles in the visible region as the figure of merit (FOM) to further improve the angular selectivity. Given the dielectric constant of the materials, incoming light at the Brewster's angle can have 100% transmission. Therefore, a smaller total transmitted power can correspond to a narrower window of angular transparency, i.e. better angular selectivity.

Figure 8B:
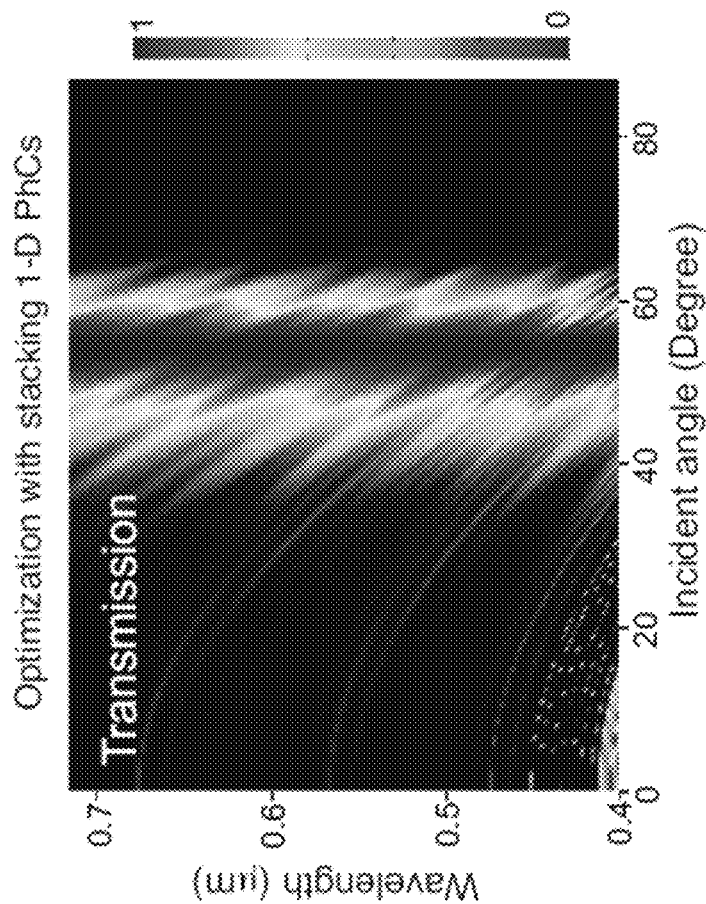
FIGS. 8A-10B illustrate approaches to improve angular selectivity of filters like the one shown in FIG. 3A.
Figure 8A:
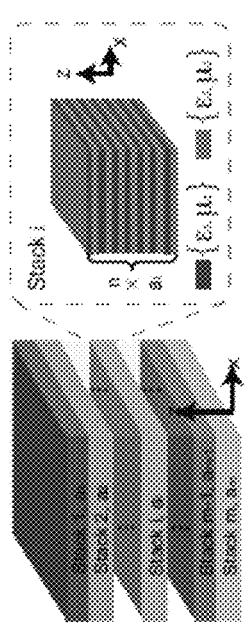

FIGS. 8-10 show the tuning of filter parameters to achieve angular selectivity. For each set of figures, the total number of layers is set to be 100, and the material properties are set to be $\varepsilon_1=1$, $\varepsilon_2=2$, and $\mu_1=\mu_2=1$. FIG. 8A shows a schematic view of a filter like the one shown in FIG. 3A. The filter includes 5 photonic crystal structures, each of which has a different periodicity (200, 259, 335, 433, and 560 nm, respectively). Each photonic crystal structure has 10 multilayer cells, and each multilayer cell has a first layer and a second layer. The corresponding transmission spectrum is shown in FIG. 8B. Using numerical tools, the periodicity of each photonic crystal can be calculated such that the total transmission reaches a minimum.

Figures 9A, 9B:
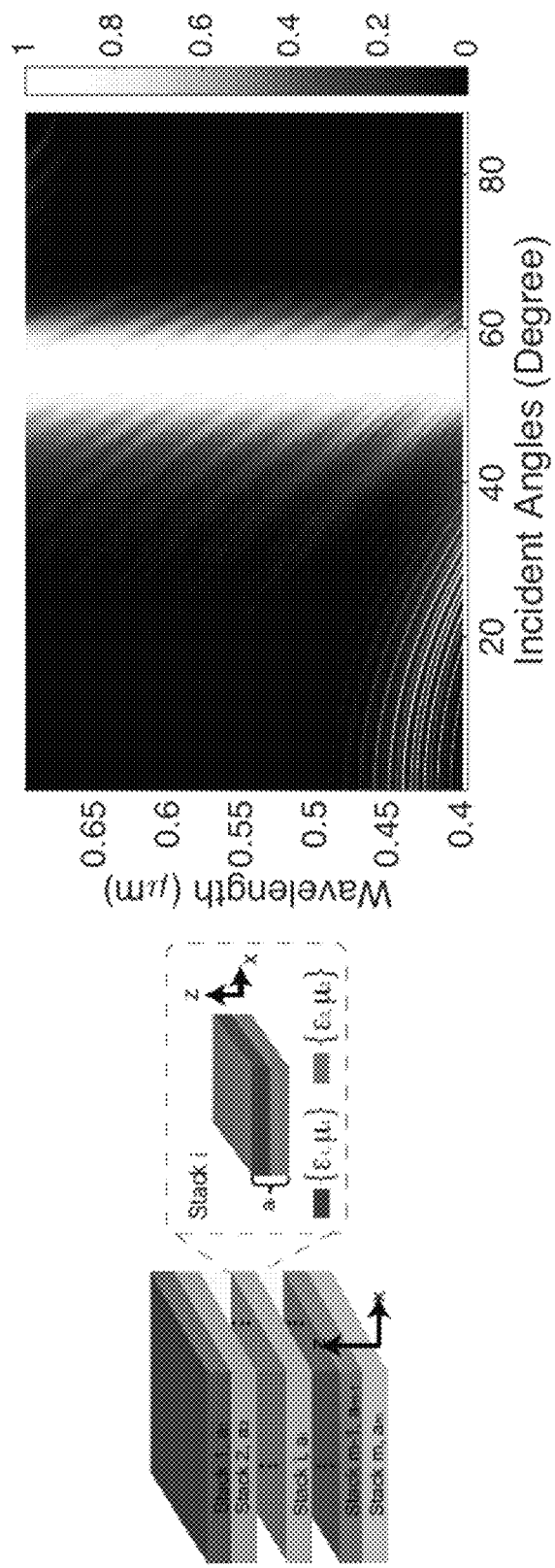

FIGS. 9A-9B show the tuning of the thickness of each multilayer cell to achieve good angular selectivity. FIG. 9A shows a schematic view of the filter, in which each photonic crystal structure has only one multilayer cell. The thickness of each multilayer cell (and correspondingly the periodicity of each photonic crystal structure) forms a geometric series $a_i=a_0 q^{i-1}$ with $a_0=200$ nm and $q=1.0212$. The total number of multilayer cells is 50. FIG. 9B shows the transmission spectrum of the filter. The calculated total transmitted power is about 3% higher than that shown in FIGS. 8A-8B.

Figure 10B:
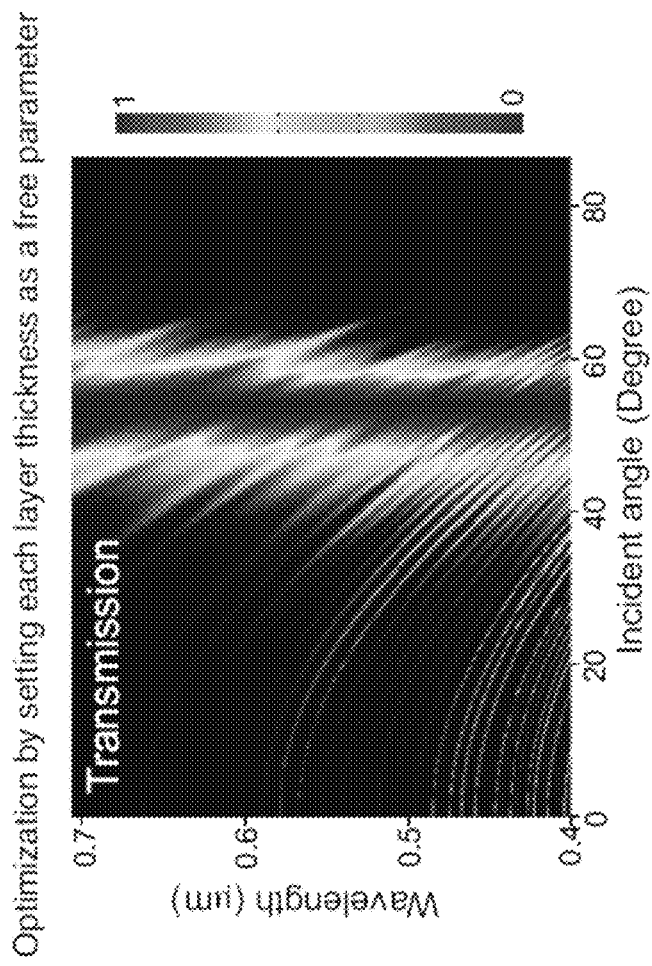
Figure 10A:
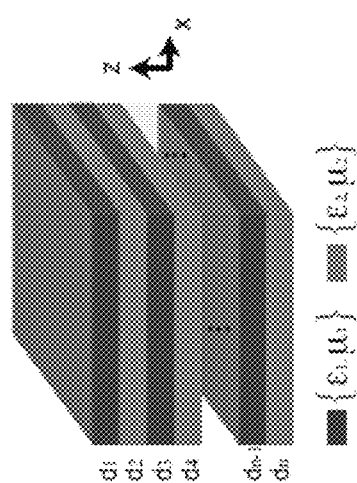

FIG. 10A-10B show the tuning of the thickness of each layer in the multilayer cells to achieve good angular selectivity. FIG. 10A shows a schematic view of the filter, in which the thickness of each layer $d_i$ (i from 1 to 100) is set as a free parameter for tuning. The tuning is based on the Constrained Optimization BY Linear Approximations (COBYLA) algorithm. The initial condition is set to the result obtained in FIG. 9B above. By tuning the thickness of each layer, the total transmitted power shown in FIG. 10B is 10% higher than that shown in FIG. 8A-8B.

Angularly Selective Filters with Anisotropic Layers

Figures 11A, 11B:
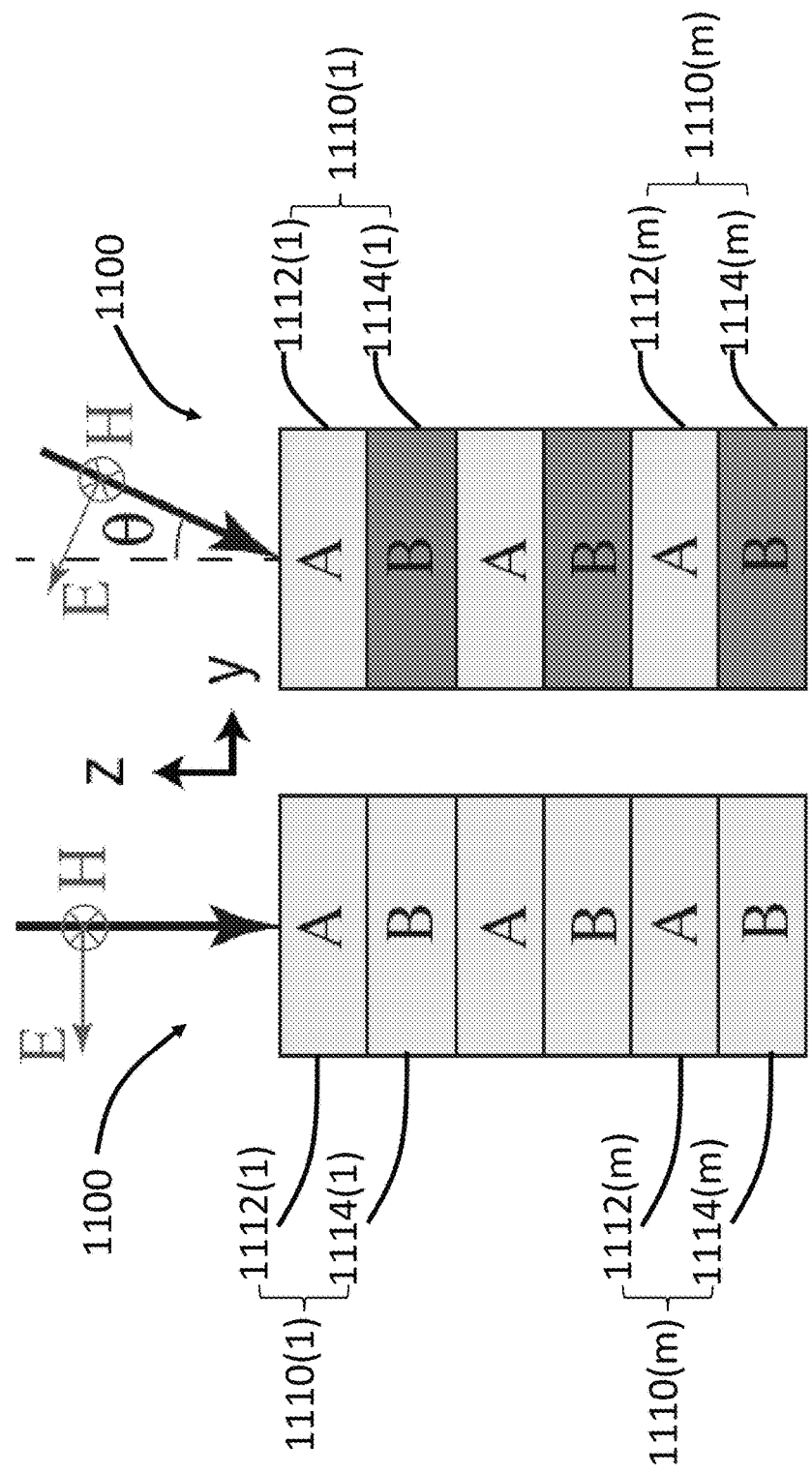
FIGS. 11A-11B illustrate angular selectivity of filters including anisotropic layers.

To further improve the flexibility of tuning the transmission angle (i.e., tunability) of the filter described above, anisotropic materials can be used for the first layers and/or the second layers. FIGS. 11A-11B illustrate a schematic view of an angularly selectively filter 1100 including anisotropic materials. The filter 1100 includes a plurality of first layers 1112(1) to 1112(m), collectively referred to as first layers 1112, and a plurality of second layers 1114(1) to 1114(m), collectively referred to as second layers 1114. The first layers 1112 and second layers 114 are stacked together alternatingly. One or more pairs of first layers 1112(k) and second layers 1114(k) form a photonic crystal structure 1110(k), where k is an integer from 1 and m. The second layers 1114 comprise anisotropic materials, i.e. they have different dielectric permittivities along different directions. In the filters 1100 shown in FIGS. 11A-11B, the dielectric permittivity of the second layers 1114 has a first value along the direction substantially perpendicular to the plane of the filter (z direction) and a second value along the direction substantially parallel to the plane of the filter (y direction).

The filter 1100 can transmit p-polarized light at an "effective" Brewster angle on the isotropic-anisotropic interface. To illustrate this property quantitatively, a transfer matrix method can be employed. Without being bound by any theory or mode of operation, the reflectivity $R_p$ of p-polarized light with a propagating angle $\theta_i$ (defined in the isotropic materials, or first layers 1112) on an isotropic-anisotropic interface can be expressed as:

$$R_p = \left| \frac{n_x n_y \cos\theta_i - n_{iso}(n_z^2 - n_{iso}^2 \sin^2\theta_i)^{1/2}}{n_x n_y \cos\theta_i + n_{iso}(n_z^2 - n_{iso}^2 \sin^2\theta_i)^{1/2}} \right|^2 \quad (5)$$

where $n_x = n_y$ and $n_z$ are the refractive indices of the anisotropic materials constituting the second layers 1114 at the ordinary (y direction in FIGS. 11A-11B) and extraordinary (z direction in FIGS. 11A-11B) axes, respectively, and $n_{iso}$ is the refractive index of the isotropic material constituting the first layers 1112. The Brewster angle, $\theta_i = \theta_B$, can be calculated by setting $R_p = 0$, giving:

$$\tan\theta_B = \sqrt{\left(\frac{\epsilon_z}{\epsilon_{iso}}\right)\left[\frac{\frac{\epsilon_x}{\epsilon_{iso}} - 1}{\frac{\epsilon_z}{\epsilon_{iso}} - 1}\right]}. \quad (6)$$

For illustrative purposes only, the Brewster angle $\theta_B$ can be set as zero, in which case broadband angular selectivity can be achieved at normal incidence. From Equation (6), in order to have $\theta_B = 0$, the permittivity of the isotropic material can be selected to be equal to the permittivity of the anisotropic material in the xy plane, that is:

$$\epsilon_{isotropic} = \epsilon_x = \epsilon_y \quad (7)$$

In an anisotropic material, the analytical expressions for the effective refractive index are given by:

$$\frac{1}{n_e(\theta)^2} = \frac{\sin^2\theta}{\tilde{n}_e^2} + \frac{\cos^2\theta}{\tilde{n}_o^2} \quad (8)$$

$$n_o(\theta) = \tilde{n}_o \quad (9)$$

where $\theta$ is the angle between the z axis and the propagation direction in the material. $n_e(\theta)$ is the effective refractive index experienced by extraordinary waves, $n_o(\theta)$ is the effective refractive index experienced by ordinary waves, $\tilde{n}_e^2 = \epsilon_z^B/\epsilon_0$ is the refractive index experienced by the z component of the electric field, and $\tilde{n}_o^2 = \epsilon_x^B/\epsilon_0 = \epsilon_y^B/\epsilon_0$ is the refractive index experienced by the x and y components of the electric field.

FIG. 11A shows that at normal incidence, when the electrical field of incident light is zero along the z direction, the effective dielectric constant of the anisotropic layers $n_e(0)^2 = \tilde{n}_o^2 = \epsilon_x$ matches the isotropic layer $\epsilon_{iso}$ for p-polarized light. As a result, the incident light can experience the same dielectric permittivity in the first layers 1112 and 1114. In other words, the entire filter 1100 can be effectively taken as a single uniform layer. Therefore no photonic band gap may exist, and incident light at the normal incidence angle can transmit through the filter 1100 ($R_p = 0$ in Equation (5)).

On the other hand, when the incident light is no longer normal to the surface (at oblique angle), the p-polarized light has a non-zero z component of its electrical field ($E_z \neq 0$), as shown in FIG. 11B. Note that the same structure 1100 is shown in FIGS. 11A and 11B, but for incident light at different incident angles, the structure 1100 displays different properties. In FIG. 11B, the incident light can experience an index contrast $n_A^P(\theta) = (\epsilon_{iso})^{1/2} \neq n_B^P(\theta) = n_e(\theta)$, where $n_A^P(\theta)$ and $n_A^P(\theta)$ are the refractive indices experienced by the incident light in the first layers 1112 and second layers 1114, respectively. The index contrast can open a photonic band gap, therefore prohibiting the transmission of incident light at certain wavelengths or incident angles, or both. Furthermore, as the incidence angle $\theta$ increases, the $\tilde{n}_e$ term in Equation (8) becomes more significant, indicating that the size (or width) of the resulting photonic band gap can increase as the propagation angle deviates further away from the normal direction. In operation, the photonic band gap can causes reflection of the p-polarized incident light, thereby realizing selective transmission based, at least in part, on the incidence angle of the incident light.

As to s-polarized light, since the z component of the electric field is typically zero ($E_z = 0$), so s-polarized light normally remains as an ordinary wave and experiences no index contrast between in the first layers 1112 and the second layers 1114 (i.e. $n_A^s = n_B^s$). Accordingly, s-polarized light can be transmitted through the filter 1100 at nearly all angles.

Angularly Selective Filters with Metamaterials

The filter 1100 schematically shown in FIGS. 11A-11B can be constructed using either naturally occurring materials or metamaterials. Due to the wide range of possible dielectric permittivity that can be achieved in metamaterials, it can be beneficial to employ metamaterials to fabricate the angularly selective filters.

Figure 12:
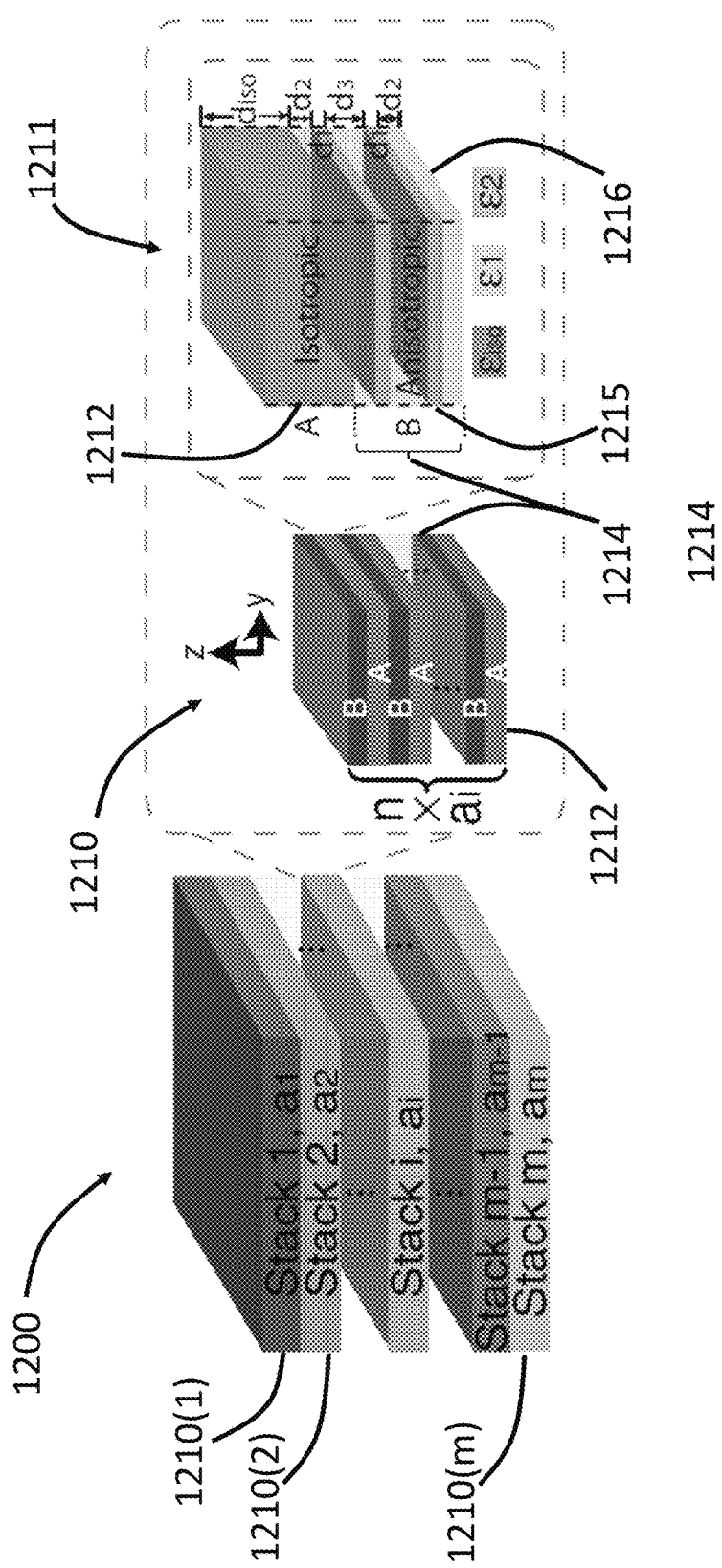
FIG. 12 is a schematic view of an angularly selective filter including anisotropic layers made of metamaterials.

FIG. 12 shows a schematic view of an angularly selective filter 1200 using metamaterials. The filter 1200 includes several levels of multilayer structures. On a first level, the filter 1200 comprises a plurality of photonic crystal structures 1210(1) to 1210(m), collectively referred to as photonic crystal structure 1210 or multilayer stack 1210. On a second level, at least one photonic crystal structure 1210 further comprises a plurality of multilayer cells 1211 that includes an isotropic sheet 1212 and an anisotropic sheet 1214. On a third level, at least one anisotropic sheet 1214 comprises one or more first layers 1215 and one or more second layers 1216. Although both the first layers 1215 and the second layer 1216s can be made of isotropic materials, the combination of the first layer(s) 1215 and the second layer(s) 1216 can create anisotropic dielectric permittivity of the anisotropic sheet 1214 via the tuning of the thickness of each layer. For example, at least one of the thickness of the first layer 1215 or the thickness of the second layer 1216 can be less than a wavelength of the incident radiation such that the incident radiation propagating through the first layer 1215 and the second layer 1216 experiences an anisotropic dielectric permittivity according to effective medium theorem. In other words, the combination of first layer(s) 1215 and second layer(s) 1216 can form a metamaterial that has an anisotropic dielectric permittivity. Therefore, the anisotropic sheet 1214 can also be referred to as the metamaterial layer 1214.

For illustrative purposes only, here below are non-limiting examples of angularly selective filters 1200, as well as illustrations of possible mechanism underlying the operation of the filters. The metamaterial layer 1214 can include at least two pairs of first layers 1215 and second layers 1216. The first layers 1215 have a high dielectric permittivity, or high-index ($\varepsilon_1=10$), and the second layers 1216 have a low dielectric permittivity, or low-index ($\varepsilon_2=\varepsilon_{air}=1$). Without being bound by any theory or mode of operation, when the high-index layers are sufficiently thin compared with the wavelength of the incident radiation, the incident radiation normally cannot distinguish the first layers and the second layers, and the effective medium theorem indicates that the combination of the first layers 1215 and the second layers 1216 can be regarded as a single anisotropic medium with the effective dielectric permittivity tensor $\{\varepsilon_x, \varepsilon_y, \varepsilon_z\}$:

$$\epsilon_x = \epsilon_y = \frac{\epsilon_1 + r\epsilon_2}{1+r} \quad (10)$$

$$\frac{1}{\epsilon_z} = \frac{1}{1+r}\left(\frac{1}{\epsilon_1} + \frac{r}{\epsilon_2}\right) \quad (11)$$

where r is the ratio of the thickness of the first layers 1215 and second layers 1216: $r=d_2/d_1$, and $d_1$ and $d_2$ are the thickness of the first layers 1215 and the second layers 1216, respectively. It can be seen from Equation (10) and (11) that by tuning the thickness of each layer, the resulting metamaterial layer 1214 can display anisotropic dielectric permittivity, i.e. the components along x and y directions are different from the component along z direction.

In one example, the angularly selective filter 1200 can be configured to transmit incident radiation at normal incidence angle. In this case, the dielectric permittivity tensor of the anisotropic material in the metamaterial layer 1214 satisfies Equation (7). The dielectric permittivity $\varepsilon_{iso}$ of the isotropic sheet, or the isotropic material layers 1212 can be between $\varepsilon_1$ and $\varepsilon_2$, the dielectric permittivity of the first layers 1215 and second layers 1216, respectively. For example, common polymers, which have a dielectric permittivity around 2.25, can be used in the isotropic sheet 1212. According to Equations (10) and (11), with material properties $\varepsilon_1=10$ and $\varepsilon_2=1$, and the constraint $\varepsilon_x=\varepsilon_y=\varepsilon_{iso}=2.25$, the thickness ratio r can be obtained as r=6.5.

Using the parameters calculated above and with a 30-bilayer structure (i.e., 30 pairs of first layers 1215 and second layers 1216 in the anisotropic sheet 1214), the transmission spectrum of p-polarized light at various incident angles can be calculated using the transfer matrix method. The result is plotted in FIG. 13A, in which the wavelength is plotted with respect to the periodicity of the photonic crystal structure 1210, or the thickness of each multilayer cell 1211. In practice, the operation range of the filter 1200 can be much larger than the thickness $d_1$ of the first layers 1215. Within this operation range, the light interacts with the metamaterial layer 1214 as if it is a homogeneous medium, and experiences an effective anisotropic dielectric permittivity.

Figure 13A:
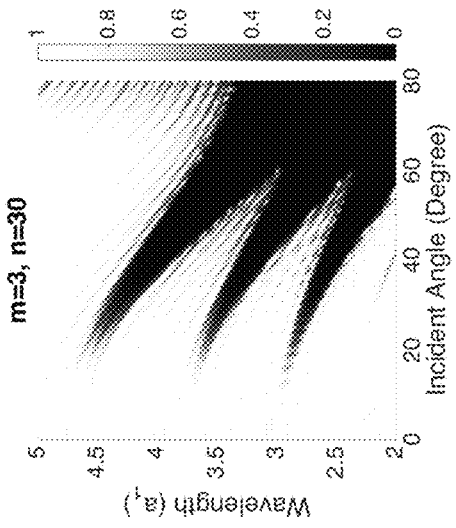
FIGS. 13A-13C are simulated transmission spectra of angularly selective filters including metamaterial layers as a function of the number of photonic crystal structures in the filter.
Figure 13B:
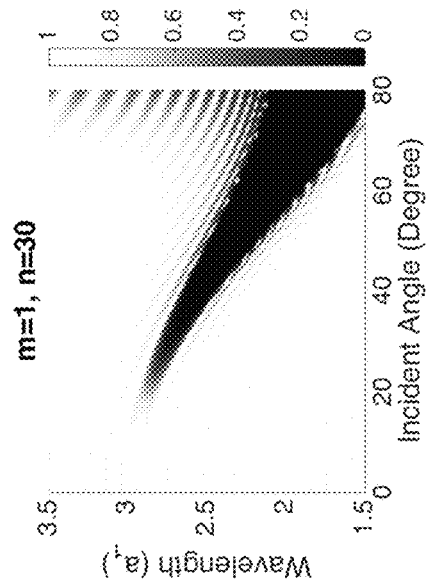
Figure 13C:
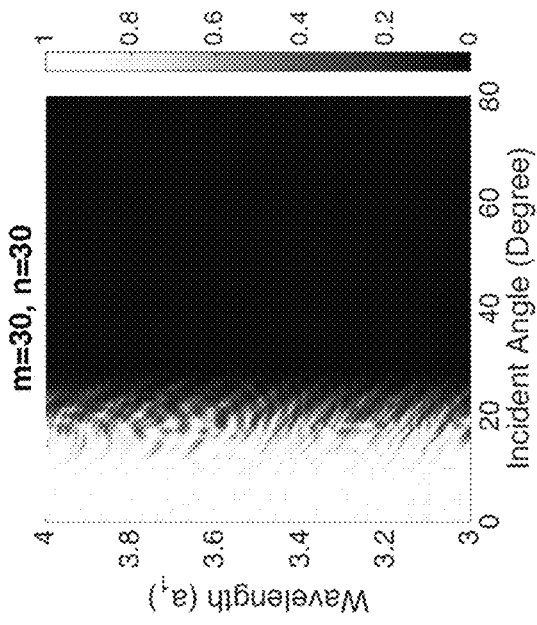
Figures 14A, 14B:
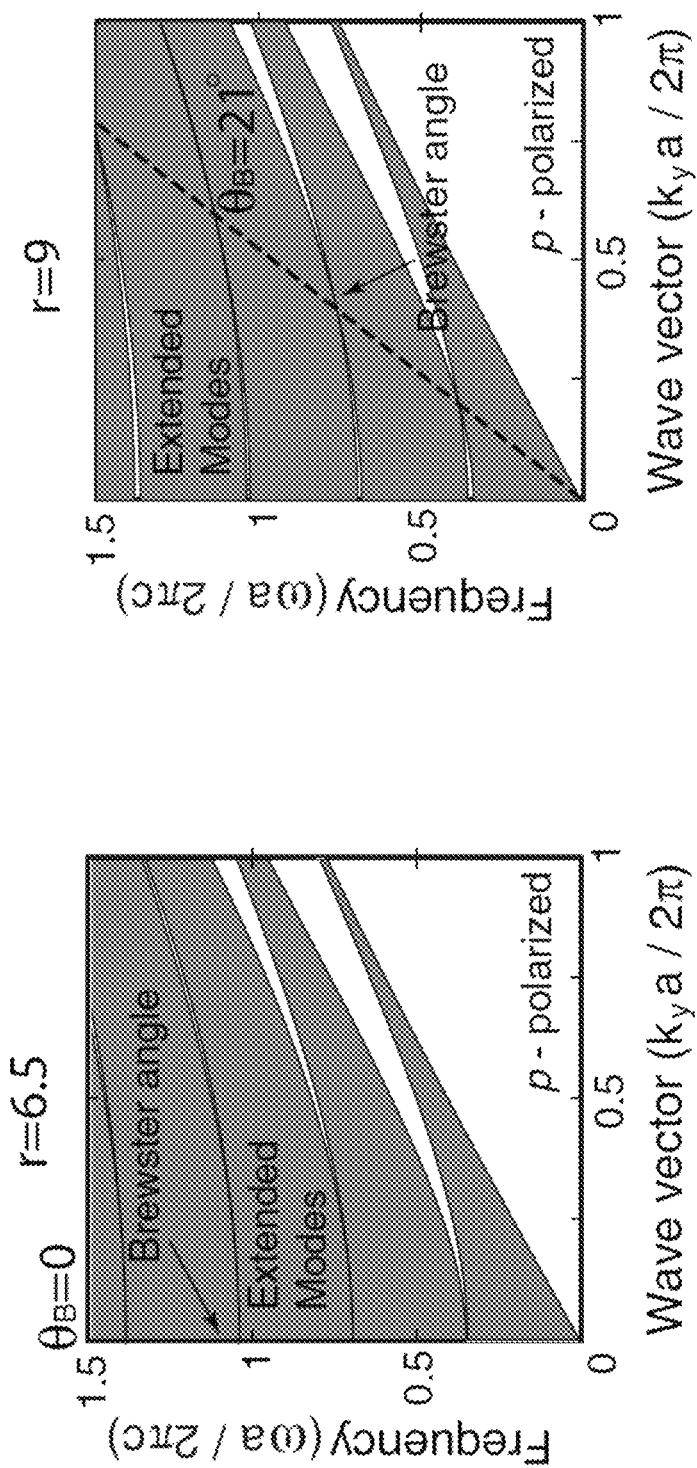
FIGS. 14A-14D show energy band diagrams of angularly selective filters with respect to the thickness ratio of the high-index layer to the low-index layer.
Figure 14D:
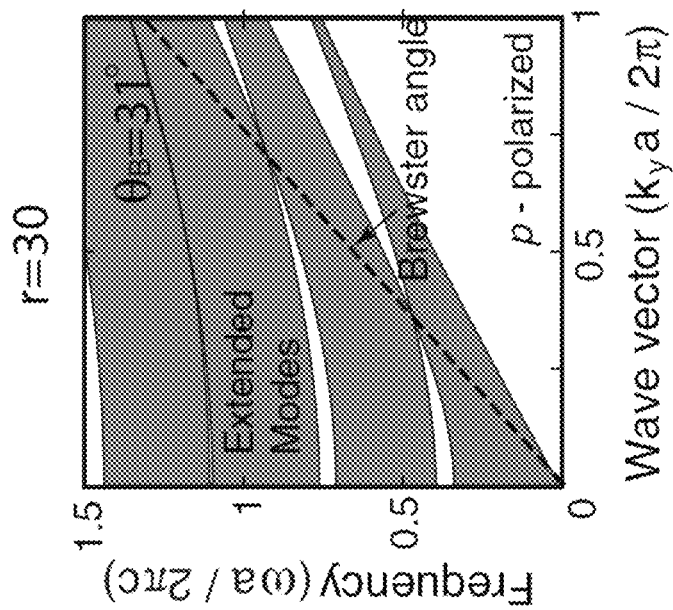
Figure 14C:
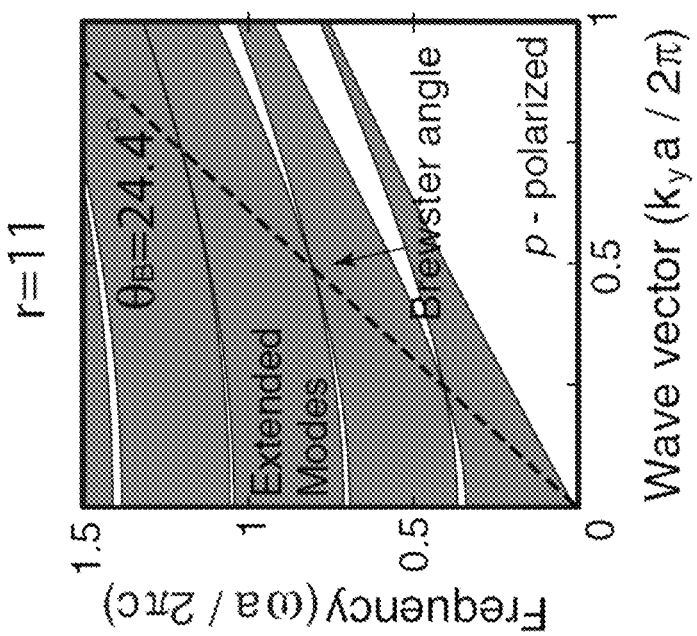

In another example, the bandwidth of the angular photonic band gap can be enlarged by stacking more bilayers with different periodicities. FIGS. 13B-13C present the stacking effect on the transmission spectrum for p-polarized light. More specifically, FIG. 13B shows the transmission spectrum of p-polarized radiation through three stacks of 30-bilayer structures described above. The periodicities of these stacks form a geometric series $a_i=a_1 q^{i-1}$ with q=1.26, where $a_i$ is the periodicity of the ith stack. FIG. 13C shows the transmission spectrum of p-polarized radiation through 30 stacks of 30-bilayer structures described above. The periodicities of these stacks form a geometric series $a_i=a_1 q^{i-1}$ with q=1.0234, where $a_i$ is the periodicity of the ith stack. FIGS. 13A-13C, taken together, show that increasing the number of stacks in the filter 1200 can help achieve angular selectivity (bandwidth>30%) at normal incidence within a broader wavelength range.

Adjustment of Transmission Angles Via Thickness Tuning

In general, the Brewster angle for isotropic-anisotropic photonic crystals depends on $\varepsilon_x$, $\varepsilon_z$, and $\varepsilon_{iso}$ according to Equation (6). Therefore, the Brewster angle, and accordingly the transmission angle of the filter can be adjusted by using materials with different dielectric permittivity. In the angularly selective filters with metamaterial shown in FIG. 12, the thickness ratio r can also influence the Brewster angle.

To illustrate the adjustment of Brewster angle, or the transmission angle of the filter, Equations (10) and (11) can be substituted into Equation (6), obtaining:

$$\theta_B(r) = \arctan\left[\sqrt{\frac{\epsilon'_1 \epsilon'_2(\epsilon'_1 + r\epsilon'_2 - 1 - r)}{(1+r)\epsilon'_1\epsilon'_2 - \epsilon'_2 - \epsilon'_1 r}}\right] \quad (12)$$

where $\varepsilon_1'=\varepsilon_1/\varepsilon_{iso}$ and $\varepsilon_2'=\varepsilon_2/\varepsilon_{iso}$. From Equation (6) it can be seen that in order to have a nontrivial Brewster angle, $\varepsilon_{iso}$ is typically larger than max $\{\varepsilon_x,\varepsilon_z\}$ or smaller than min $\{\varepsilon_x,\varepsilon_z\}$.

The result in Equation (12) shows that it is possible to adjust the Brewster angle by changing the ratio $r=d_1/d_2$, or by changing the spacing distance $d_2$ when everything else is fixed. FIGS. 14A-14D show photonic band diagrams of an anisotropic-isotropic quarter-wave stack. The band diagrams are calculated with preconditioned conjugate-gradient minimization of the block Rayleigh quotient in a plane-wave basis, using a freely available software package. The dielectric tensor of the anisotropic material in each band diagram is calculated by Equations (10) and (11) with r=6.5, r=9, r=11, and r=30, respectively.

In FIGS. 14A-14D, modes with propagation direction forming an angle $\theta_i$ with respect to the z axis in FIG. 11 (in the isotropic layers) lie on a straight line represented by $\omega=k y_i/[(\varepsilon_{iso})^{1/2} \sin\theta_i]$. Generally, this line may extend through both the regions of the extended modes, as well as the band-gap regions. However, for p-polarized light, at the Brewster angle $\theta_B$, extended modes exist regardless of $\omega$ (dashed line in FIGS. 14A-14D). It can be seen that the Brewster angle increases as a function of r. In particular, when r→∞, the Brewster angle (defined in the isotropic layer) approaches $\theta_B=\arctan(\varepsilon_2/\varepsilon_{iso})^{1/2}$.

In some examples, the second layers 1216 cam include soft elastic materials, such as poly(dimethyl siloxane)

(PDMS) or air, in which case, the thickness ratio r can be varied by changing the distance $d_2$ in real time, and accordingly varying the Brewster angle. This real-time tuning of Brewster angle (and the transmission angle of the filter 1200) can be helpful in certain applications when incident radiation changes its angle during the operation of the filter 1200.

Figure 15:
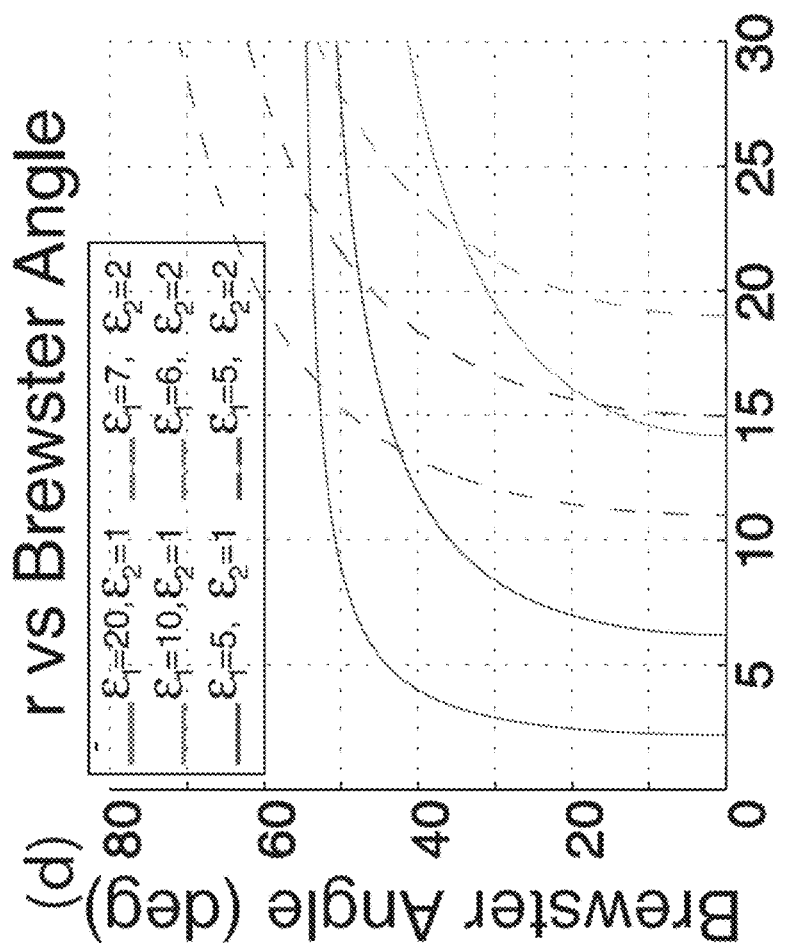
FIG. 15 shows the Brewster angle of angularly selective filters with respect to the thickness ratio of the high-index layer to the low-index layer.

FIG. 15 shows a plot illustrating the dependence of the Brewster angle on r. At small r, there is either no Brewster angle or the light may not be coupled into the Brewster angle from air. As r gets larger, the Brewster angle first increases rapidly and then plateaus, approaching an isotropic-isotropic limit, $\theta_B$=arctan $(\varepsilon_2/\varepsilon_{iso})^{1/2}$. It is worth mentioning that this tunability of the Brewster angle with respect to layer thickness does not exist in conventional (i.e. non-metamaterial) isotropic-isotropic or isotropic-anisotropic photonic crystals, in which the Brewster angle depends on the materials' dielectric properties.

Angularly selective filters 1200 including metamaterial layers shown in FIG. 12 can also comprise photonic crystal structures 1210 of different periodicities so as to broaden the overall band gap of the filters 1200. For example, FIGS. 16A-16C show the transmission spectra of angularly selective filters, which include 30 stacks of 30-bilayer structures described above. The periodicities of these stacks form a geometric series $a_i=a_1 q^{i-1}$ with q=1.0234, where $a_i$ is the periodicity of the ith stack. Moreover, metamaterial layers 1214 of different thickness ratio r are used to further demonstrate the effect of r on the performance of the resulting filter. The calculation can be carried out using the transfer matrix method. It can be seen that the filters display a broadband angular selectivity within the wavelength range of $4a_1$ to $8a_1$, where a1 is the periodicity of the first photonic crystal structure in the filter. Note that metamaterials are scalable to wavelength, which means different filters can be fabricated for applications involving different wavelengths by proportionally tuning the dimensions of the filter, or more specifically the dimensions of the repeating patterns of the filter.

Figures 17A, 17B:
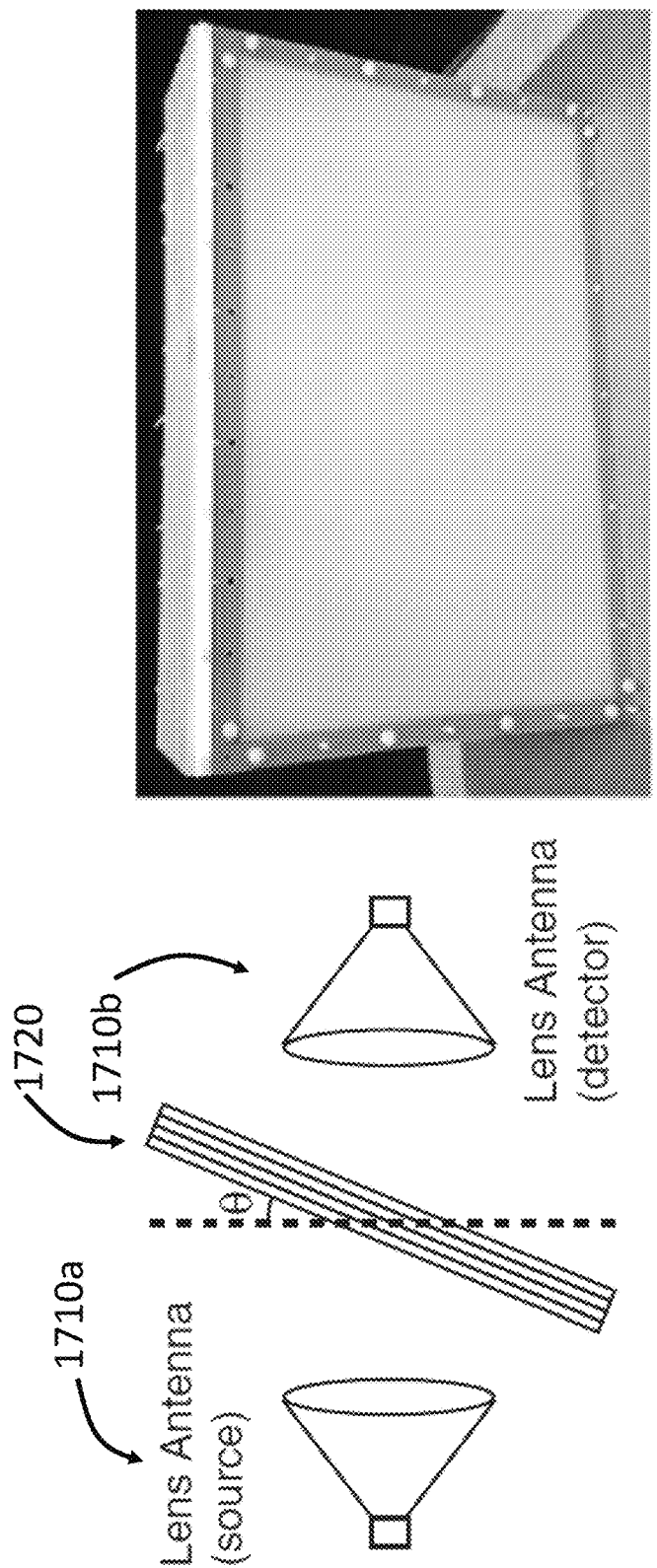
FIGS. 17A-17B show experimental setup to measure the angular selectivity of filters like the one shown in FIG. 12.

As one exemplary embodiment, an experimental realization can be performed in the microwave regime, for purposes of illustration only. The schematic of the experimental setup is shown in FIG. 17A, in which an angularly selectively filter 1720 is disposed between a pair of lens antennas 1710a and 1710b. The angularly selectively filter 1720 can have a structure substantially like the one shown in FIG. 12. The high-index material layer can include Rogers R3010 material with $\varepsilon_1$=10, and the low-index material layer can include air with $\varepsilon_2$=1. The isotropic sheet can include polypropylene $\varepsilon_{iso}$=2.25, Interstate Plastics). The thickness of each layer is chosen to be $\{d_{iso},d1,d2,d3\}=\{3.9,0.5,1.6,3.9\}$ mm. A simple 12-period structure [m=12, n=1 case in FIG. 13A] is employed. FIG. 17B shows a photograph of the resulting filter. One of the antennas 1710a is employed as the radiation source to deliver radiation in the microwave region, and the other antenna 1720 functions as a detector to monitor the radiation transmitted through the filter 1720.

With the experimental setup shown in FIGS. 17A-17B, the transmission spectrum for p-polarized light can be measured in the wavelength range from 26 to 35 mm. FIGS. 18A and 18B show the simulated and experimental results, respectively, of transmission spectra of the filter. For incident angles less than 60°, the experimental result shown in FIG. 18B agrees well with the simulation (analytical) result calculated from the transfer matrix method and shown in FIG. 18A. At larger incident angles, the finite-sized microwave beam spot may pick up the edge of the sample, which can cause the transmission to deviate from the theoretical simulation. Such deviation may be alleviated or eliminated by using larger filters.

Although the above demonstration shown in FIGS. 17-18 is in the microwave region of the electromagnetic spectrum, the filter shown in FIG. 12 can be extended to other frequency regions (such as infrared or visible spectra) depending, at least in part, on the applications. For example, a material system comprising $SiO_2$ ($\varepsilon_1$=2), poly(methylmethacrylate) ($\varepsilon_{iso}$=2.25), and $Ta_2O_5$ ($\varepsilon_2$=4.33) can be fabricated using sputtering techniques as readily known in the art to realize the angular selective filter at arbitrary angle in the optical regime. Specifically, with the above three materials, using the geometry design in FIG. 12 with m=n=50, and the periodicities of these stacks forming a geometric series $a_i=a_1 q^{i-1}$ with q=1.0148, $a_1$=120 nm, and r=1.8, normal incidence angular selectivity (with angular window less than 20°) in the entire visible spectrum (400-700 nm) can be achieved.

Adjustment of Transmission Angles Via Permittivity Tuning

Figure 19B:
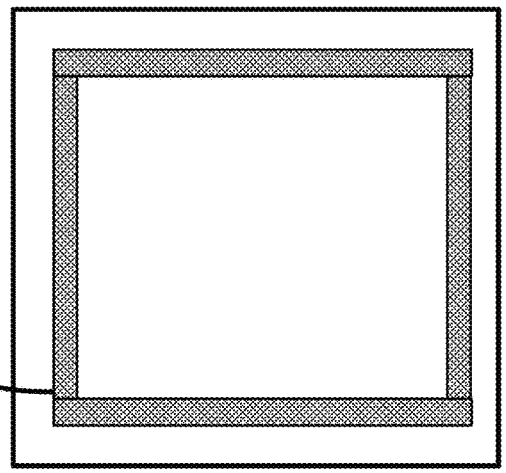
FIGS. 19A-19B are schematic views of angularly selective filters with external fields to adjust the transmission angle.
Figure 19A:
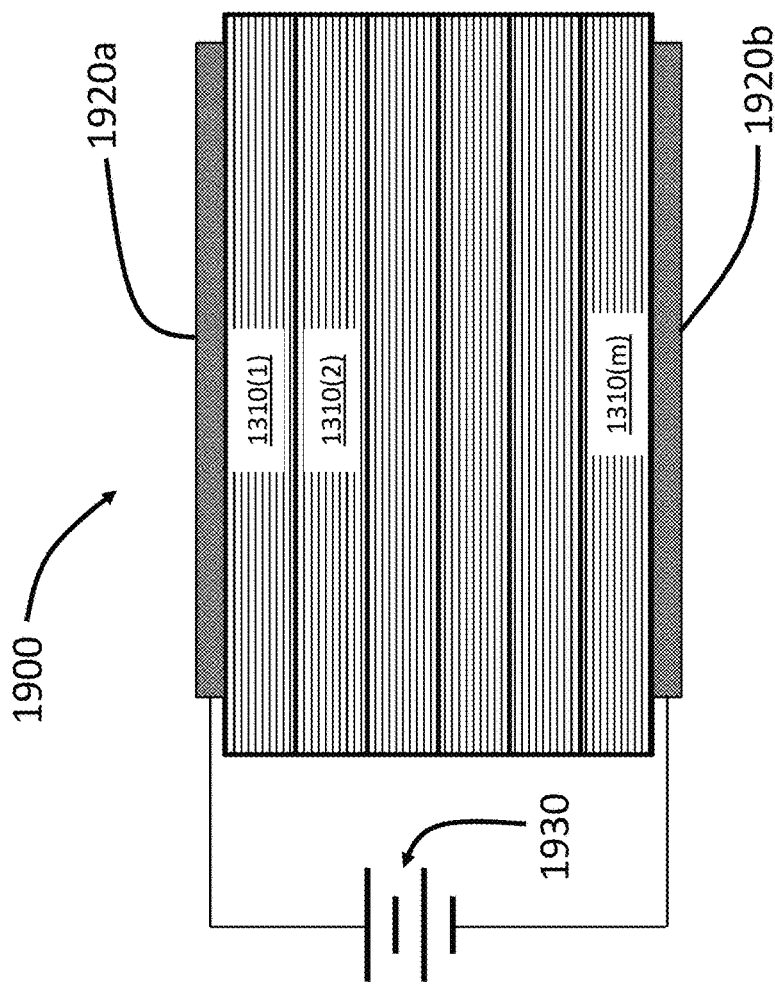

The transmission angle of filters including metamaterial layers shown in FIG. 12 can also be adjusted by tuning the permittivity of the constituting materials, but without changing the materials. This can be achieved by applying an external field, such as an electric field, magnetic field, thermal field, or pressure field, to the filter, as shown in FIGS. 19A-19B. FIG. 19A shows a side view of a filter 1900 including a plurality of photonic crystal structures 1910(1) to 1910(m), collectively referred to as photonic crystal structures 1910, which can be substantially like the one shown in FIG. 12. A pair of field applicators 1920a and 1920b is disposed on two exterior surfaces of the photonic crystal structures 1910. A power source 1930 is electrically coupled to the pair of field applicators 1920a and 1920b so as to drive the field applicators 1920a and 1920b. FIG. 19B shows a top (or bottom) view of the filter 1900, in which the field applicator 1920a or 1920b is substantially conforming to the surface shape of the filter 1900 so as to apply a uniform field.

In one example, the field applicators 1920a and 1920b can be electrodes that apply an electrical field across the depth of the filter 1900. As readily understood in the art, an electric field can induce a change in the dielectric permittivity above certain threshold, thereby adjusting the transmission angle of the filter 1900. In another example, the field applicators 1920a and 1920b can be heaters, in thermal communication with the filter 1900, so as to vary the temperature of the filter 1900. In yet another example, the field applicators 1920a and 1920b can be configured to apply a mechanical pressure over the filter 1900 so as to vary the permittivity of the materials constituting the filter 1900. For example, the applicators 1920a and 1920b can be piezoelectric actuators that can convert electricity into mechanical force.

In some examples, the field applicators 1920a and 1902b can be only coupled to the anisotropic sheet, or the metamaterial sheet (1214 in FIG. 12), without influencing the isotropic sheet. In some other examples, the field applicators 1920a and 1920b can be coupled to the entire filer 1900, but the materials response from the isotropic portion and the anisotropic portion of the filter 1900 can be different, thereby creating a change of the permittivity ratio and the Brewster angle.

Air Compatible Operations of Angularly Selective Filters

Brewster angles described above are defined at the interface of two materials, or two sheets, that constitute the angularly selective filters. In practice, radiation is typically coupled into the filter from air, which, in certain case, can be challenging. For example, conventional lossless dielectric materials have refractive index n ranging between 1.4 and 2.3 in the visible spectrum. Following the design principle illustrated above, if two conventional materials with index $n_1$ and $n_2$ are from the above category, assuming $n_1 < n_2$, the Brewster angle (defined in material with index $n_1$) can be:

$$\theta_{B,n_1} = \tan^{-1}\frac{n_2}{n_1} \quad (13)$$

Note that this angle is defined in the first material with refractive index $n_1$. In order to couple into the Brewster mode in this material system from air, the incident angle (defined in air) typically should be:

$$\theta_{B,air} = \sin^{-1}(n_1 \sin \theta_{B,n_1}) \quad (14)$$

Given that $\theta_{B,n_1} > 45°$, and $n_1$ is normally greater than 1.4, the term in the parenthesis in the right hand side of Equation (14) can be greater than 1, in which case it can be challenging to couple radiation from air.

Figure 20:
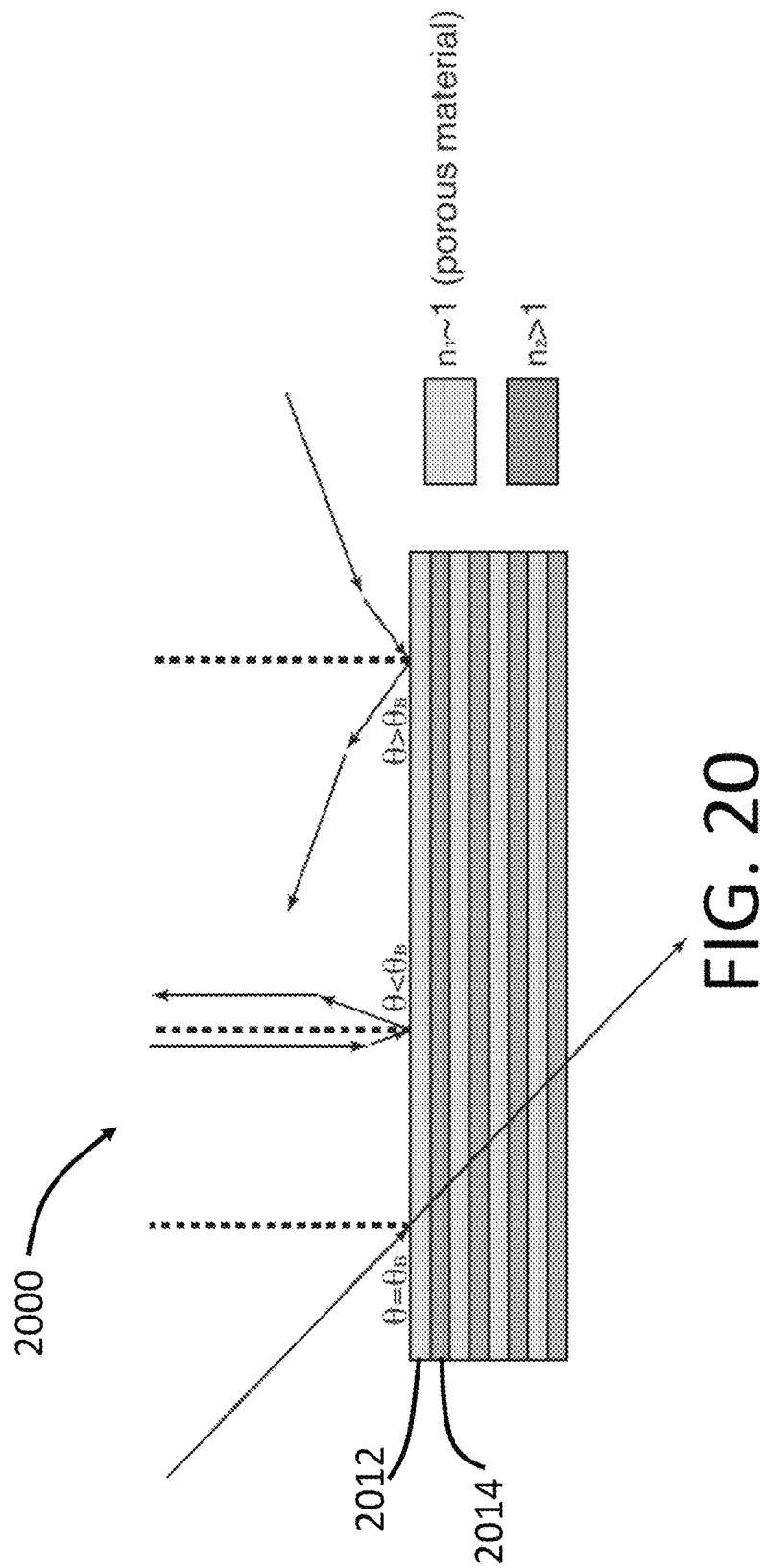
FIG. 20 is a schematic view of an angularly selective filter with low-index layers to achieve air compatible operation.

FIG. 20 shows one way to allow air-compatible operation of the angularly selectively filers that are described above. The filter 2000 in FIG. 20 comprises two sets of layers: the first layers 2012 and the second layers 2014. The first layers 2012 can be substantially similar to the first layers 312 shown in FIG. 3 or the isotropic sheets 1212 shown in FIG. 12. Similarly, the second layers 2014 can be substantially similar to the first layers 314 shown in FIG. 3 or the anisotropic sheets 1214 shown in FIG. 12. In some examples, as shown in FIG. 20, the first layers 2012 can include materials with a refractive index close to the refractive index of air (n~1) such that radiation experiences little refraction upon entering the filter 2000. In some other examples, the low-index materials can be employed to fabricate the second layers 2014. The low-index materials can be, for example, porous glasses or porous silicon, which can have a refractive index close to 1.05.

Figure 21:
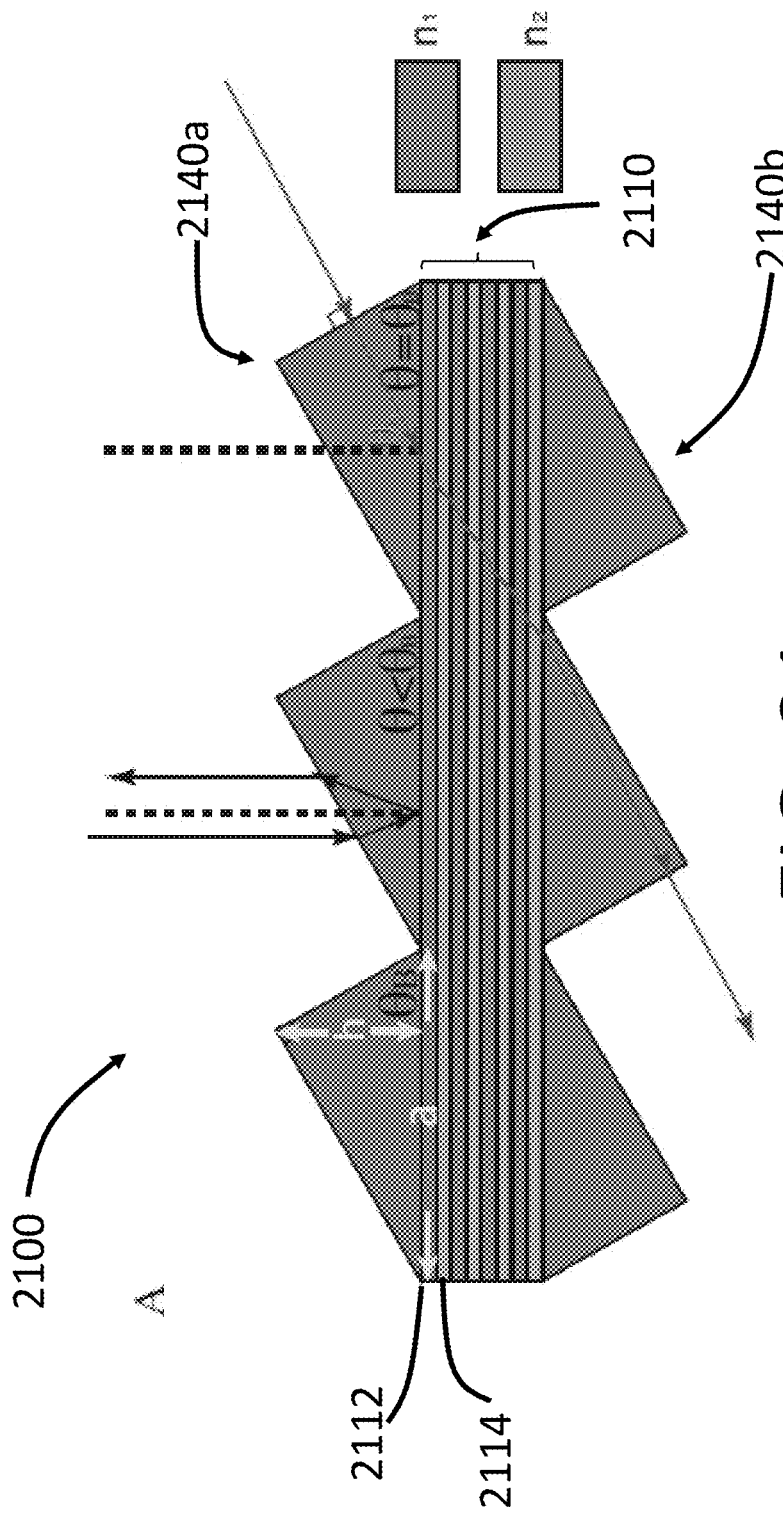
FIG. 21 is a schematic view of an angularly selective filter with prism couplers to achieve air compatible operation.

FIG. 21 shows another way to allow air-compatible operation of the angularly selectively filers described above. In FIG. 21, macroscopic prisms are employed to couple propagating radiation in the air into the Brewster modes in the filter. In FIG. 21, the angularly selective filter 2100 includes a stack of photonic crystal structures 2110, which comprises first layers 2112 and second layers 2114, disposed between two couplers 2140a and 2140b, with each coupler on each surface of the filter 2110. The two couplers 2140a and 2140b are dielectric masks with periodic triangular patterns.

The refractive index of the couplers 2140a and 2140b can be close to the refractive index of the first layers 2112 or the second layers 2114, in which case radiation can experience little or no refraction when passing through the interface between the couplers 2140a/b and the photonic crystal structures 2110. Also, the geometry of the prism can be configured to eliminate refraction from air into the low-index material at the transmission angle of the filter. Light incident at $\theta_{B,n_1}$ can be normal to the prism/air interface, therefore being able to pass through the whole system 2100. On the other hand, light incident from other directions (i.e. at other incidence angles) can undergo different refractions, and can be reflected by the filter 2100.

In one example, the couplers 2140a and 2140b can be prisms fabricated with acrylic (n=1.44), and the surface of the prism can be mechanically and/or chemically polished to enhance optical quality. The periodicity of the triangular pattern is a=2 mm and $\theta_B=55°$. The photonic crystal structure 2110 can be embedded in the prism. The two materials constituting the photonic crystal structure 2110 can be $SiO_2$ (n=1.45) and $Ta_2O_5$ (n=2.08). The overall transparency of the system can be up to 68% to p-polarized incident light at $\theta_B=55°$ (e.g., see FIG. 22C). The angular window of transparency can be about 8°.

Figure 22E:
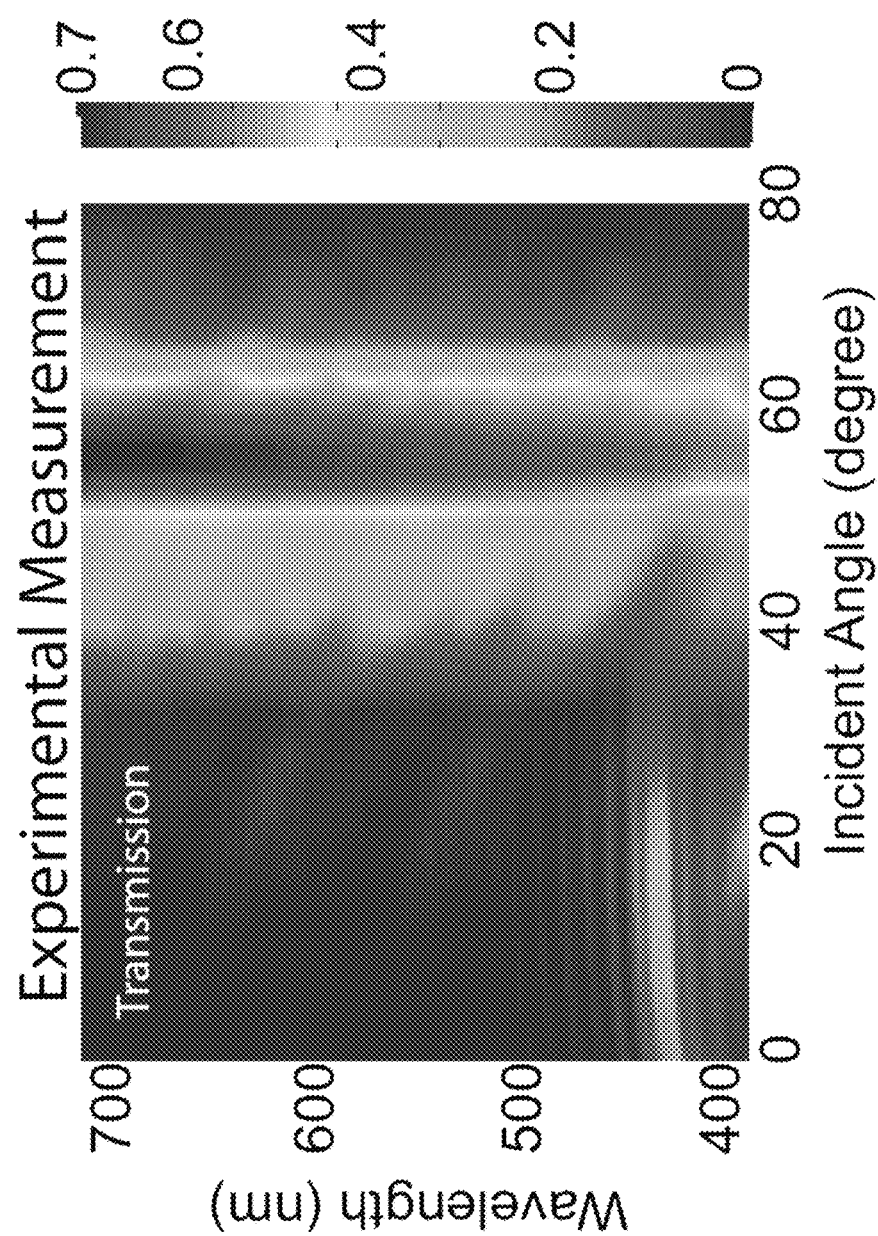

FIGS. 22A-22E illustrate an experimental demonstration of an angularly selective filer including prism couplers. The experimental setup is shown in FIG. 22A, in which a sample filter 2210 is disposed between a rainbow picture 2220 and a camera 2230. Rotating the sample filter 2210 and at the same time monitoring the image recorded on the camera 2230 can investigate the transmission of light reflected from the rainbow picture 2220 at different incidence angles on the sample filter 2210. At the Brewster angle, the camera 2230 records the rainbow picture as shown in FIG. 22C. At other angles (FIGS. 22B and 22D); however, the sample filter 2210 can act as a reflector and prevent light transmission through it, in which case the rainbow picture can be almost invisible to the camera 2230.

The p-polarized transmittance of the sample filter shown in FIG. 22A in the visible spectrum can be measured using an ultraviolet-visible spectrophotometer (Cary 500i). FIG. 22E shows the transmission spectrum. Although the sample filter no longer behaves like a mirror at off-Brewster angles (possibly due to image distortion of the prism), the transmission spectrum (and reflection spectrum) can still be very close to the spectrum of the sample immersed in index-matched liquid (e.g., see FIG. 5B), therefore confirming that the two couplers can allow air-compatible operation of the filter.

Figure 23A:
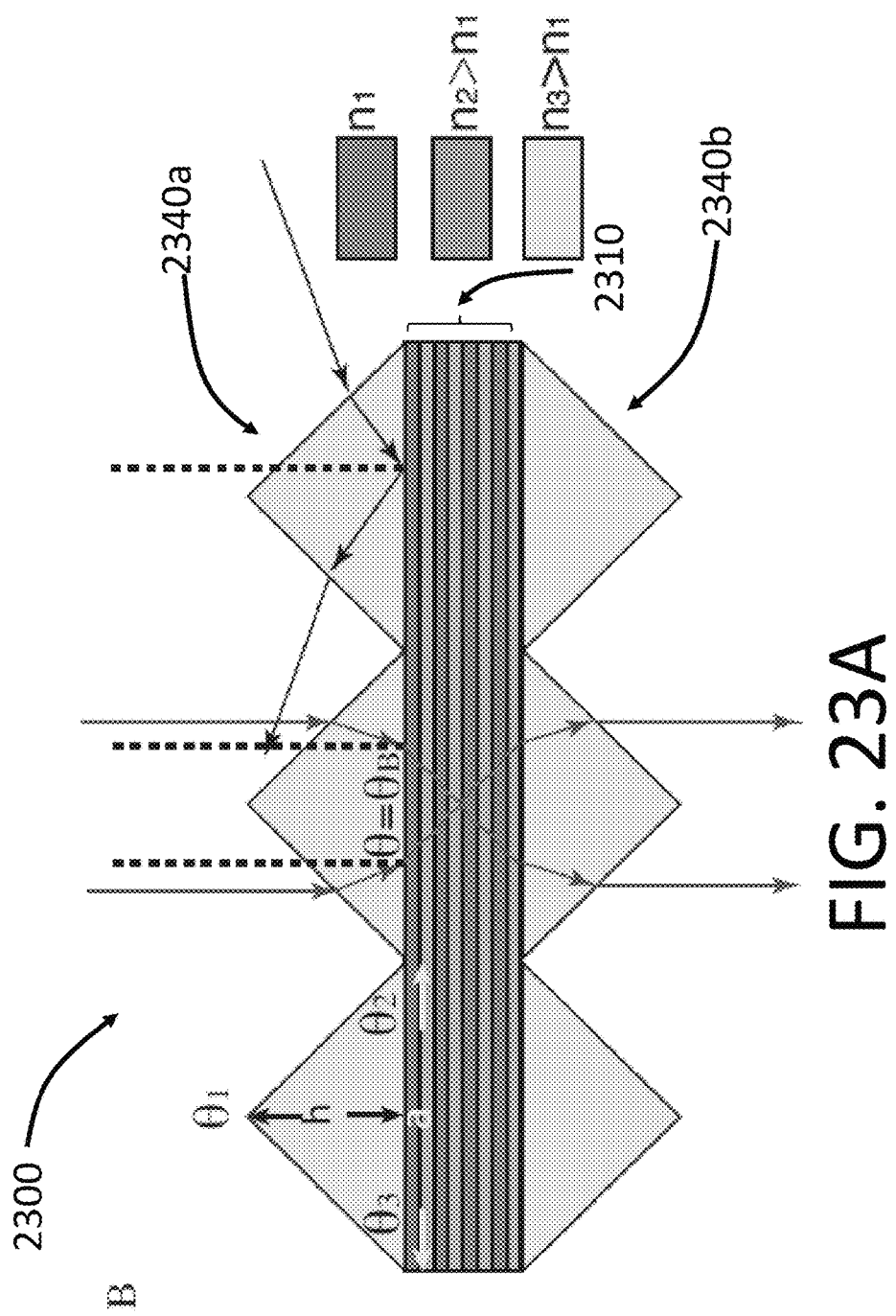
FIGS. 23A-23C illustrate different designs of prism couples for angularly selective filters to operate in air.

The transmission angle of angularly selective filters with couplers can be adjusted by, for example, tuning the configuration of the prisms. In one example, as shown in FIG. 23A, transmission at normal incidence angle can be achieved in a filter or filter system 2300. In this system 2300, the couplers 2340a and 2340b disposed over a photonic crystal structure 2310 comprise prisms that are made of materials having refractive index $n_3$~2.1 (e.g., L-BBH2 glass), and the three angles are $\theta_1=65°$, $\theta_2=\theta_3=57.5°$. With this configuration, the light propagation direction inside the couplers 2340a and 2340b can be almost substantially parallel to one edge of the prism, thereby reducing or eliminating optical losses.

Figure 23B:
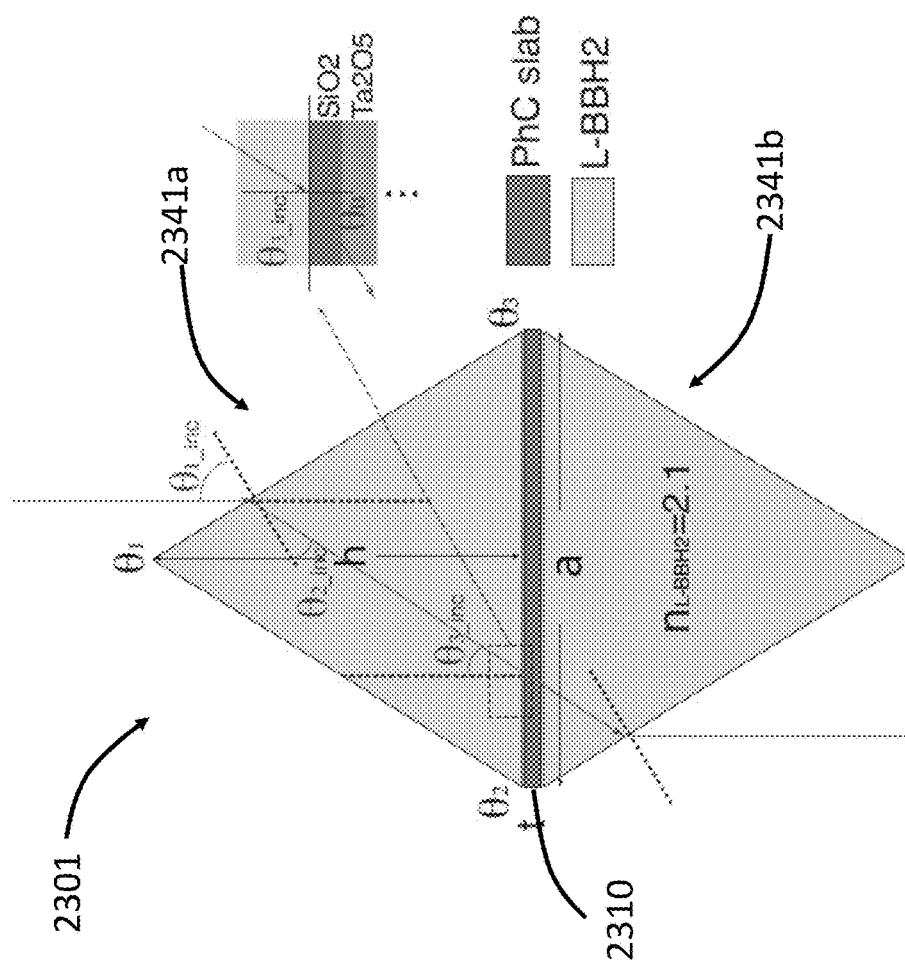

A detailed ray optics analysis of the above prism configuration is shown in FIG. 23B. The couplers 2341a and 2341b shown in FIG. 23B can be made of L-BBH2 glass ($n_{L-BBH2}$~2.1 in the visible spectrum) to couple the light from normal incidence into the Brewster mode. As described above, the three angles of the prism are $\theta_1=65°$, $\theta_2=\theta_3=57.5°$. Without being bound by any particular theory or mode of operation, from Snell's law, the refractive angle can be calculated by:

$$n_{L\text{-}BBH2} \sin \theta_{2\_inc} = n_{air} \sin \theta_{1\_inc} \quad (15)$$

where:

$$\theta_{1\_inc} = 90° - (90° - \theta_3) = \theta_3 = 57.5° \quad (16)$$

Therefore:

$$\theta_{2\_inc} = \arcsin\left(\frac{n_{air}}{n_{L\text{-}BBH2}} \sin\theta_{1\_inc}\right) = 23.7° \quad (17)$$

Notice in this case the refracted ray can be almost parallel to the left edge of the prism (it will be exactly parallel if $\theta_{2\_inc}=25°$), hence most of the light coming in through the right edge of the prism reaches the photonic crystal structures, instead of reaching the other edge of the prism. The same applies to the light coming in through the left edge of the prism due to the symmetry of the prisms.

Furthermore, from FIG. 23B:

$$\theta_{3\_inc}=\theta_{1\_inc}-\theta_{2\_inc}=33.8° \quad (18)$$

Therefore, the angle of the ray coupled into the photonic crystal structures (defined in SiO2) can be calculated by:

$$\theta_{SiO_2} = \arcsin\left(\frac{n_{L-BBH2}}{n_{SiO_2}}\sin\theta_{3\_inc}\right) = 53.7° \approx \theta_{B,SiO_2} \quad (19)$$

Equation (19) shows that the prism couples normally incident light (in air) into the Brewster angle (in the filter) of propagation inside photonic crystal structures. As mentioned before, light propagating at the Brewster angle inside the photonic crystal structures can transmit through with almost no loss.

Since the photonic crystal structures 2310 can have a thickness (e.g., ~5 µm) that is much smaller than the prism scale (e.g., ~1 mm), the photonic crystal structures 2310 can be considered as a thin film angular selective filter in a prism system, which allows light transmission only at the Brewster angle while reflecting at other angles.

After the light rays have passed through the photonic crystal structures, the light rays can undergo the same refraction in the prism couplers coupled at the bottom surface of the photonic crystal structure. Since the lower prism coupler 2341b can be identical to the upper prism coupler 2341a, light rays can exit the filter 2300 at the same angle as the incident angle. Notice that since the light propagation direction inside the prism can be substantially parallel to one edge of the prism, light coming in through the left edge of the upper prism can typically reach the right edge of the bottom prism, and light coming in through the right edge of the upper prism can typically reach the left edge of the bottom prism. Accordingly, optical loss in the prisms can be reduced or eliminated.

Figure 23C:
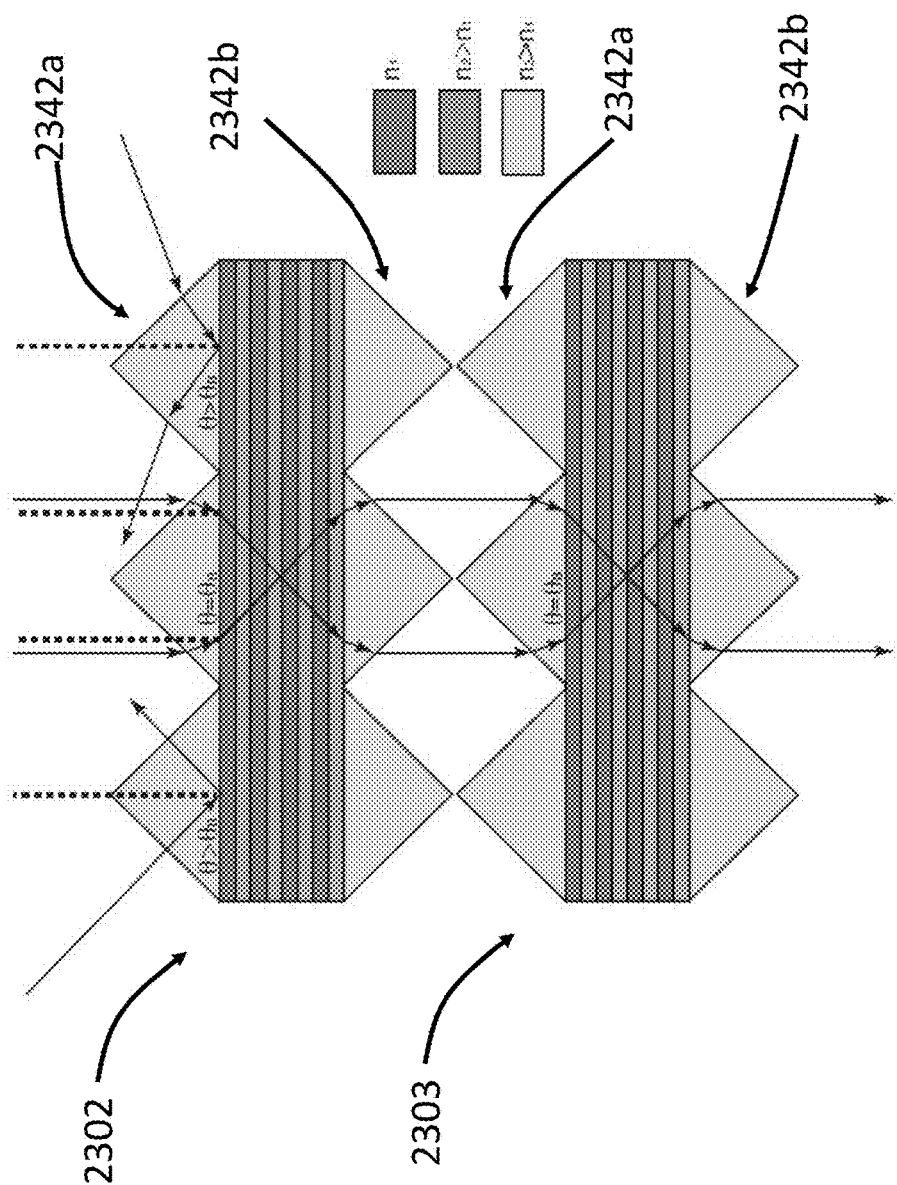

The prism couplers described above can allow air compatible operation of the angularly selectively filters. However, the prisms couplers can also flip the orientation of the images after the filters. FIG. 23C shows one way to restore the orientation of images. In this method, after propagating through a first filter 2302 comprising first pair of couplers 2342a and 2342b, light rays then enter and propagate through a second filter 2303 comprising a second pair of couplers 2342a and 2342b with substantially the same structures as those in the first filter 2302. As shown in FIG. 23C, the flipped light rays can be flipped back after the second filter 2303. In this case, the transmission image will be fully restored.

Angularly Selective Filters with Two-Dimensional Photonic Crystal Structures

Figure 24A:
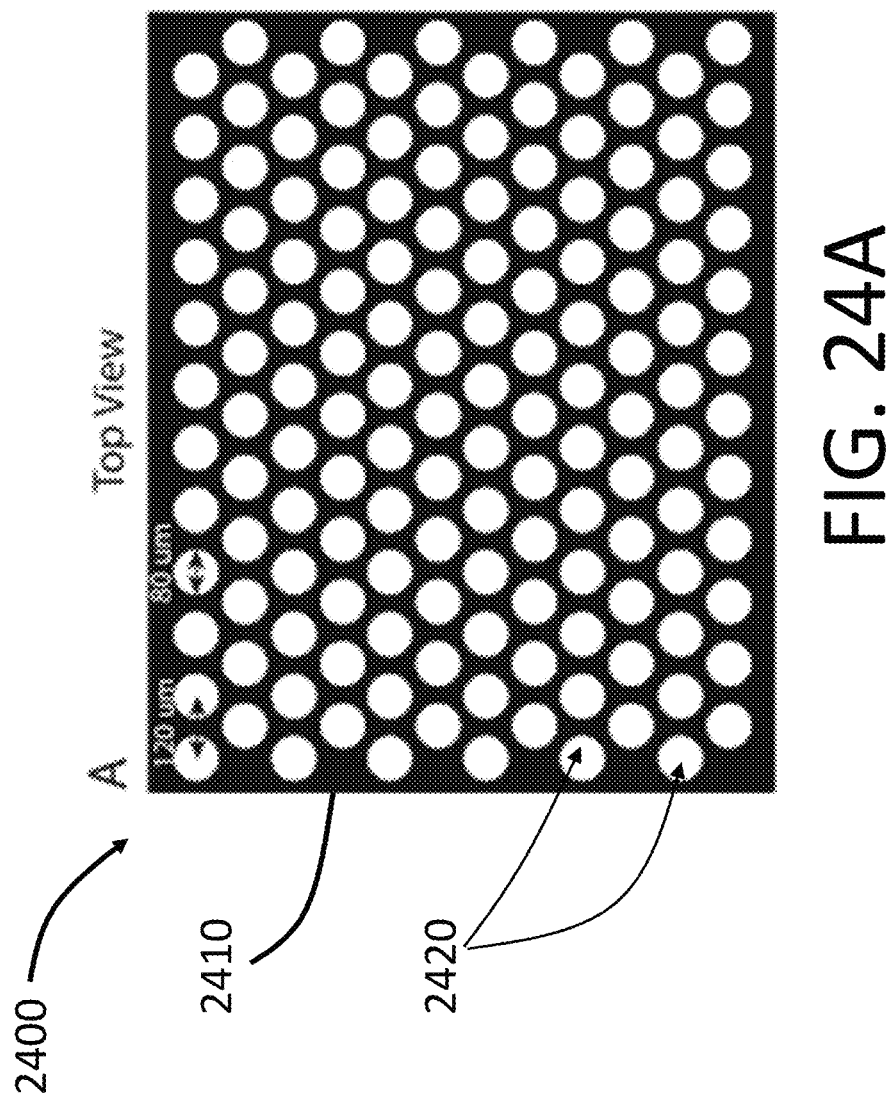
FIGS. 24A-24E illustrate angularly selective filters with two-dimensional photonic crystal structures.
Figure 24B:
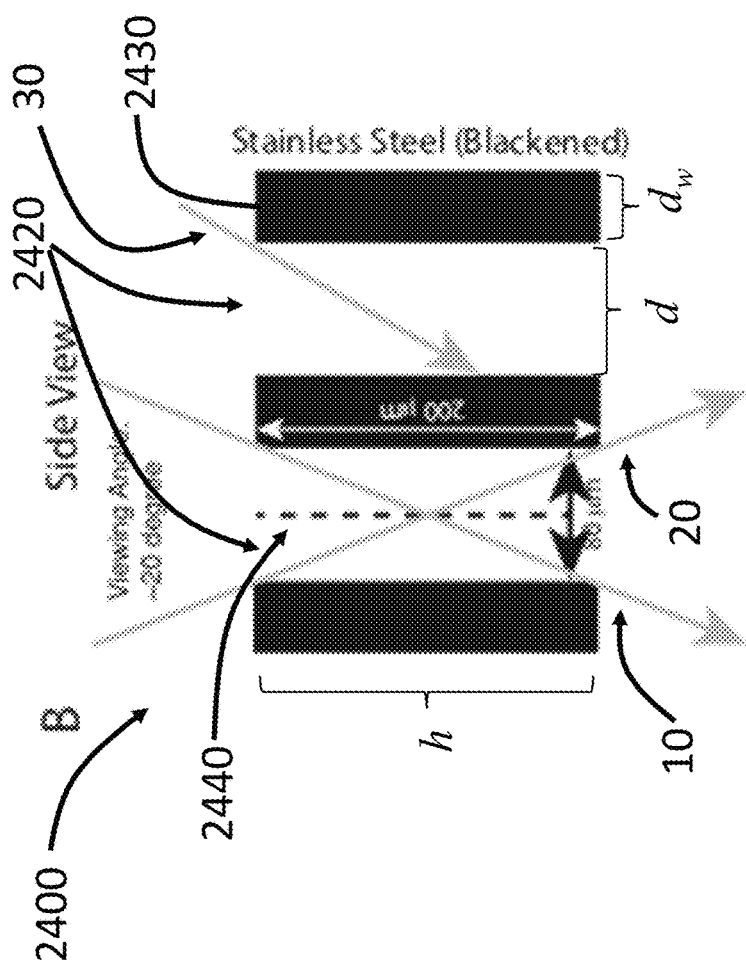

FIGS. 24A-24E show angularly selective filters with two-dimensional photonic crystal structures. FIG. 24A shows a top view of an angularly selective filter including a two-dimensional photonic crystal structure. The filter 2400 comprises a substrate 2410 with a plurality of cavities 2420. The side view of the filter 2400 is shown in FIG. 24B, in which the cavities 2420 has a depth h and a diameter d. The cavities 2420 are defined by cavity walls 2430, which have a wall thickness $d_w$. The filter 2400 defines an optical axis 2440 that can be substantially parallel to the cavity walls 2430.

Without being bound by any particular theory or mode of operation, the angularly selective filers shown in FIGS. 24A and 24B can be described from a geometric point of view. As illustrated in FIG. 24B, light rays within a certain threshold angle with respect to the optical axis 2440 (e.g., light rays 10 and 20) can transmit through the filter 2400. However, light rays outside the threshold angle (e.g., light ray 30) are blocked by the cavity walls 2430. The threshold angle can be dependent on the depth h and diameter d of the cavities 2440. In one example, as shown in FIG. 24B, the threshold angle can be defined as $\tan^{-1}(d/h)$. In another example, the threshold angle can be either larger or smaller than $\tan^{-1}(d/h)$, depending on the relative angle between the optical axis 2440 and the cavity walls 2430.

The filter 2400 can have flexible shapes and dimensions to fit different applications. For example, the filter 2400 can be rectangular, square, round, oval, or any other regular and/or irregular shape. The size of the filter 2400 can be, for example, on the order of microns, millimeters, centimeters, decimeters, or meters, depending on the application needs.

The substrate 2410 can comprise various materials depending on, for example, the wavelength of the light that is to be transmitted through the filter 2400. In one example, the material of the substrate 2410 absorbs, at least partially, the incident light such that the cavity walls 2430 can block light rays outside the threshold angle. In another example, the substrate 2410 can comprise a base material on which a second layer is conformally coated. The second layer can be absorptive at the wavelength of light to be transmitted. In yet another example, the substrate 2410 can be physically or chemically processed (e.g. oxidation of stainless steel) to create an absorptive surface. In yet another example, the material that is used to make the filter 2400 can be flexible, so the filter can deform to fit irregular or uneven display screens or surfaces, or other applications. In yet another example, the material can be reactive to external conditions (such as electric field, magnetic field, external force, etc.) so that its thickness (or other physical properties) can be tuned dynamically, thereby achieving tunable transmission angles.

The cavities 2420 can also have various shapes. In one example, the cavities 2420 can be round, in which case the transmission of incident light can be symmetric along the optical axis 2440. In another example, the cavities 2420 can have a shape that is rotationally symmetric (e.g. oval, rectangular, polygonal, etc.). In yet another example, the cavities 2420 do not all have the same shapes or sizes (e.g. on the same filter, one can have some holes being round, some holes being rectangular, or triangular, each hole of different size, etc.) In yet another example, the cavities 2420 are elongated along one particular direction (e.g. ellipsoid shapes). For example, they could be 2×, or 5× longer in one direction that the other. In that case, light rays from different azimuthal directions can have different transmission angles, which might be of interest for some applications. Moreover, if it is important to have angular selectivity only along one direction, but not the other, one can use elongated holes to increase the overall transparency of the screen at normal incidence.

The cavities 2420 can also have various dimensions. For example, the diameter d and depth h of the cavities can be on the order of microns, millimeters, centimeters, decimeters, or meters, depending on the wavelength regime of operation, the practical requirement and fabrication complexity.

For visible light, the size d of the cavities 2420 can range between 10 micrometers to 100 micrometers. The spacing between to neighboring holes w can range between 5 micrometers to 50 micrometers. The depth h of the cavities 2420 can range between 20 micrometer to 500 micrometer, and d/h can be chosen to enable the desired transmission threshold-angle. In general, it is beneficial that the size of each hole is substantially larger (e.g., >10×, or >20×, or >50× or so) than the wavelength of the light of interest: otherwise, the filter would not be operating in the geometric optics regime, and the image (as observed by the viewer) may appear distorted.

One the other hand, it can also be helpful that the size of each hole is not too large, so it cannot be easily resolved by the detector that is used for the observation far away. Otherwise, the structure of filter itself (e.g. the photonic crystal shape itself, if the shape is a photonic crystal) can be visible to the observer. For example, in the case of human eyes, at practical observation distances (few tens of centimeters away), the distance between each hole w should not be much larger than about 100 microns or so, and preferably even smaller than that (e.g. <50 microns, or <20 microns or so).

In case where it is desirable for the structure of the screen not to be apparent to the observer even at non-perpendicular observation (say, up to angle θ away from the normal), the wall height (t*sin(θ)) can be smaller than the smallest feature the observer can resolve, because at non-perpendicular observation, the observer observes not only the thickness of the walls, but also the walls along their height (at an angle).

To summarize, the characteristic features of the filter (hole sizes, hole depths, hole spacings, etc.) are large enough (compared to the wavelength of interest) for the filter to operate in the geometric optics regime, but not too large (compared to the resolution of the detector which the observer is using to observe the filter (e.g. in case of human observer, the "detector" is his/her eyes)), so the filters are not clearly resolved by the observer, avoiding possible interference to the observation.

In one example, the plurality of cavities 2420 in the filter 2400 is distributed periodically. In another example, the cavities 2420 can be distributed in a more random manner. The cavities 2420 can be made through mechanical drilling, physical etching, chemical etching, photolithography, direct laser writing, or any other means known in the art.

The filter 2400 can define a normal incidence transmission ratio, which can be the percentage of light transmitted through the filter 2400 at normal incidence. The normal incidence transmission ratio can depend on, for example, the ratio between the area covered by the solid part of the filter (e.g. related to the cavity wall thickness) and the area not covered by the solid part of the filter (the hole area or the void area, related to d). In one example, the normal incidence transmission ratio can be over 90% so as to reduce optical loss. In other examples, the normal incidence transmission ratio can be between 20% and 90%. The cavity wall thickness $d_w$ can be less than the wavelength of light to be transmitted so as to mitigate the shadows of the transmitted light.

The wall of each hole can be painted into different colors (instead of black color): e.g., red color, or green, or cyan, among others. The painting can be done by physical or chemical process (such as vapor deposition or electro-deposition). Once the wall of each hole are painted, when light is incident at front direction (normal direction), the privacy filter is substantially transparent. However, when light is incident at off-normal direction, the viewer will see a substantially opaque surface of whatever color the holes are painted with (instead of grey color). Alternatively, or in addition, the viewer can see a pattern of colors, or a picture (e.g. Smiley Face, or Hello Kitty, or similar), depending on how the wall of each hole is painted. This feature addresses a common issue in existing privacy-screen angularly selective filters. In practice, it is normally desirable to have a filter that is transparent at normal incidence. However, in most existing technologies, the painted screen looks reddish at all angles, including the normal incidence angle. In case the paint is an image, the image is also noticeable at normal incidence.

The material that is used to make the filter can be transparent and flexible polymers (such as SU8, PDMS, PSPI, etc.). In such case, one can paint the wall of each hole, without painting the front and back surface so as to achieve sufficient transmission.

Figures 24C, 24D, 24E:
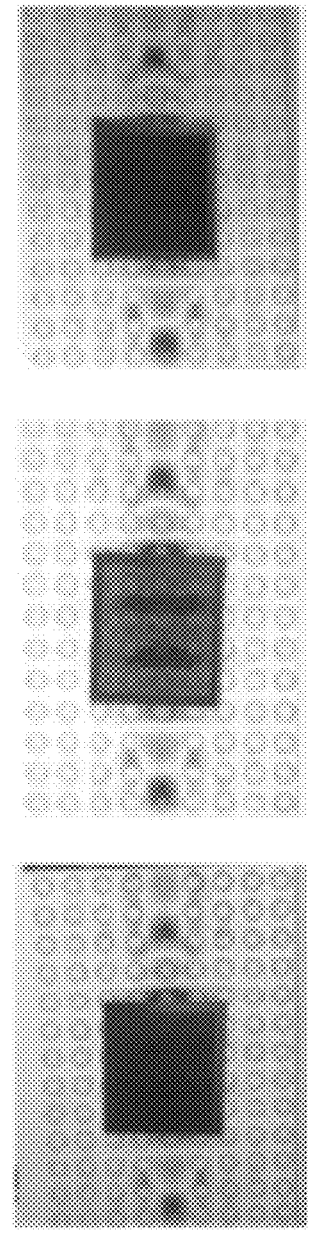

FIGS. 24C-24E show experimental demonstration of an exemplary angularly selective filter having a two-dimensional photonic crystal structure like the one shown in FIGS. 24A and 24B. The filter in this example is made from stainless steel, and oxidized to make the surface black. The slab is about 100 micrometers to 500 micrometers thick, with circular holes having a diameter around 100 micrometers and a periodicity around 150 micrometers. The holes are drilled on the slab using laser cutting techniques.

When the light is coming in straight from above, about 40% (for both polarizations) of the incident light passes through the slab, making the filter partially transparent, as shown in FIG. 24D. When the light is coming in at oblique angles, as shown in FIG. 24C and FIG. 24E, the filter blocks the transmission of the incident light and no image is observed through the filter.

Exemplary Applications of Angularly Selective Filters

Angularly selective files can find applications in a wide range of areas. Here below are non-limiting examples of applications of angularly selective filters described above.

FIG. 25 shows a system 2500 in which an angularly selective filter 2510 that changes the form of waves from point sources 2501a, 2501b, and 2501c (collectively referred to as point sources 2501) to plane waves. The filter 2510 can increase the directionality of electromagnetic radiations, such as optical, microwave, and radio waves. In FIG. 25, spherical waves 2502 radiated from multiple points sources 2501 propagates through the filter 2510 and output wave 2503 become more directional. Since many devices nowadays such as GPS and radar system rely on the interactive signal propagation, implementing space wave filter on the source can increase the resolution of those systems.

Figure 26:
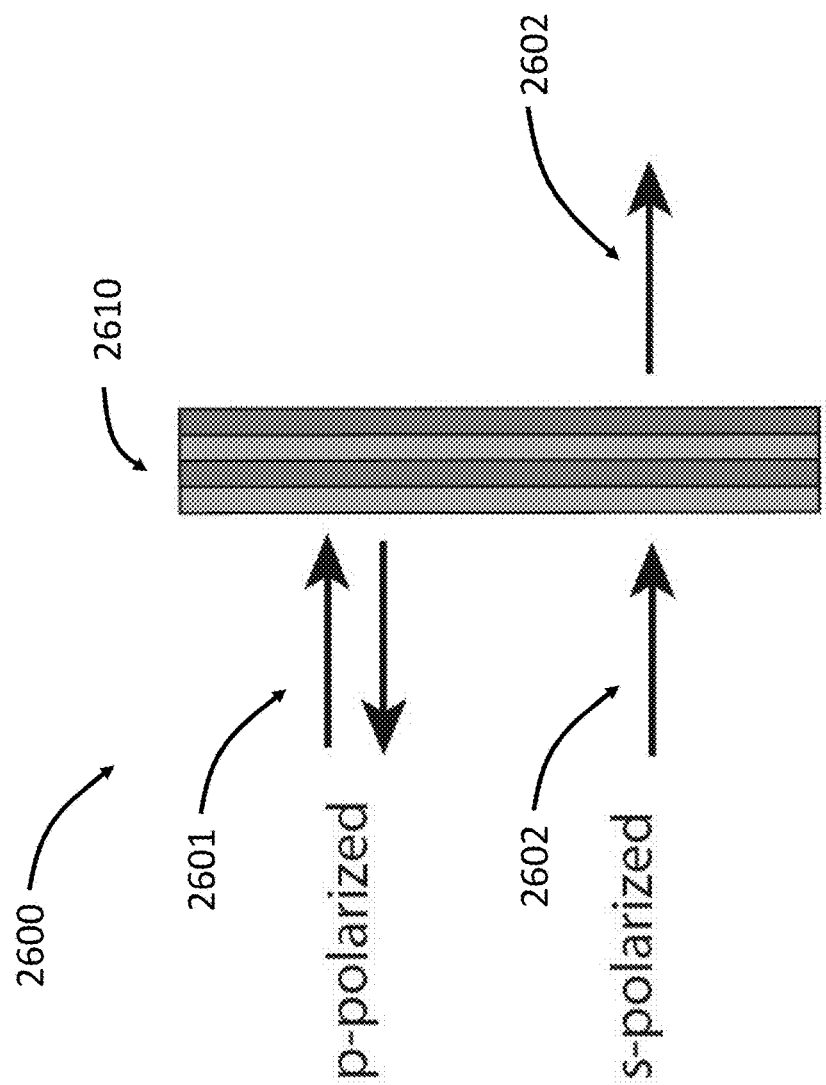
FIG. 26 is a schematic view of an angularly selective filter used as reflective polarizer.

FIG. 26 shows a system 2600 in which an angularly selective filter 2610 is employed as a reflective polarizer. Since the filter can be designed to have both angular selectivity and polarization selectivity, the filter can thus reflect one polarization but reflect the other. In FIG. 26, incident waves contain both p-polarized components 2601 and s-polarized components 2602. After propagating though the filter 2610, the waves contain only s-polarized components 2602.

Figure 27:
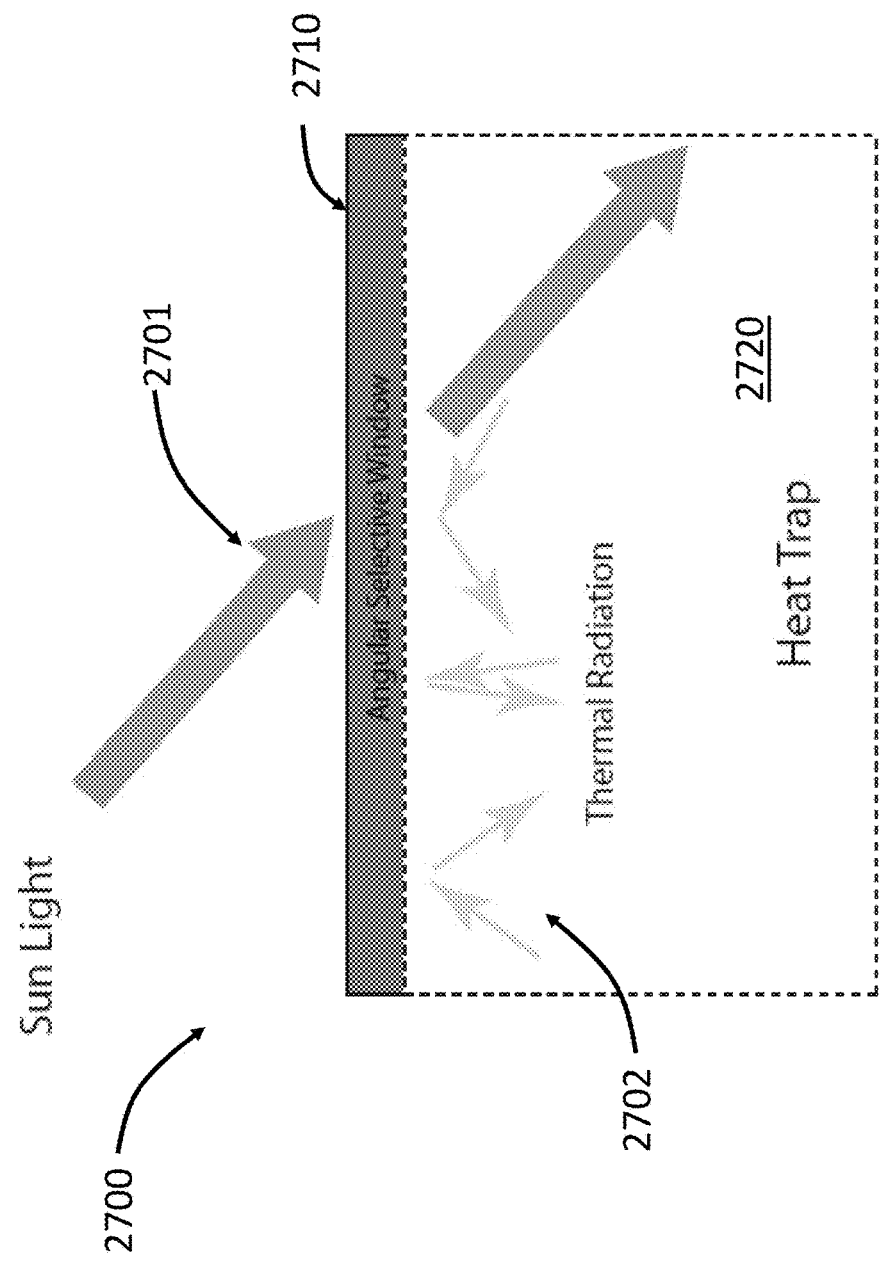
FIG. 27 is a schematic view of an angularly selective filter used for light trapping.

FIG. 27 shows a system 2700 in which an angularly selective filter 2710 is employed in a heat trap. The radiation 2701 from an energy source (e.g., sun light, lasers, etc.) enters the heat trap 2720 at one specific direction. Inside the trap, the light/heat 2702 can travel at various directions and most of the thermal/stimulated radiation or reflected/scattered light is reflected back towards the device, thereby confining the light/heat within the trap 2720. This can be potentially useful for Thermal Electrics (TE), Thermal Photovoltaics (TPV), and conventional Solar Cells (PV).

Figures 28A, 28B:
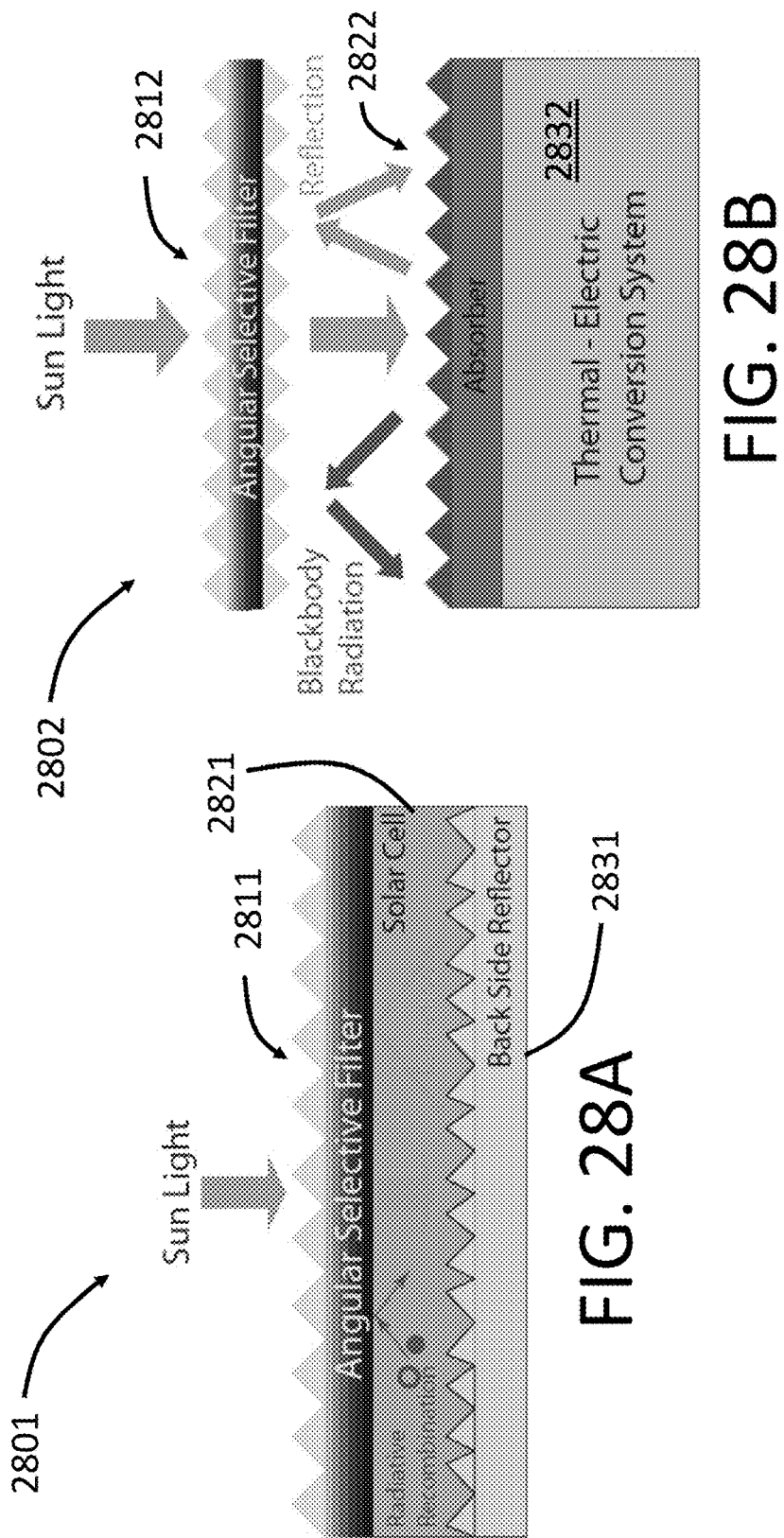
FIGS. 28A-28D illustrate the application of angularly selective filters in solar systems.
Figure 28C:
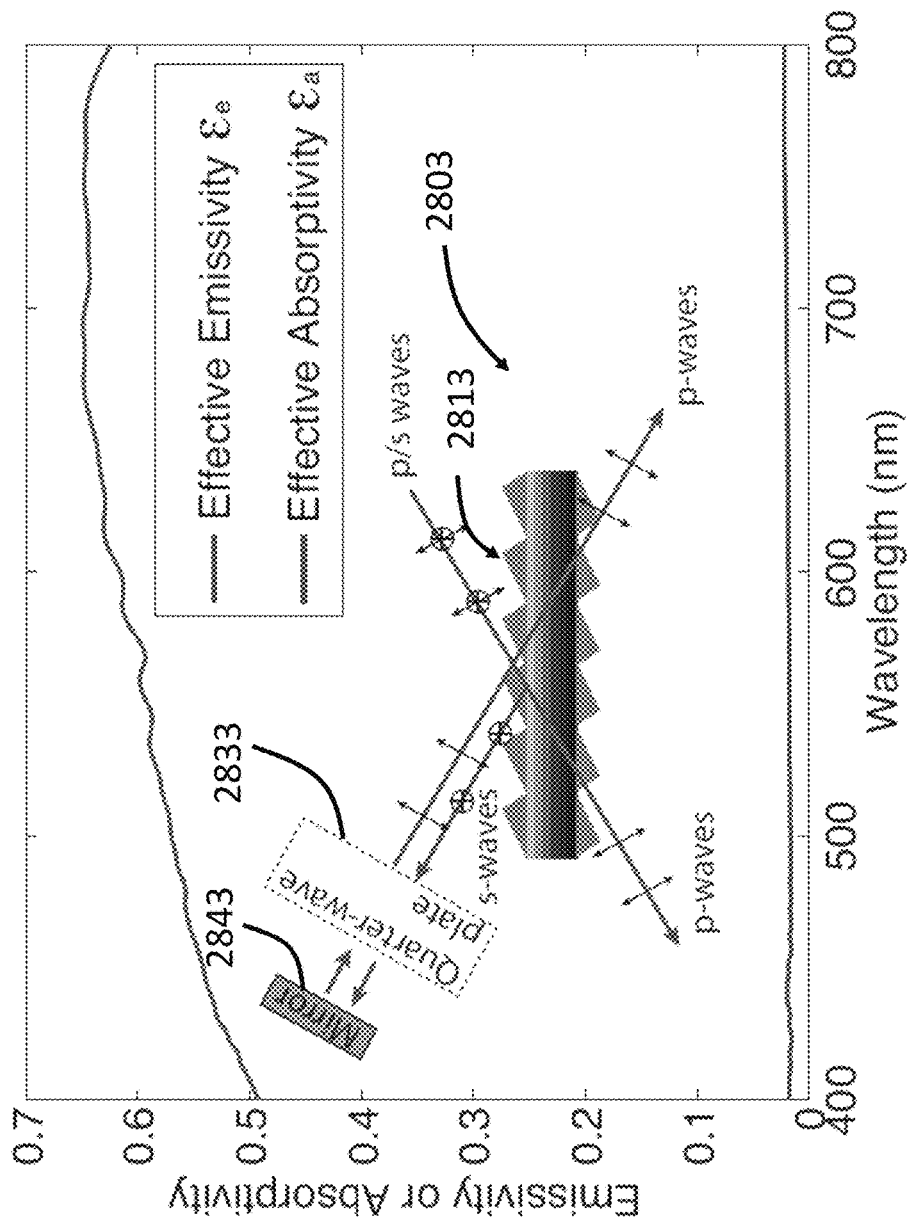

FIGS. 28A-28C show energy harvesting systems that use angularly selective filters to improve operation efficiency. Current solar energy harvesting technologies can be categorized into two conversion processes: direct conversion and indirect conversion. Direct conversion is also known as photovoltaic conversion (solar cells). In an ideal photovoltaic conversion, each photon absorbed by a solar-active material (typically silicon) causes an electron to jump from the valence band to the conduction band and create a hole in the valence band, leading to an electric current pulse. On the other hand, indirect conversion, or solar thermal conversion, corresponds to conversion of solar energy into heat by collection in a solar absorber and subsequent conversion of this heat into work by means of a thermal engine, a thermal photovoltaic device, or a thermal electrical device.

The total efficiency of solar cell/solar thermal system can be calculated by:

$$\mu_{total} = \mu_1 \cdot \mu_{SC/ST} \tag{20}$$

where $\mu_1$ represent the efficiency of light trapping, which is the percentage of solar energy that is trapped in the semiconductor layer (for solar cell) or absorber (for solar thermal systems); and $\mu_{SC/ST}$ represent the efficiency of the actual photo-electric conversion in solar cell, or thermal-electric conversion in solar thermal systems. Since $\mu_{SC/ST}$ can be mainly limited by the inherent material properties, such as the so-called Shockley-Queisser limit (for solar cell), or Carnot efficiency (for solar thermal system), improvement of solar harvesting can be achieved by improving $\mu_1$.

The efficiency of light trapping $\mu_1$ can be related to the performance of absorber's emittance, and can be calculated by:

$$\mu_l = \frac{P_{absorbed}}{P_{income}} = \frac{J_s - J_e - J_r - J_o}{J_s} = 1 - \frac{J_e}{J_s} - \frac{J_r}{J_s} - \frac{J_o}{J_s} \tag{21}$$

where $P_{absorbed}$ is the total power trapped in the solar cell or solar thermal system, and $P_{income}$ is the total power incident on the device. The quantity $J_s$ is the incoming energy flux from sunlight, $J_e$ is the outgoing energy flux from photon emission, $J_r$ is the energy flux of sunlight reflected from the system, and $J_o$ are other thermal losses due to conduction, convection and non-radiative electron recombination. $J_s$ and $J_e$ can be expressed as:

$$J_s = \Omega_c(N_s) \int_0^\infty df \varepsilon_a(f) I_s(f) \tag{22}$$

$$J_e = 2\pi \int_0^\infty df \varepsilon_e(f) I_{emit}(f) \tag{23}$$

where the effective absorptance $\varepsilon_a(f)$ and emittance $\varepsilon_e(f)$ can be defined as:

$$\varepsilon_a(f) = \varepsilon_t(f, \theta = \theta_t) \tag{24}$$

$$\varepsilon_e(f) = \frac{1}{\pi} \int_{\phi=0}^{2\pi} \int_{\theta=0}^{\pi/2} \sin\theta \cos\theta \, \varepsilon_t(f, \theta, \phi) d\phi d\theta \tag{25}$$

Here $\Omega_c(N_s) \sim N_s \cdot 7 \cdot 10^{-5}$ rad is the solid angle spanned by the solar disk (at solar concentration of $N_s$ suns), $\varepsilon_t$ is the transmission of angular selective filter at different incident angles ($\theta$, $\varphi$) and frequency f ($\varepsilon_t=1$ if no angular selective filter is applied). $\theta_t$ is the angle of incidence, $I_s$ is the solar spectrum, and $I_{emit}$ is the emission spectrum of solar cell/solar thermal system. Therefore, $J_e/J_s$ and $J_r/J_s$ can be decreased to improve the solar trapping efficiency $\mu_1$.

When conventional solar cells or solar thermal absorbers are put under direct sunlight, they receive light only from the solid angles spanned by the solar disk ($\Omega_{inc} = \theta_c(1) \sim 6.8 \times 10^{-5}$ rad). On the other hand, they emit and reflect light isotropically ($\Omega_{emit} = 2\pi$ rad). The large ratio between absorption and emission solid angles can result in an increase in photon entropy, hence decreasing the efficiency of solar cells and solar thermal systems.

There are at least two ways to increase the absorption/emission ratio. The first way is to increase $\Omega_{inc}$ by applying a concentrator to the system. The second way is to decrease the angle of emission by applying angular selective filters. The effect of this method can be similar to using a concentrator, but the system can be made much thinner and can be easily incorporated into traditional solar cell modules.

In solar cells, at least part of the emission loss can be attributed to radiative recombination and incomplete absorption (especially in thin film solar cells). A broadband angular selective system can help mitigate losses from both of these two effects through photon-recycling (for radiative recombination) and light trapping (for reflected sunlight). For solar cells with high radiative efficiency, such as GaAs or other III-V material solar cells, radiative recombination and emission can be a major loss mechanism. In these cases, photon recycling that reflects the radiated photons back into the solar cell can lead to enhancement in voltage and efficiency. For solar cells with lower radiative efficiency, such as silicon solar cells, non-radiative processes like Auger recombination can limit the voltage; hence light trapping effect can be helpful. Enhanced light trapping effect allows for better absorption of sunlight in a thin cell (reducing material usage), and an increase in current, voltage and efficiency of the solar cell as well.

FIG. 28A shows a solar system 2801 that employs an angular selective filter 2811 to trap the incident sunlight. In this system, the rugged back side reflector 2831 in the system can reflect the incident sun light to various directions. Due to the angular selectivity of the filter 2811, most of the reflected sun light can be reflected back by the filter 2811, thereby trapping the sun light inside the solar cell 2821 for conversion into electric energy.

FIG. 28B shows a schematic design of a solar thermal system 2802 using a broadband angular selective filter 2812. The broadband angular selective filters can increase the light trapping efficiency of solar thermal systems through at least two ways: First, the filter can reduce the reflection loss from the absorber 2822 (i.e., reduce $J_r/J_s$). Typically, absorbers 2822 comprise metals with high thermal stability, such as tantalum or steel. However, the surface reflection from the absorber 2822 can be significant. Placing a filter 2812 on the path of the reflected light can therefore reflect back the light back to the absorber 2822 for energy conversion in the thermal-electric conversion system 2832, thereby reducing reflection loss.

Figure 28D:
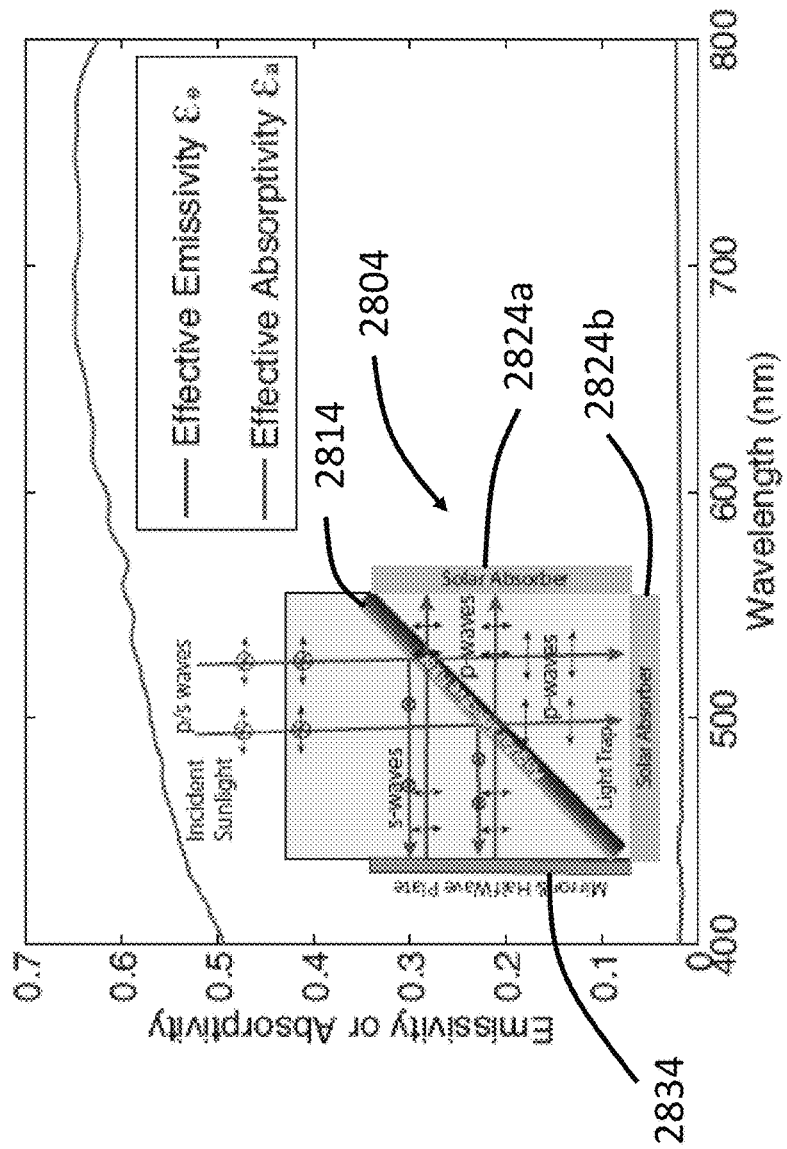

Second, the filter can mitigate the photon emission loss from the absorber 2822 (i.e. reduce $J_e/J_s$). In the case of high temperature solar thermal systems (higher temperature helps to achieve higher thermal-electric conversion), the overlap of $I_s$ and $I_{emit}$ in the frequency domain is typically not negligible. Hence, in the overlapping frequency regime, it can be challenging to separate the incident light from the emitted light with a frequency selective filter (typically used for low temperature solar thermal systems). In this case, angular selection can be helpful. FIG. 28C and FIG. 28D show the calculated effective emittance $\varepsilon_e$ and absorptance $\varepsilon_a$ over the visible spectrum. It can be seen that a factor of 25 enhancement of $\varepsilon_a/\varepsilon_e$ across the entire visible spectrum is achieved with the filter ($\varepsilon_a/\varepsilon_e$>30) compared to the case without the angular selective filter ($\varepsilon_a/\varepsilon_e$=1). Increasing the number of layers in the filter would further enhance the $\varepsilon_a/\varepsilon_e$ ratio.

Still further improvement can be achieved by employing a broadband quarter wave plate and a mirror to convert the randomly polarized sun light into p-polarized light, as shown in the insets of FIG. 28C and FIG. 28D. FIG. 28C shows a system 2803, in which the s-polarized waves reflected by the filter 2812 propagate through a quarter wave plate 2833, after which a mirror 2843 reflects the waves back through the quarter wave plate again, thereby converting the s-polarized waves into p-polarized waves, which can then propagate through the filter 2813. FIG. 28D shows a system 2804, in which two solar absorbers 2824a and 2824b are disposed perpendicularly with each other, and a filter 2814 is disposed at 45 degree with respect to both solar absorbers. P-polarized components of the incident light substantially parallel to one solar absorber can propagate through the filter 2814 and be absorbed by one absorber 2824b for energy conversion. The s-polarized components in the incident lights are first reflected by the filter 2814 and then reflected by a mirror and quarter wave plate system 2834 for polarization conversion. The converted light then can propagate through the filter 2814 and reach the other absorber 2824a for energy conversion.

Figures 29A, 29B:
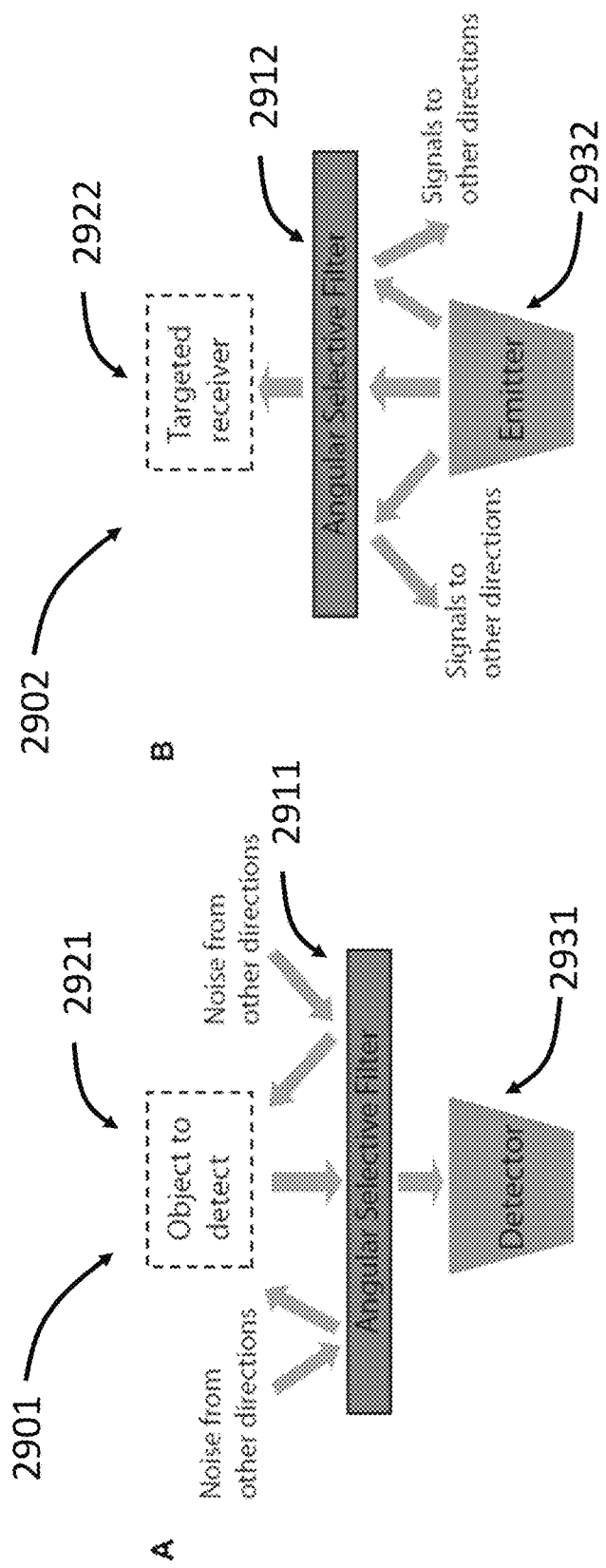
FIGS. 29A-29B illustrate the application of angularly selective filters in emitters and detectors.

FIGS. 29A-29B show applications of angularly selective filters in signal enhancement. Among many detectors, such as telescopes, micro-scopes, cameras and radars, a useful indicator to describe the detection quality is the signal-to-noise ratio (SNR). In many cases, detectors are used in detecting an object that usually spans only a small solid angle, while unwanted signals coming in from other directions can interfere with the desirable signal. Similar situations also apply to emitters: in many signal transmission applications, such as Wi-Fi, radio station and radar system, signals propagating in certain direction can be normally desired. Signals propagating along other directions can be either unwanted or a waste of energy.

In the system 2901 shown FIG. 29A, an angularly selective filter 2911 is placed between an object 2921 and a detector 2931. Due to the angularly selectivity of the filter 2911, only radiation at certain incidence angles can propagate through the filter 2911, reach the detector, and generate signals. Radiation at other incidence angles, including noises, is blocked by the filter, thereby reducing the intensity level on the detector. The net effect is an increase of the SNR. Similarly, an angularly selective filter 2912 can be placed between a target receiver 2922 and an emitter 2932 to improve the directionality of the radiation from the emitter, as in the system 2902 shown FIG. 29B.

FIGS. 29A and 29B are schematic designs of generalized systems, and they can be adapted for applications in more specific systems as listed below:

Radar Systems: Radar systems are usually used to observe small, distant objects. Radio signals broadcast from a single omnidirectional antenna can spread out in all directions, and likewise a single omnidirectional antenna can receive signals equally from all directions. This may leave the radar with the problem of determining the target object's location. Early systems tend to use omnidirectional broadcast antennas, with directional receiver antennas that are pointing at various directions. One limitation of this solution can be that the broadcast is sent out in all directions, so the amount of energy in the direction being examined can be small. To get a reasonable amount of power on the target, both the transmitting and receiving aerial are desired to be directional. More recently, popular radar systems use a steerable parabolic dish to create a tight broadcast beam, typically using the same dish as the receiver. Such parabolic dish can be much bigger than the antenna itself, can take up most of the space of the radar systems, and can induce potential costs over millions of dollars.

The above problem can be addressed, at least partially, by the angularly selective material described in this disclosure. As shown in FIGS. 29A and 29B, an angular selective filter can be added in front of the transmitter/receiver antenna. The antenna can also be sandwiched between two angular selective filters. The directionality and bandwidth of this radar system can be made as good as the traditional radar systems (if not better), but the size can be much smaller, which can be valuable for many defense applications.

Telescope System: A telescope is an instrument that aids the observation of remote objects by collecting electromagnetic radiation. Since the target objects usually span extremely small solid angles, and are normally surrounded by many other bright light sources, it can be desirable to reduce lights coming in from other directions. For example, in optical refracting and reflecting telescopes, the optical components (lens and mirrors) are typically placed a certain distance away from each other (proportional to the aperture size) to prevent light outside a small viewing angle from reaching the detector. Radio telescopes use large parabolic disk reflector (as in radars) to achieve the angular selectivity. In infrared telescopes, an array of long metallic tubes is placed above the bolometric detector to block unwanted signals from other directions. The size and cost of these systems can be formidable.

Material-based angular selective filter can be installed in front of the detector to address, at least partially, the above mentioned issues. Moreover, these filters can have a size comparable to the operating wavelength. Compared to traditional telescopes, the size and the cost of this proposed system can be lower.

Camera System: Traditional optical cameras operate according to similar principles of refracting telescope. Accordingly, similar implementations of angularly selective filters in cameras can increase the SNR of camera detectors, especially for night vision cameras. Another type of camera that may take advantage of angularly selective filtering can be light field camera, which uses a micro-lens array or angular sensitive pixels to capture 4D light field information of an object or a scene. Such light field information can be utilized for range imaging and producing 3D imaging, or for improving the solution of computer graphics and computer vision related problems, and for producing digital plenoptic pictures that can be refocused after they are taken. Since this new generation of cameras records the complete Fourier information of the light field, the allowable eccentricity of incident light (relative to the normal to the device) can be restricted by the number of light field detectors. Current light field cameras normally increase the length of the camera to block light from large incident angles, but angularly selective filters can be used here to improve the efficiency and reduce the size of the system.

Figure 30:
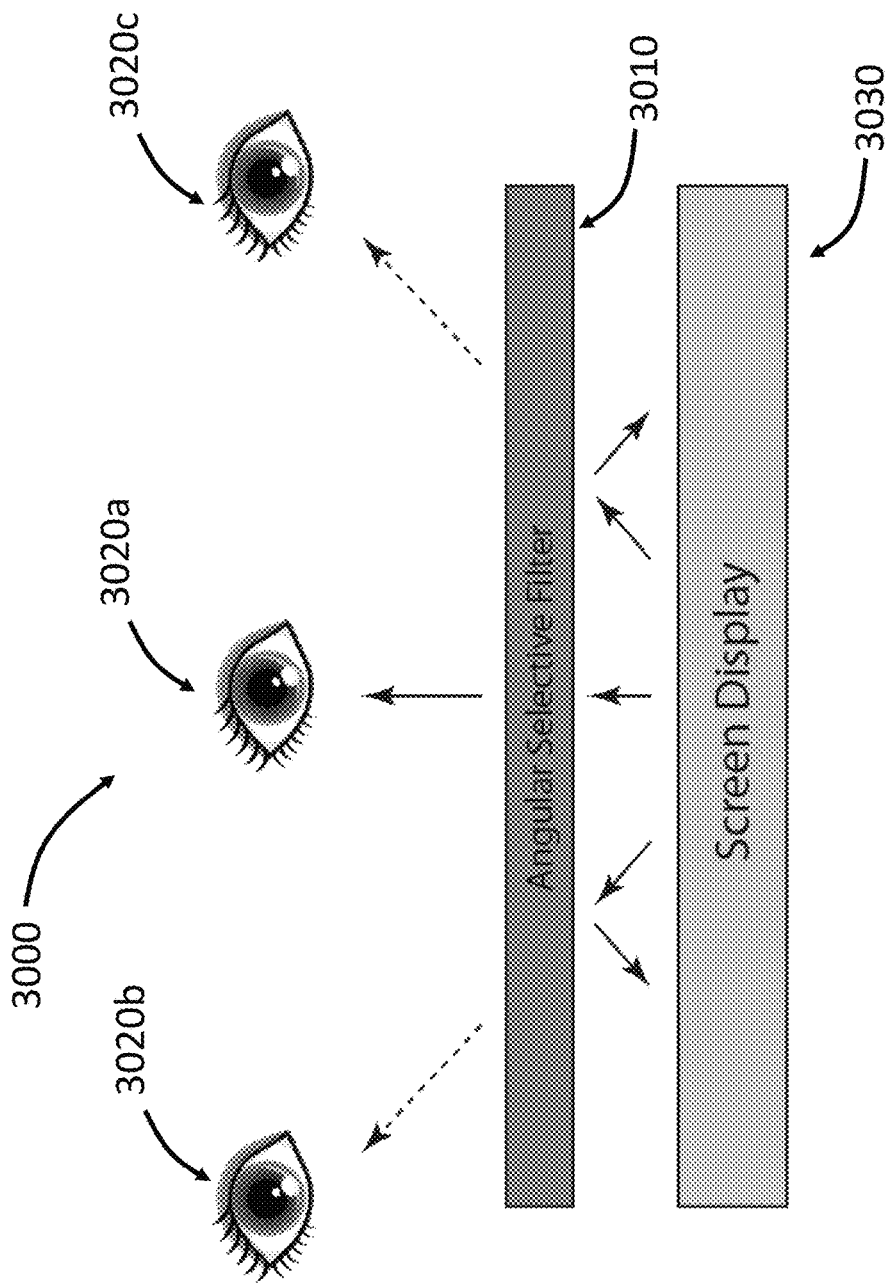
FIG. 30 illustrates the application of an angularly selective filter in privacy protection.

FIG. 30 shows applications of an angularly selective filter 3010 in a privacy protection system 3000. An angularly selective filter 3010 is be placed in front of a screen, monitor, or other displays 3030, in which case only light going straight toward observer 3020a (in a specific direction) can be seen, and no light comes out in other directions toward observers 3020b or 3020c.

Figure 31:
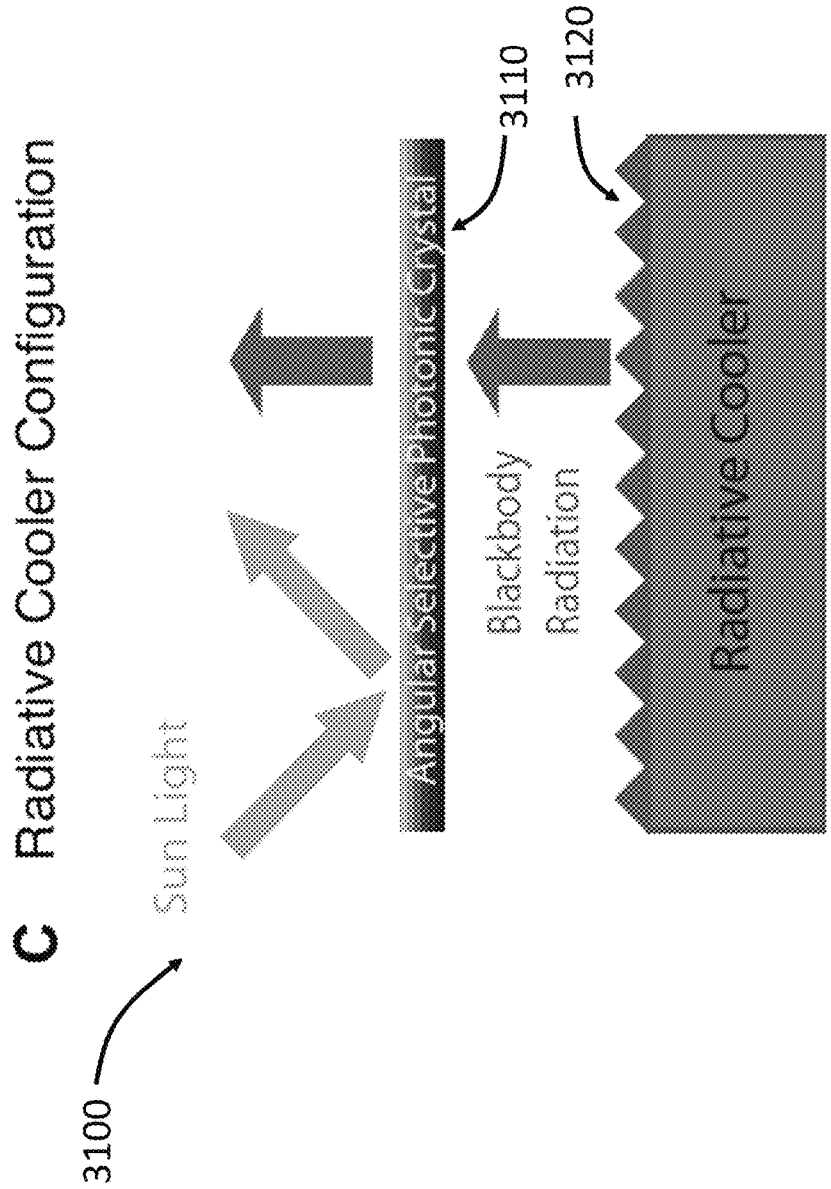
FIG. 31 illustrates the application of an angularly selective filter in radiative cooling.

FIG. 31 is a schematic view of angularly selective filters used in a radiative cooling system 3100. In practice, cooling can be a significant end-use of energy globally and a major driver of peak electricity demand. Air conditioning, for example, accounts for nearly fifteen percent of the primary energy used by buildings in the United States. A passive cooling strategy that cools without any electricity input could therefore have a helpful impact on global energy consumption. Peak cooling demand occurs during the daytime. However, daytime radiative cooling to a temperature below the ambient temperature of a surface under direct sunlight has always been a challenging problem, because sky access during the day results in heating of the radiative cooler by the sun. Angular selective material could open a new area on passive day time radiative cooling. As shown in FIG. 31, with an angular selective filter 3110 placed in front of a radiative cooler 3120, incident energy from sunlight can be effectively blocked, while radiated light carrying energy away from the radiative cooler 3120 can still escape away from the radiative cooler 3120.

CONCLUSION

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto; inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of designing and making the coupling structures and diffractive optical elements disclosed herein may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes (e.g., of designing and making the coupling structures and diffractive optical elements disclosed above) outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A. and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures. Section 2111.03.

The invention claimed is:

1. A filter to transmit incident radiation at a predetermined incidence angle and to reflect incident radiation at other incidence angles, the filter comprising:
    a plurality of photonic crystal structures disposed substantially along a surface normal direction of the filter, at least one photonic crystal structure in the plurality of photonic crystal structures comprising:
        at least one multilayer cell aligned substantially along the surface normal direction of the filter, the at least one multilayer cell comprising:
            a first layer having a first dielectric permittivity; and
            a second layer, aligned with the first layer substantially along the surface normal direction of the filter, having a second dielectric permittivity different from the first dielectric permittivity,
        wherein the first layer and the second layer define a Brewster angle substantially equal to the predetermined incidence angle based, at least in part, on the first dielectric permittivity and the second permittivity, and
        each photonic crystal structure in the plurality of photonic crystal structures defines a respective bandgap, the respective bandgaps of the plurality of photonic crystal structures, taken together, covering a continuous spectral region of about 100 nm to about 100 mm.

2. The filter of claim 1, wherein:
    a first thickness of the at least one multilayer cell in a first photonic crystal structure is different from a second thickness of the at least one multilayer cell in a second photonic crystal structure.

3. The filter of claim 1, wherein:
    the first dielectric permittivity in a first photonic crystal structure in the plurality of photonic crystal structures is different from the first dielectric permittivity in a second photonic crystal structure in the plurality of photonic crystal structures.

4. The filter of claim 1, wherein at least one of the first dielectric permittivity or the second dielectric permittivity is about 1 to about 5.

5. The filter of claim 1, wherein a smaller dielectric permittivity of the first dielectric permittivity and the second dielectric permittivity is about 1 to about 3.

6. The filter of claim 1, wherein a larger dielectric permittivity of the first dielectric permittivity and the second dielectric permittivity is about 10.

7. The filter of claim 1, wherein at least one of a thickness of the first layer or a thickness of the second layer is greater than one fifth of a wavelength of the incident radiation.

8. The filter of claim 1, wherein at least one of a thickness of the first layer or a thickness of the second layer is about 50 nm to about 150 nm.

9. The filter of claim 1, wherein a first ratio of the first dielectric permittivity to a first permeability of the first layer is substantially equal to a second ratio of the second dielectric permittivity to a second permeability of the second layer so as to transmit the incident radiation with a normal incidence angle and an arbitrary polarization state.

10. The filter of claim 1, wherein the first dielectric permittivity has a first value in a plane parallel to the second layer and a second value different than the first value in a plane perpendicular to the second layer.

11. The filter of claim 1, wherein a first thickness of the at least one multilayer cell in a first photonic crystal structure in the plurality of photonic crystal structures is at least three time greater than a second thickness of the at least one multilayer cell in a second photonic crystal structure in the plurality of photonic crystal structures,
wherein a total number of multilayer cells in the plurality of photonic crystal structure is greater than 300.

12. The filter of claim 1, wherein:
the first dielectric permittivity has a first in-plane component substantially parallel to the second layer and a first out-of-plane component substantially perpendicular to the second layer,
the second dielectric permittivity has a second in-plane component substantially equal to the first in-plane component and a second out-of-plane component, and
a difference between the first out-of-plane component and the second out-of-plane component is substantially equal to or greater than 0.05.

13. The filter of claim 1, wherein the predetermined incidence angle is substantially equal to or less than 10° and the other incidence angles are substantially equal to or greater than 50°.

14. The filter of claim 1, wherein:
an ith thickness $a_i$ of the at least one multilayer cell in an ith photonic crystal structure satisfies $a_i = a_1 q^{i-1}$, where i is an integer between 1 and 2000 and q is a positive number greater than one.

15. The filter of claim 14, wherein $a_1$ is about 100 nm to about 150 nm.

16. The filter of claim 1, further comprising:
a first coupler, disposed on a front surface of the plurality of photonic crystal structures, to couple the incident radiation onto the plurality of photonic crystal structures; and
a second coupler, disposed on a back surface of the plurality of photonic crystal structures, to couple the incident radiation out of the plurality of photonic crystal structures.

17. The filter of claim 16, wherein at least one of the first coupler or the second coupler comprises at least one of a prism, a triangular lens, or a conical lens.

18. The filter of claim 16, wherein the first coupler and the second coupler have a same dielectric permittivity substantially equal to or greater than the first dielectric permittivity of the first layer.

19. The filter of claim 16, wherein:
at least one of the first coupler or the second coupler has a cross section of an isosceles triangle with an apex angle selected such that incident radiation substantially normal to the front surface of the plurality of photonic crystal structures propagates in the plurality of photonic crystal structures at the Brewster angle defined by the first layer and the second layer.

20. The filter of claim 16, further comprising:
a quarter wave plate disposed in a beam path of the incident radiation reflected by the front surface of the plurality of photonic crystal structures; and
a reflective surface, in optical communication with the quarter wave plate and substantially perpendicular to the incident radiation transmitted through the quarter wave plate, to reflect the incident radiation back to the front surface with a rotated polarization state.

21. The filter of claim 1, wherein the first layer comprises a porous material and the first dielectric permittivity is substantially equal to one so as to allow an air compatible operation.

22. The filter of claim 21, wherein the porous material comprises an aerogel.

* * * * *